(12) United States Patent
Naganuma et al.

(10) Patent No.: US 8,667,098 B2
(45) Date of Patent: Mar. 4, 2014

(54) CLUSTER STORAGE SETTING METHOD, SYSTEM, AND MANAGEMENT SYSTEM

(75) Inventors: Yuki Naganuma, Yokohama (JP); Hirokazu Ikeda, Yamato (JP); Wataru Okada, Machida (JP); Akira Yamamoto, Sagamihara (JP); Shinichiro Kanno, Odawara (JP)

(73) Assignee: Hitachi, Ltd., Tokyo (JP)

( * ) Notice: Subject to any disclaimer, the term of this patent is extended or adjusted under 35 U.S.C. 154(b) by 509 days.

(21) Appl. No.: 12/999,368

(22) PCT Filed: Dec. 3, 2010

(86) PCT No.: PCT/JP2010/007056
§ 371 (c)(1),
(2), (4) Date: Dec. 16, 2010

(87) PCT Pub. No.: WO2012/073295
PCT Pub. Date: Jun. 7, 2012

(65) Prior Publication Data
US 2012/0144002 A1     Jun. 7, 2012

(51) Int. Cl.
*G06F 15/177* (2006.01)

(52) U.S. Cl.
USPC ........................................ 709/220; 709/216

(58) Field of Classification Search
USPC ........................................ 709/220, 214, 216
See application file for complete search history.

(56) References Cited

U.S. PATENT DOCUMENTS

| | | | |
|---|---|---|---|
| 7,990,994 B1 * | 8/2011 | Yeh et al. | 370/431 |
| 8,275,886 B1 * | 9/2012 | Galan | 709/226 |
| 8,489,827 B2 * | 7/2013 | Shin et al. | 711/154 |
| 2002/0133735 A1 * | 9/2002 | McKean et al. | 714/5 |
| 2002/0194294 A1 * | 12/2002 | Blumenau et al. | 709/213 |
| 2003/0028819 A1 * | 2/2003 | Chiu et al. | 714/5 |
| 2004/0249904 A1 * | 12/2004 | Moore et al. | 709/216 |
| 2004/0257857 A1 | 12/2004 | Yamamoto et al. | |
| 2005/0144173 A1 | 6/2005 | Yamamoto et al. | |
| 2008/0071983 A1 * | 3/2008 | Kamei et al. | 711/113 |
| 2009/0132708 A1 * | 5/2009 | Hayward | 709/226 |
| 2010/0191908 A1 * | 7/2010 | Yamakawa | 711/114 |
| 2011/0161564 A1 * | 6/2011 | Yeh | 711/103 |

FOREIGN PATENT DOCUMENTS

| | | | |
|---|---|---|---|
| EP | 1 484 668 A2 | | 12/2004 |
| JP | 2000259583 A | * | 9/2000 |
| JP | 2005-11277 A | | 1/2005 |
| JP | 2005-165702 A | | 6/2005 |
| JP | 2006092562 A | * | 4/2006 |
| JP | 2006139666 A | * | 6/2006 |
| JP | 2007156332 A | * | 6/2007 |
| JP | 2008123198 A | * | 5/2008 |

* cited by examiner

*Primary Examiner* — Kostas Katsikis

(74) *Attorney, Agent, or Firm* — Mattingly & Malur, PC

(57) ABSTRACT

A storage cluster including a first storage apparatus and a second storage apparatus is defined. Communication between the first storage apparatus and the second storage apparatus uses a first network and an access request from a host computer uses a second network. Each of the first and second storage apparatuses defines internal LUs by using storage devices included in that storage apparatus. The first storage apparatus defines other internal LUs by using internal LUs of the second storage apparatus and the second storage apparatus defines other internal LUs by using internal LUs of the first storage apparatus.

13 Claims, 53 Drawing Sheets

| SDEV-ID | BLOCK. INFO. | EXTERNAL | WWN | LUN | TYPE | CAPACITY |
|---|---|---|---|---|---|---|
| SDEV1 | NORMAL | NO | AA.. | 0 | FLASH | 200GB |
| SDEV2 | NORMAL | NO | BB.. | 0 | FLASH | 200GB |
| SDEV3 | NORMAL | NO | CC.. | 0 | FC | 500GB |
| SDEV4 | BLOCKED | NO | DD.. | 0 | FC | 500GB |
| SDEV5 | NORMAL | YES | RR.. | 1 | - | 100GB |
| SDEV6 | NORMAL | YES | GG.. | 0 | - | ... |
|  |  |  | HH.. | 0 |  |  |
| ⋮ | ⋮ | ⋮ | ⋮ | ⋮ | ⋮ | ⋮ |

4050

| PG-ID | BLOCK. INFO. | RAID LEVEL | NUM. OF SDEV | JOINED SDEV-ID |
|---|---|---|---|---|
| PG1 | NORMAL | 1 | 2 | SDEV1, SDEV2 |
| PG2 | NORMAL | 1 | 2 | SDEV3, SDEV4 |
| PG3 | NORMAL | DUMMY | - | SDEV5 |
| PG4 | BLOCKED | 0 | 1 | ... |
| ... | ... | | | ... |

4060

| INTERNAL LU-ID | BLOCK INFO. | PG-ID | START ADDRESS | END ADDRESS | BLOCK SIZE |
|---|---|---|---|---|---|
| I-LU1 | NORMAL | PG1 | 0 | 360M | 512B |
| I-LU2 | NORMAL | PG2 | 0 | 400M | 512B |
| I-LU3 | NORMAL | PG3 | 0 | 200M | 512B |
| I-LUx | NORMAL | PGx | 100M | 300M | 512B |
|  |  | PGy | 0 | 200M |  |
| ... | ... | ... | ... | ... | ... |

| WWN | LUN | INTERNAL LU-ID |
|---|---|---|
| PP.. | 0 | I-LU1 |
| PP.. | 1 | I-LU3 |
| QQ.. | 1 | I-LU2 |
| QQ | 0 | I-LU1 |
| .. | | .. |

4080

FIG. 24
(0) INITIAL STATE (BLOCKS 0, 1 STAGED BY READING)
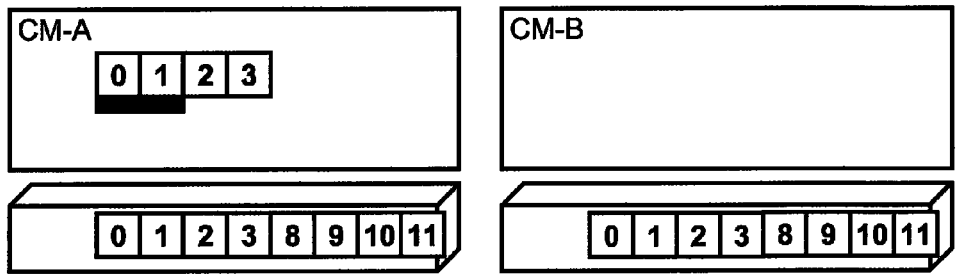
(1) AFTER WRITE REQUEST IS RECEIVED BY BLOCK 2 AND ACK IS RETURNED
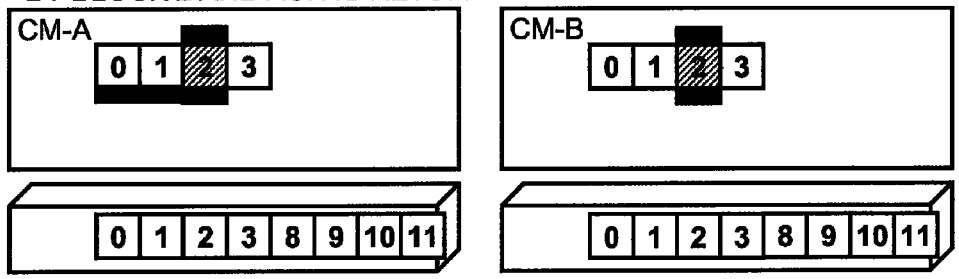
(2) FORMING SDEV UNIT BLOCKS
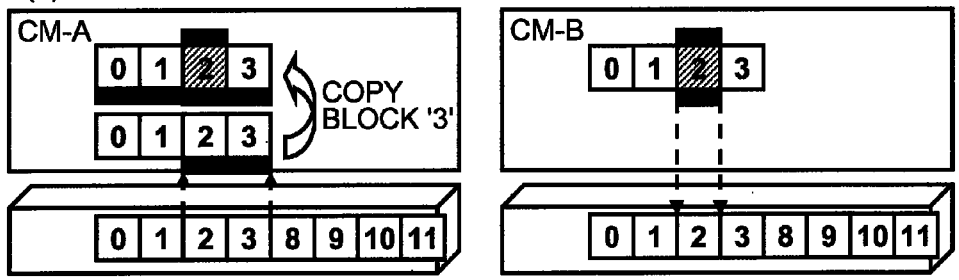
(3) DESTAGING
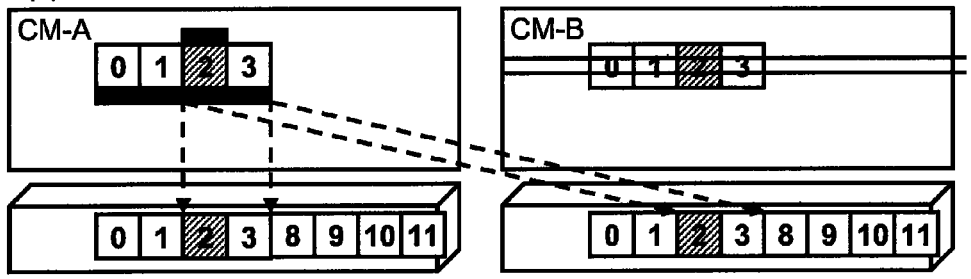

FIG. 25
(0) INITIAL STATE (BLOCKS 0, 1 STAGED BY READING)
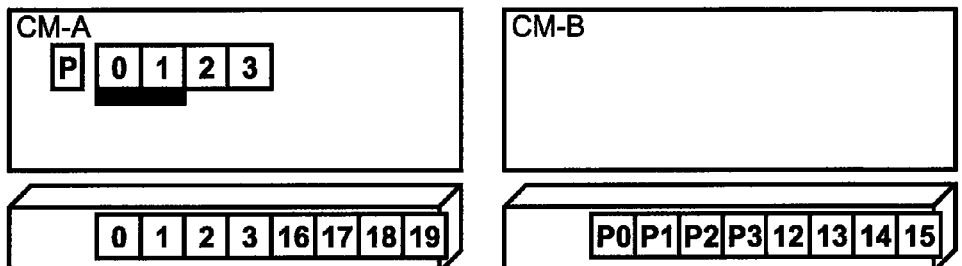
(1) AFTER WRITE REQUEST IS RECEIVED BY BLOCK 2 AND ACK IS RETURNED
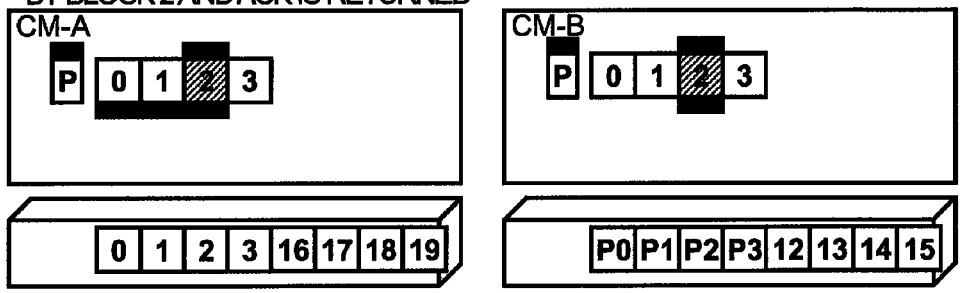
(2) READING OLD DATA AND OLD PARITY AND FORMING SDEV UNIT BLOCKS
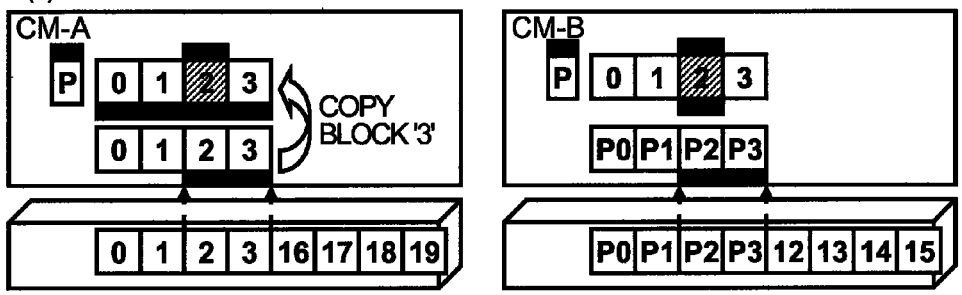
(3) AFTER CREATING PARITY IN CACHE
(NEW PARITY = XOR (NEW DATA, OLD DATA, OLD PARITY))
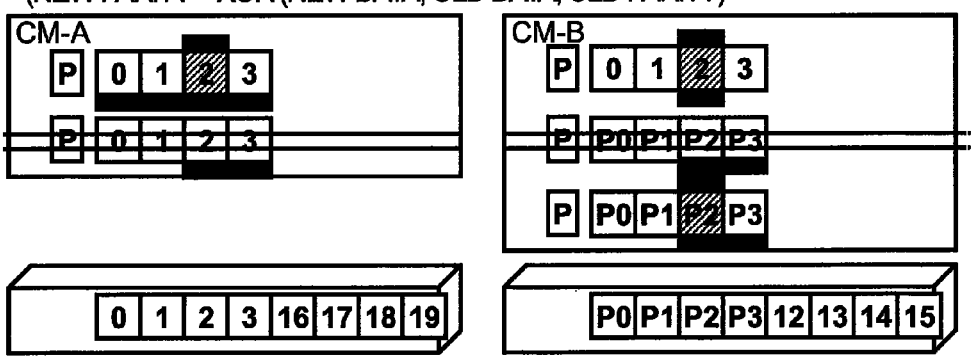

FIG. 26
(4) PARITY DESTAGING
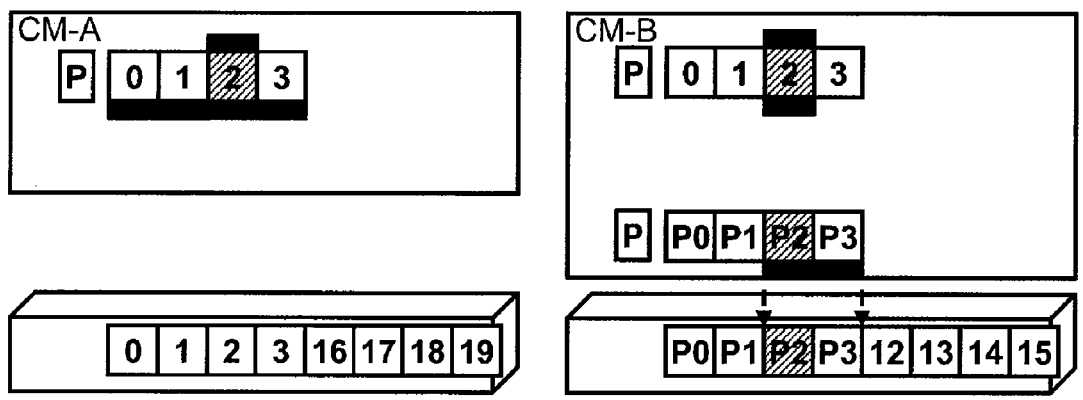
(5) DATA DESTAGING
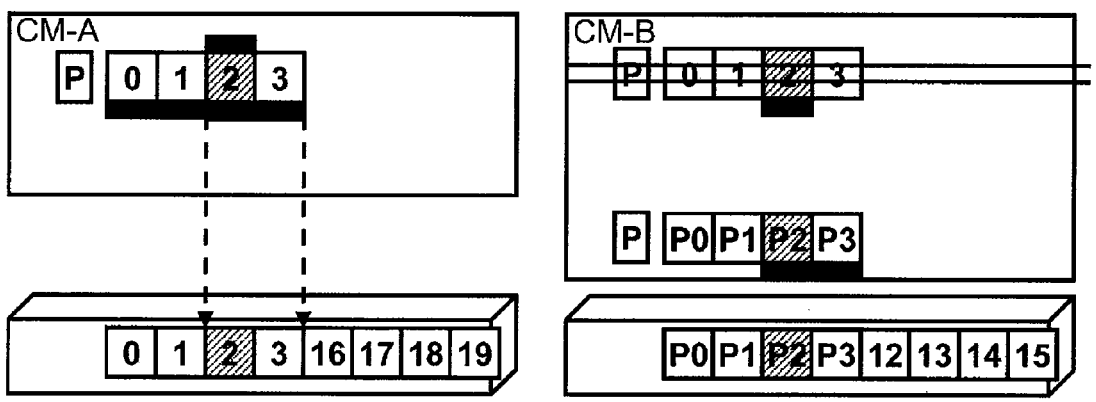

FIG. 28

| STORAGE ID | SDEV-ID | BLOCK. INFO. | EXTERNAL | WWN | LUN | TYPE | CAPA-CITY |
|---|---|---|---|---|---|---|---|
| STG1 | SDEV1 | NORMAL | NO | aa.. | 0 | FLASH | 200GB |
| STG1 | SDEV2 | NORMAL | NO | bb.. | 0 | FLASH | 200GB |
| STG1 | SDEV3 | NORMAL | NO | cc.. | 0 | FC | 500GB |
| STG1 | SDEV4 | BLOCKED | NO | dd.. | 0 | FC | 500GB |
| STG1 | SDEV5 | NORMAL | YES | RR.. | 1 | - | 100GB |
| STG1 | SDEV6 | NORMAL | YES | xx.. | 0 | - | |
| | | | | yy.. | 0 | | |
| STG2 | SDEV1 | NORMAL | NO | ee.. | 0 | FLASH | 200GB |
| STG2 | SDEV2 | NORMAL | NO | ff.. | 0 | FLASH | 200GB |
| STG2 | SDEV3 | NORMAL | NO | gg.. | 0 | SATA | 1000GB |
| STG2 | SDEV4 | NORMAL | NO | hh.. | 0 | SATA | 1000GB |
| STG2 | SDEV5 | NORMAL | YES | QQ.. | 1 | - | 200GB |
| STG3 | SDEV1 | NORMAL | NO | ii.. | 0 | SATA | 1000GB |
| STG3 | SDEV2 | NORMAL | NO | jj.. | 0 | SATA | 1000GB |
| STG3 | SDEV3 | NORMAL | NO | kk.. | 0 | SATA | 1000GB |
| | .. | .. | .. | .. | .. | .. | .. |

| STORAGE ID | PG-ID | BLOCK. INFO. | RAID LEVEL | NUM. OF SDEV | JOINED SDEV-ID |
|---|---|---|---|---|---|
| STG1 | PG1 | NORMAL | 1 | 2 | SDEV1, SDEV2 |
| STG1 | PG2 | NORMAL | 1 | 2 | SDEV3, SDEV4 |
| STG1 | PG3 | NORMAL | DUMMY | - | SDEV5 |
| STG1 | PG4 | BLOCKED | 0 | 1 | ... |
| STG2 | PG1 | NORMAL | 1 | 2 | SDEV1, SDEV2 |
| STG2 | PG2 | NORMAL | 1 | 2 | SDEV3, SDEV4 |
| STG2 | PG3 | NORMAL | DUMMY | - | SDEV5 |
| STG3 | PG1 | NORMAL | 5 | 3 | SDEV1, SDEV2, SDEV3 |
| ... | ... | | | | ... |

12060

| STORAGE ID | INTERNAL LU-ID | BLOCK INFO. | PG-ID | START ADDRESS | END ADDRESS | BLOCK SIZE |
|---|---|---|---|---|---|---|
| STG1 | I-LU1 | NORMAL | PG1 | 0 | 360M | 512B |
| STG1 | I-LU2 | NORMAL | PG2 | 0 | 400M | 512B |
| STG1 | I-LU3 | NORMAL | PG3 | 0 | 200M | 512B |
| STG1 | I-LUx | NORMAL | PGx | 100M | 300M | 512B |
|  |  |  | PGy | 0 | 200M |  |
| STG2 | I-LU1 | NORMAL | PG1 | 0 | 200M | 512B |
| STG2 | I-LU3 | NORMAL | PG3 | 0 | 400M | 512B |
| STG3 | I-LU1 | NORMAL | PG1 | 0 | 200M | 512B |
| STG3 | I-LU2 | NORMAL | PG1 | 200M | 600M | 512B |
| : | : | : | : | : | : | : |

| STORAGE ID | WWN | LUN | INTERNAL LU-ID |
|---|---|---|---|
| STG1 | PP.. | 0 | I-LU1 |
| STG1 | PP.. | 1 | I-LU3 |
| STG1 | QQ.. | 1 | I-LU2 |
| STG1 | QQ.. | 0 | I-LU1 |
| STG2 | RR.. | 1 | I-LU1 |
| STG2 | SS.. | 0 | I-LU3 |
| STG3 | TT.. | 0 | I-LU1 |
| .. | .. | .. | .. |

| STORAGE ID | WWN |
|---|---|
| STG1 | PP.. |
| STG1 | QQ.. |
| STG2 | RR.. |
| STG2 | SS.. |
| STG3 | TT.. |
| STG3 | UU.. |
| .. | .. |

| STORAGE ID | MANAGED ATTRIBUTE |
|---|---|
| STG1 | CLUSTER1 |
| STG2 | CLUSTER1 |
| STG3 | STANDALONE |
| STG4 | CLUSTER2 |
| STG5 | CLUSTER2 |
| STG6 | UNMANAGED |
| ... | ... |

CLUSTER STORAGE SETTING METHOD, SYSTEM, AND MANAGEMENT SYSTEM

TECHNICAL FIELD

The present invention relates to a cluster storage setting method, system, and management system and is suited for use in clustering of storage apparatuses equipped with a plurality of storage devices.

BACKGROUND ART

Since scalability of the storage capacity or performance can be secured, there is a technique for providing a large storage subsystem by clustering a plurality of storage nodes.

Patent Literature 1 discloses a technique for connecting storage areas, which are distributed at a plurality of storage nodes, as one storage area and having a host computer access such a storage area in a cluster configuration storage apparatus. Specifically speaking, this cluster configuration storage apparatus includes: a first storage node and second storage node, each of which has disks and a control processor for controlling input to, and output from the disks; and a host connection node for connecting the first storage node and the second storage node to a computer. The first storage node manages a first storage area existing in the first storage node and a second storage area existing in the second storage node as logical devices. If the host connection node receives an access request, which has identification information associated with the logical devices, from the computer, it sends the access request to the first storage node.

CITATION LIST

Patent Literature

PTL 1: Japanese Patent Application Laid-Open (Kokai) Publication No. 2005-165702

SUMMARY OF INVENTION

Technical Problem

The technique disclosed in Patent Literature 1 cannot construct a flexible storage subsystem by means of clustering because a network connecting the storage nodes is a closed network in the apparatus.

The present invention was devised in light of the circumstances described above and aims at suggesting a cluster storage setting method, system, and management system capable of constructing a flexible storage subsystem by means of clustering.

Solution to Problem

In order to solve the above-described problems, a storage cluster including a first storage apparatus and a second storage apparatus is defined according to the present invention. Communication between the first storage apparatus and the second storage apparatus uses a first network and an access request from a host computer uses a second network. Each of the first and second storage apparatuses defines internal LUs by using storage devices included in that storage apparatus. The first storage apparatus defines other internal LUs by using internal LUs of the second storage apparatus and the second storage apparatus defines other internal LUs by using internal LUs of the first storage apparatus.

Advantageous Effects of Invention

A flexible storage subsystem can be configured by means of clustering according to the present invention.

BRIEF DESCRIPTION OF DRAWINGS

FIG. 17 shows the content of LU path information.
FIG. 24 shows a flow of data between cache memories and storage devices when writing data.
FIG. 25 shows a flow of data between the cache memories and the storage devices when writing data.
FIG. 26 shows a flow of data between the cache memories and the storage devices when writing data.
FIG. 28 shows the content of management-side storage device information.
FIG. 29 shows the content of management-side parity group configuration information.

FIG. 31 shows the content of management-side LU path information.

FIG. 32 shows the content of management-side storage port information.

FIG. 33 shows the content of storage apparatus management attribute information.

DESCRIPTION OF EMBODIMENTS

An embodiment of the present invention will be explained in detail with reference to the attached drawings.

Embodiments of this invention will be hereinafter explained with reference to the attached drawings. It should be noted that information about this invention will be explained using expressions such as aaa Tables, aaa Lists, aaa DBs, and aaa Queues, but these pieces of information may be expressed by means of data structures other than tables, lists, DBs, and queues. Accordingly, information such as aaa Tables, aaa Lists, aaa DBs, and aaa Queues may be sometimes called aaa information in order to indicate that such information does not depend on the data structures. Moreover, expressions such as Identification Information, Identifier, Name, and ID are used when explaining the content of each piece of information, but they can be replaced with each other. Furthermore, the expression Information is used in order to indicate the data content, but other expression forms may be used.

The following explanation may be given by using the word Program as a subject. However, since a program is executed by execution of specified processing by a processor using a memory and a communication port (communication control device), the processor may be used as a subject in the explanation. Also, the processing disclosed by using a program as a subject may be processing executed by a computer or an information processing unit such as a management computer or a storage apparatus. Furthermore, part or all programs may be implemented by dedicated hardware. Various programs may be installed in each computer by means of a program distribution server or storage media.

Incidentally, the expressions Configuration and Setting are used to imply the same meaning in this specification. Similarly, the expressions Join aaa, Belong to aaa, and Included in aaa are used to imply the same meaning.

(1) First Embodiment

Configuration of Computer System

Figure 1:
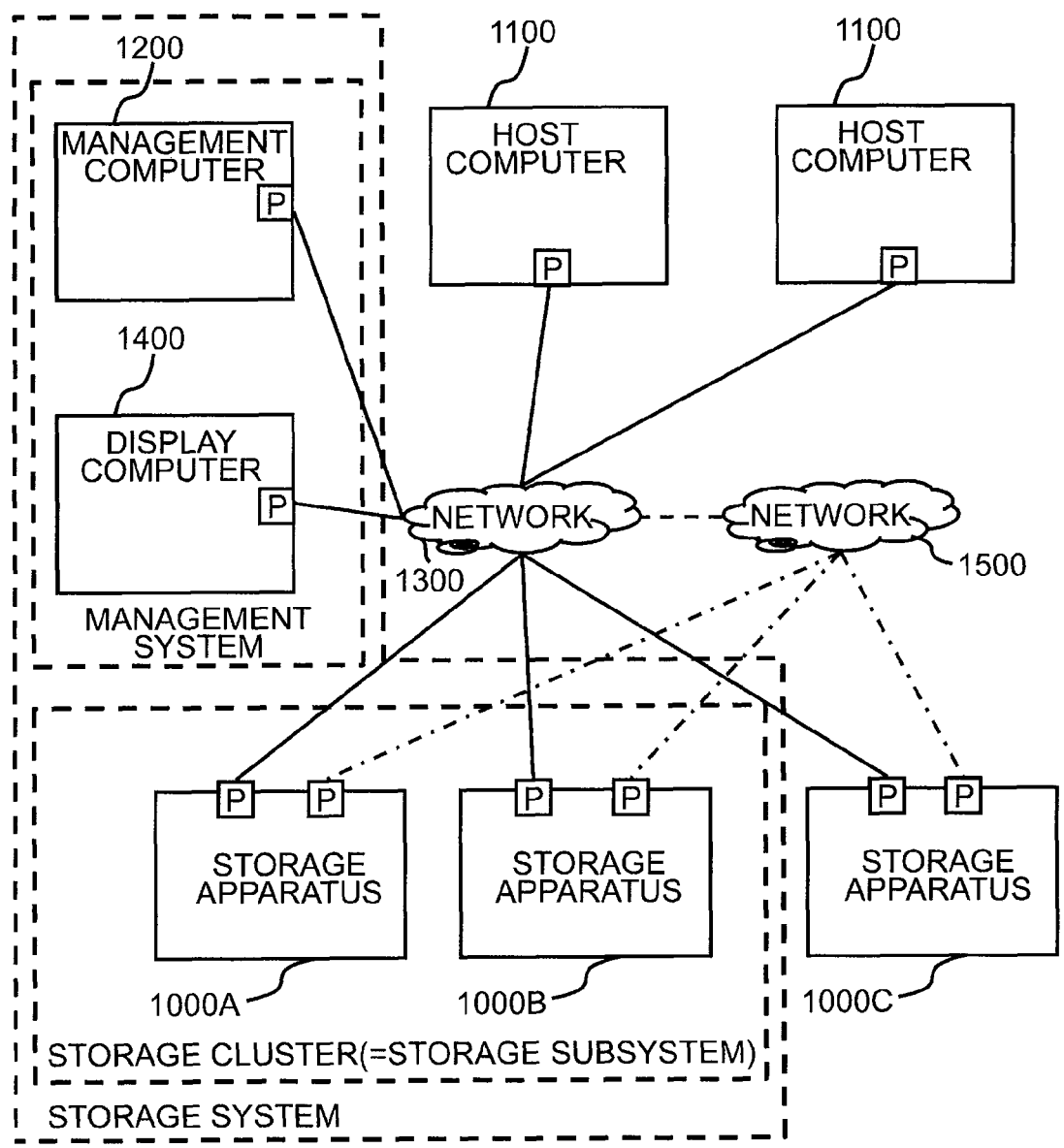
FIG. 1 shows the configuration of a computer system according to a first embodiment.

FIG. 1 shows an example of a hardware configuration of a computer system according to an embodiment of the present invention.

The computer system includes from, for example, a storage apparatus 1000, a host computer (hereinafter referred to as the host) 1100, a management computer 1200, and a display computer 1400. It should be noted that since each of the storage apparatus 1000, the host 1100, the management computer 1200, and the display computer 1400 has a processor and a memory, they are computers. The number of each type of computer may be one or more. Each computer is connected to a network 1300 via its port (abbreviated as P in the drawing). The storage apparatuses 1000 are connected via its port to a network 1500. Incidentally, the network 1500 and the network 1300 may be connected to form one network or may be separate networks.

A set of one or more computers for managing the computer system, displaying display information, or implementing management operation may be sometimes referred to as a management system in the following explanation. In the example shown in FIG. 1, a combination of the management computer 1200 and the display computer 1400 is the management system. If the management computer 1200 displays display information, the management computer 1200 is the management system. Furthermore, a plurality of computers may implement processing similar to that of the management computer in order to increase the speed of the management processing and enhance the reliability of the management processing. In this case, the plurality of computers (if the display computer is used to display information, the display computer is also included in the plurality of computers) is the management system.

A set of storage apparatuses 1000, which are managed as objects to be clustered, from among the plurality of storage apparatuses 1000 included in the computer system, may be sometimes referred to as a storage cluster or a storage subsystem. Also, a combination of the management system and the storage cluster may be sometimes referred to as a storage system. It should be noted that the whole or part of the network 1300 may be considered to be included in the management system, the storage cluster, or the storage system. The same applies to the network 1500. Furthermore, one storage cluster or a plurality of storage clusters may exist in the computer system.

Incidentally, it is favorable to have a network device which constitutes the network 1500 (hereinafter referred to as the second network device for the sake of convenience) meet at least one of the following conditions:

the second network device is a type of device that is also available from a vendor which is not a vendor of the storage apparatus 1000, and vendors other than that vendor;

the second network device is a commodity part;

the second network device is the same type of network device as that of the network device (hereinafter referred to as the first network device for the sake of convenience) that constitutes the network 1300 (or can typically constitute the network 1300); and the second network device is a network device in conformity with communication standards specified by a plurality of vendors.

Moreover, the number of the network devices constituting the network 1500 can be flexibly increased or decreased and the devices may also be replaceable. Furthermore, a connection relationship between cables connecting the network devices may be similarly changeable.

Similarly, it is favorable for the port of the storage apparatus to meet at least one of the following conditions:

the port can connect to the second network device which meets the above-mentioned conditions; and the port can connect to, and communicate with, the first network device before or after connecting to the second network device, that is, the port can also be used for communication with the network 1300.

Examples of the network 1300 are Ethernet and Fibre Channel. Examples of the network 1500 are Ethernet and Fibre Channel.

Incidentally, if the network 1300 fulfills the role of the network 1500, each storage apparatus 1000 may have one port.

It should be noted that the term clustering used in this specification means gathering a plurality of storage apparatuses and recognizing, accessing, and managing them as one virtual storage apparatus. However, since they are not physically one apparatus, it is unnecessary to have the plurality of storage apparatuses recognized as one storage apparatus in terms of all accesses and management and it is only necessary to emulate them as one storage apparatus during necessary processing for some accesses and management.

Outline of this Embodiment

Figure 2:
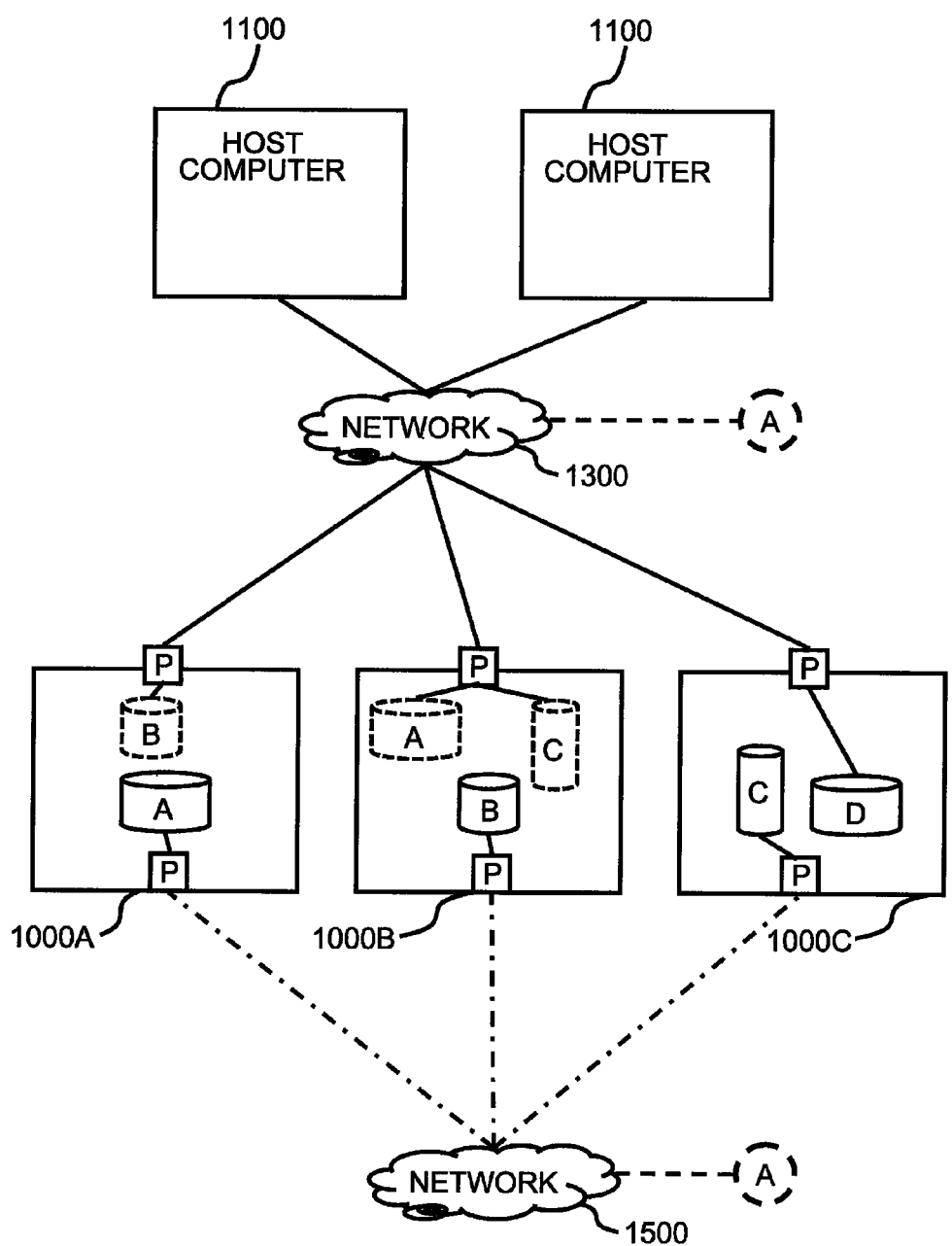
FIG. 2 shows the relationship between internal LUs and LUs in the computer system according to the first embodiment.

A storage cluster according to this embodiment provides a more flexible storage cluster by connecting storage apparatuses via the network 1500 as described above. FIG. 2 is a diagram explaining an example in which a plurality of storage apparatuses are gathered by means of clustering and recognized as a storage subsystem. Incidentally, storage apparatuses 1000A through 1000C are gathered to form a storage cluster in FIG. 2. Furthermore, the network 1300 and the network 1500 may be connected or not connected as described above.

Solid line cylinders drawn in the storage apparatus 1000 in FIG. 2 represent internal LUs and dotted line cylinders represent virtual LUs. It should be noted that in the case of the internal LUs, the details of which will be explained later, write data addressed to the internal LU is stored in storage devices (not shown in the drawing yet) included in the storage apparatus 1000. On the other hand, in the case of the virtual LUs, write data addressed to the virtual LUs is stored in storage devices included in another storage apparatus 1000. A solid line between the internal LU or the virtual LU and the port indicates that a definition enabling access from outside the storage apparatus 1000 (for example, the host 1100 or another storage apparatus 1000) via the relevant port to the relevant LU is set. Incidentally, the internal LU is a logical storage area to which a storage capacity for having the host 1100 or another storage apparatus 1000 access a logical unit (abbreviated as LU) in a SCSI command format is allocated, and which will be explained later in detail. Furthermore, the term access in this explanation includes at least read and write accesses, but does not necessarily include all types of accesses. For example, the above-mentioned phrase the Definition Enabling Access means that it is only necessary to enable at least either read access or write access. The same applies to an explanation using the expression other accesses.

A letter written inside a cylinder is information indicating a correspondence relationship between a virtual LU and an internal LU. For example, the storage apparatus 1000A provides a virtual LU B corresponding to an internal LU B defined in the storage apparatus 1000B and also provides an internal LU (not shown in the drawing) defined in the storage apparatus 1000A itself. The storage apparatus 1000B provides a virtual LU A corresponding to an internal LU A defined in the storage apparatus 1000A, a virtual LU C corresponding to an internal LU C defined in the storage apparatus 1000C, and an internal LU (not shown in the drawing) defined in the storage apparatus 1000B itself.

As a result of the above-described setting, the host 1100 can access data as follows:

the host 1100 can access data in the internal LU B for the storage apparatus 1000B via the virtual LU B which can be accessed via the port of the storage apparatus 1000A;

the host 1100 can access data in the internal LU A for the storage apparatus 1000A via the virtual LU A which can be accessed via the port of the storage apparatus 1000B;

the host 1100 can access data in the internal LU C for the storage apparatus 1000C via the virtual LU C which can be accessed via the port of the storage apparatus 1000B; and the host 1100 can access data in the internal LU D via the port of the storage apparatus 1000C.

It should be noted that one realization method for storing write data, which is addressed to the virtual LU provided by the storage apparatus 1000A, in the storage devices in the storage apparatus 1000B is as follows:

(A) the storage devices in the storage apparatus 1000B are used to form an internal LU;

(B) the created internal LU is made accessible via the port, so that the internal LU can be accessed from the storage apparatus 1000A by designating the identifier of that port and an LUN described later;

(C) a virtual LU corresponding to the internal LU is created in the storage apparatus 1000A by designating the identifier of the port and the LUN as the internal LU which can be accessed via the port in (B); and (D) the virtual LU created in (C) is made accessible via the port, so that the host 1100 can access the virtual LU by designating the identifier of the port and the LUN.

It should be noted that this method has, for example, one or more following advantages:

since the processing (B) is the same as processing for making access from the host, a development amount for clustering decreases; and the processing (C) can also be used for a volume virtualization function besides clustering. Incidentally, the volume virtualization function means a function that uses LUs provided by an inexpensive storage apparatus as storage areas for the storage apparatus 1000, so that the storage apparatus 1000 provides a storage function which the inexpensive storage apparatus cannot provide.

Incidentally, if such advantages are unnecessary, other identifiers capable of designating another storage apparatus 1000 and an internal LU may be used instead of the port identifier and the LUN in the processing (B) and (C).

Hardware Configuration

Hardware Configuration of Host

Figure 3:
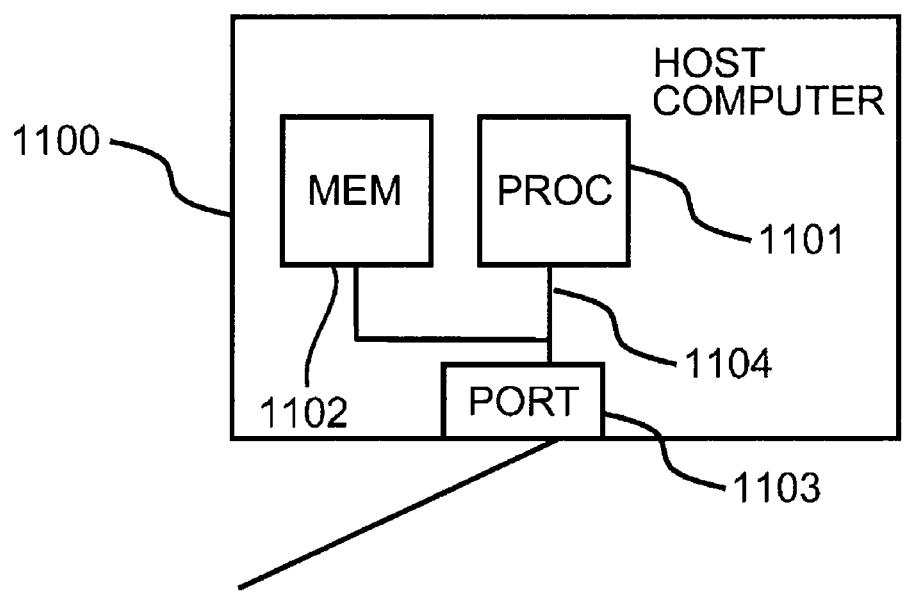
FIG. 3 shows a hardware configuration of a host computer.

FIG. 3 shows a hardware configuration of the host 1100. Incidentally, the host 1100 may be a computer accessing the storage apparatuses.

The host 1100 includes an internal host network 1104; and a processor 1101, a memory 1102, and a port 1103 are connected to the network 1104.

Hardware Configuration of Management Computer

Figure 4:
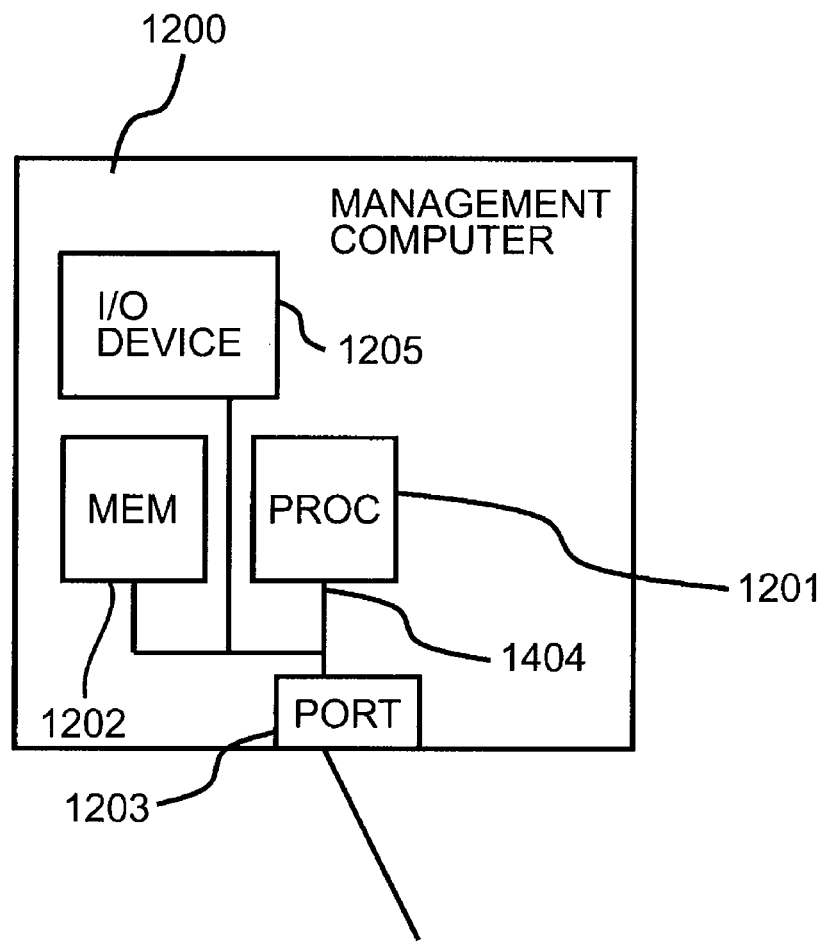
FIG. 4 shows a hardware configuration of a management computer.

FIG. 4 shows a hardware configuration of the management computer 1200.

The management computer 1200 includes an internal management computer network 12041; and a processor 1201, a memory 1202, a port 1203, and an input/output device 1205 (which is abbreviated as an I/O device in the drawing) are connected to that network 1204. Possible examples of the input/output device are a display, a keyboard, and a pointer device, but may include other devices. It should be noted that the input/output device 1205 may be omitted in the management computer 1200. Incidentally, an example of the memory 1202 is a semiconductor memory and/or a storage device.

It should be noted that the management computer 1200 can accept management operation from a user (for example, an operator of the management computer 1200, who may be sometimes simply referred to as the administrator) via the display computer 1400 and send a management operation request based on the accepted management operation to the storage apparatus 1000. The management operation request is a request for operation of the storage apparatus 1000, such as a parity group creation request, an internal LU creation request, and a path definition request. Each of such requests will be explained later.

Hardware Configuration of Display Computer

Figure 5:
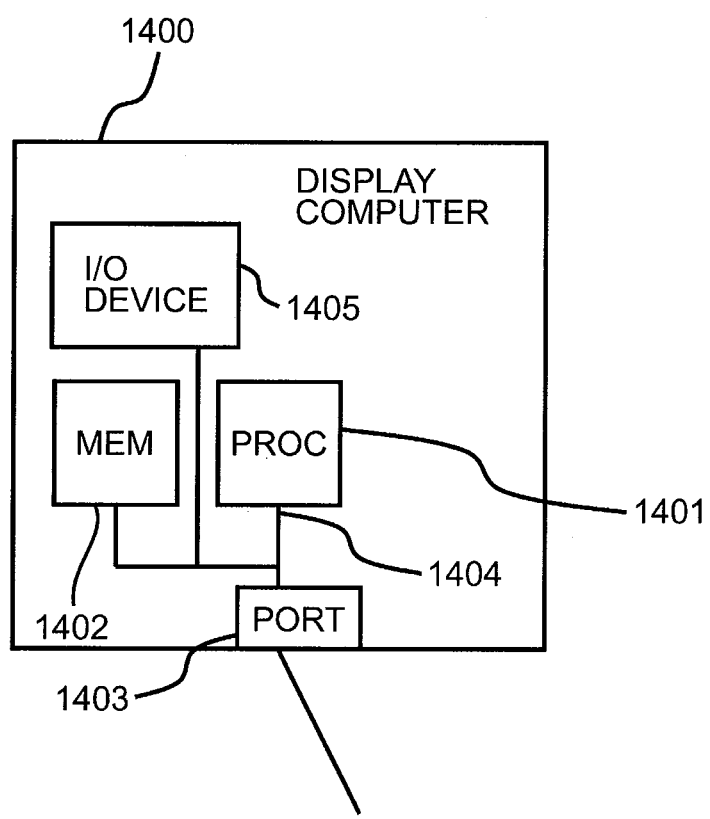
FIG. 5 shows a hardware configuration of a display computer.

FIG. 5 is a diagram showing a hardware configuration of the display computer 1400.

The display computer 1400 includes an internal display computer network 1404; and a processor 1401, a memory 1402, a port 1403, and an input/output device 1405 are connected to that network 1204. Possible examples of the input/output device are a display, a keyboard, and a pointer device, but may include other devices. Incidentally, an example of the memory 1402 is a semiconductor memory and/or a storage device.

Hardware Configuration of Storage Apparatus

Figure 6:
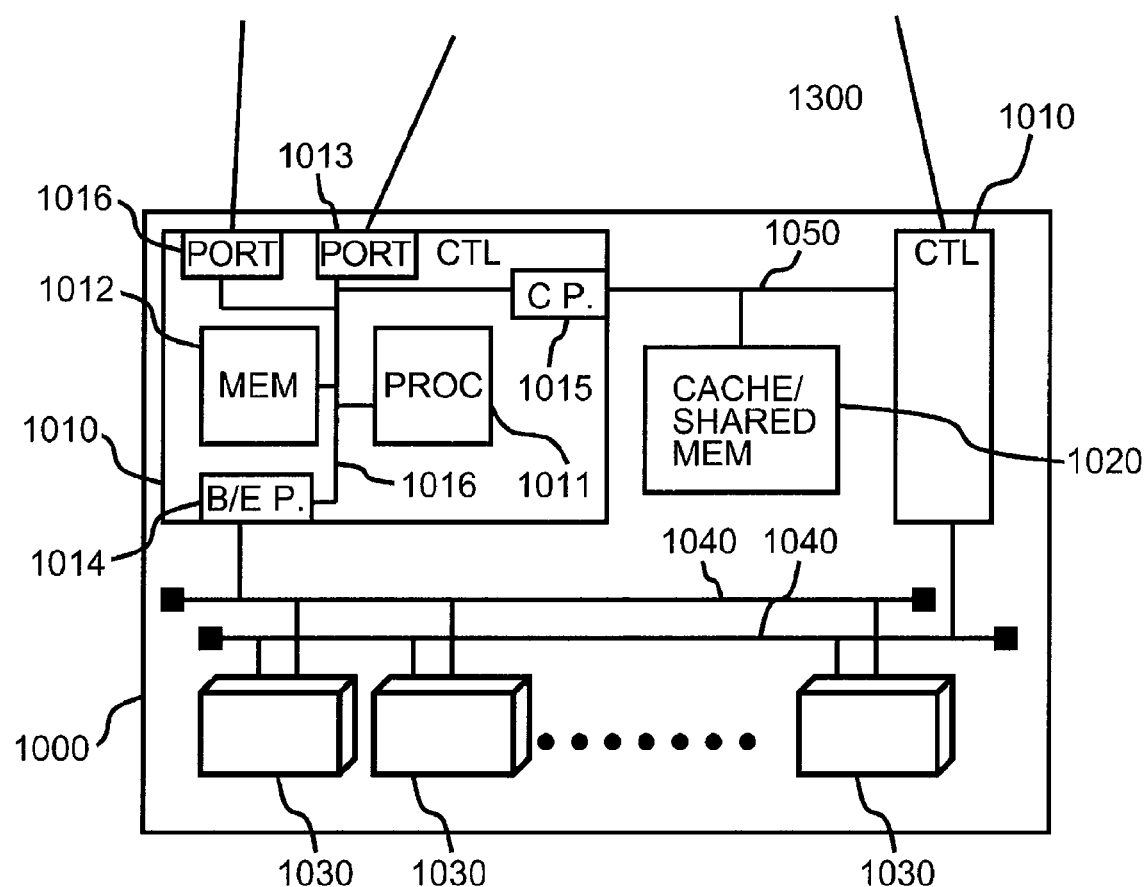
FIG. 6 shows a hardware configuration of a storage apparatus.

FIG. 6 shows a hardware configuration of the storage apparatus 1000.

The storage apparatus 1000 includes a controller 1010, a cache memory 1020, and a plurality of storage devices 1030. Any types of storage devices may be used as long as the storage devices 1030 store data sent from the controller 1010; and examples of the storage devices 1030 include HDDs and flash memories. A favorable access form of the storage devices 1030 is a block access form, but other forms may be used. The storage devices may be sometimes abbreviated and referred to as the SDEV in this explanation.

A plurality of controllers 1010 are shown in the drawing, but there may be one controller 1010. It should be noted that if there is one controller 1010, the role of the cache memory 1020 may be integrated with that of the memory 1012 described later. Incidentally, an typical example of the storage devices 1030 may be devices that can be pulled out of, and inserted into, a storage apparatus as maintenance spares, or may not be such devices. It would be favorable to have each of the controller 1010 and the cache memory 1020 constituted from a plurality of components. This is because even if a failure occurs in a single component and that component is blocked (meaning that it has become no longer available), the remaining components are used so that they can continue receiving access requests represented by read and write access requests.

The controller 1010 is a device (for example, a circuit board) for controlling the operation of the storage apparatus 1000. The controller 1010 includes an internal network 1017; and an access port 1013, a cache port 1015, a management port 1016, a backend port 1014, a processor (for example, CPU) 1011, and a memory 1012 are connected to that network 1017. The controllers 1010 and the cache memory 1020 are connected to each other via an internal storage network 1050. Also, the controller 1010 and each storage device 1030 are connected to each other via a plurality of backend networks 1040. Incidentally, connection media and protocols introduced with regard to the access network 1300 may be used for the backend networks, but other media and protocols such as SAS, SATA, or PCI-Express may be used for the backend networks.

It should be noted that the internal networks for the host 1100 and the storage apparatus 1000 should preferably be a wider band than a transfer band of the access port 1013 and whole or part of the internal networks may be replaced with bus or switch-type networks. FIG. 6 shows one access port 1013 existing in the controller 1010, but in fact a plurality of access ports 1013 may exist in the controller 1010.

The above-described hardware configuration enables the host 1100 to read or write all or part of pieces of data stored in the storage devices 1030 of the storage apparatus 1000 and enables the management computer 1200 to manage the computer system.

Information and Programs

Information and Programs of Host

Figure 7:
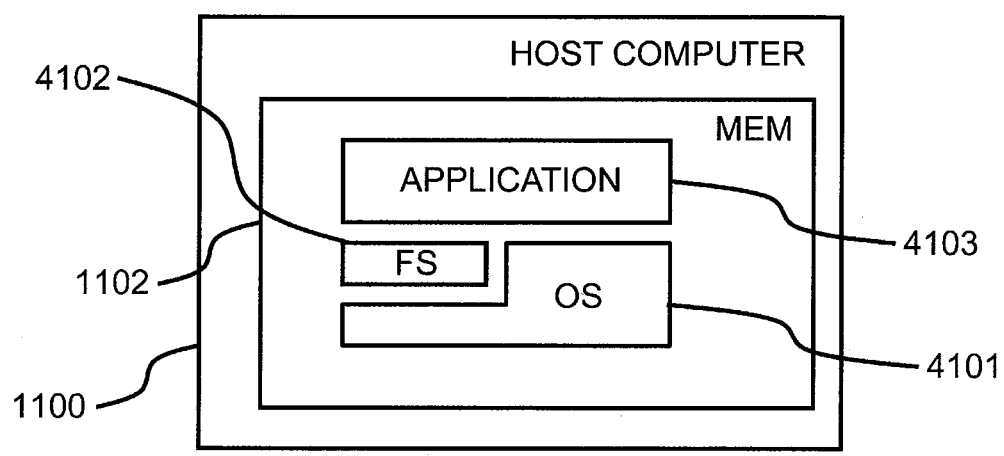
FIG. 7 shows programs stored in a memory for the host computer.

FIG. 7 shows computer programs and information stored in the host 1100.

The memory 1102 for the host 1100 stores an OS 4101, a file system (indicated as FS in the drawing) 4102, and an application program (hereinafter abbreviated as the application) 4103. The processor 1101 executes these programs.

The application 4103 is a program (for example, a Web server program or a database management program) for reading data from, or writing data to, files and the like by requesting processing by the OS 4101 and the file system 4102 and performing, for example, business operation processing in response to requests from the user and other computers.

The OS 4101 sends an access request, which is issued from the application 4103 or the file system 4102, to the access port 1013 of the storage apparatus 1000. The OS 4101 also receives data, for which the access request has been made, from the storage apparatus 1000.

The file system 4102 can convert an access request in a file format from the application 4103 to an access request in a block format or an access request in a network file system protocol format and request that the OS 4101 transfer the access request. Incidentally, the OS 4101 and the file system 4102 may include processing other than that described above.

It should be noted that programs other than those described above may be executed in the host 1100. Also, the host 1100 may send or receive database queries and CKD-format requests other than the block access requests and the file access requests. The programs including the OS and the file system executed in the host 1100 and the controller 1010 may have all or part of the processing implemented by hardware.

Information and Programs of Storage Apparatus

Figure 8:
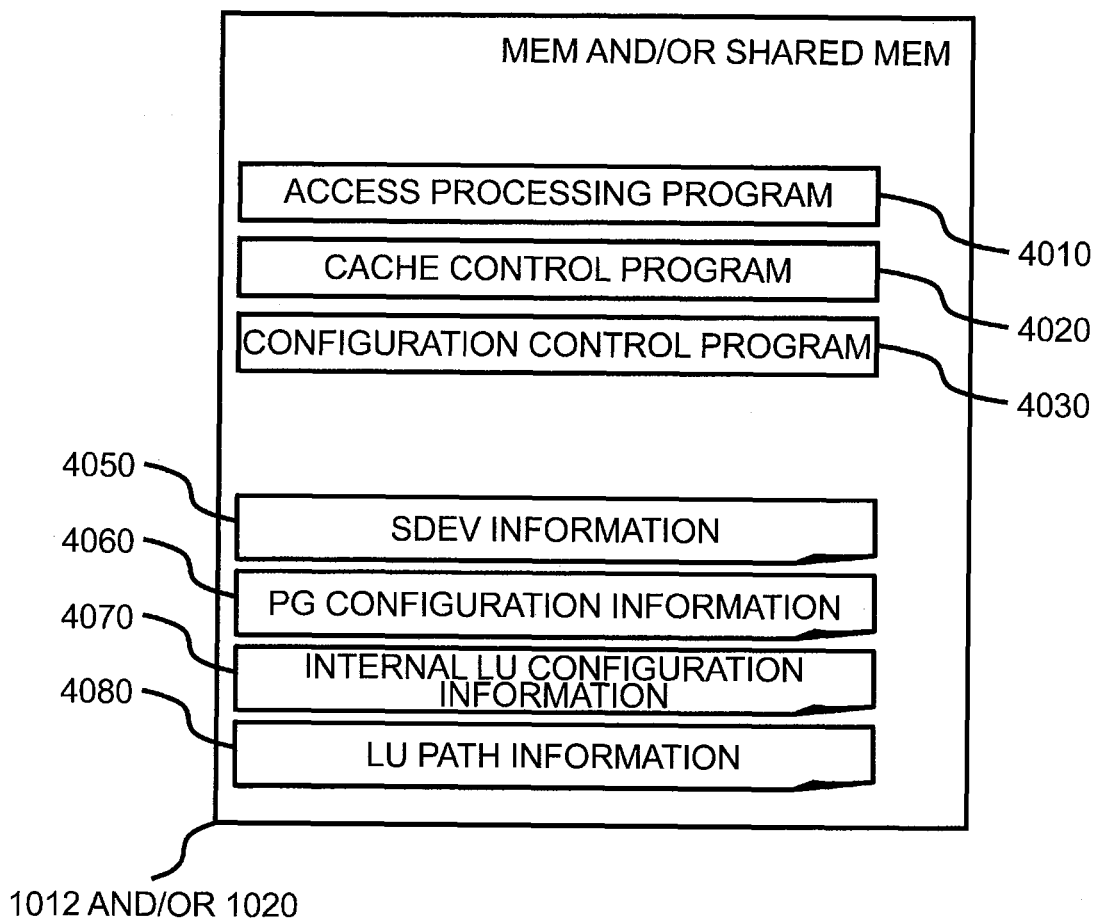
FIG. 8 shows information and programs stored in a memory and/or a cache memory for the storage apparatus.

FIG. 8 shows information and programs stored in the memory 1012 and/or the cache memory 1020.

The memory 1012 and/or the cache memory 1020 stores storage device information (indicated as SDEV information in the drawing) 4050, PG configuration information 4060, internal LU configuration information 4070, LU path information 4080, an access processing program 4010, a cache control program 4020, and a configuration control program 4030. Incidentally, part or all pieces of information stored in the controller 1010 may be retained in an area outside the controller 1010 within the storage apparatus 1000 (for example, the cache memory 1020 or some storage devices 1030).

The access processing program 4010 receives an access request (for example, a read request or a write request) and executes processing in accordance with the access request. Specifically speaking, for example, the access processing program 4010 transfers data stored in the cache memory 1020 (read target data according to the read request) to the host 1100 and stores data received from the host 1100 (write target data according to the write request) in the cache memory 1020. Incidentally, if the access request from the host 1100 is in the block access format, the access processing program 4010 can execute processing for providing access target LUs. Furthermore, if the access request from the host 1100 is in the file format, the access processing program 4010 can execute processing for providing access target files and directories. Incidentally, the access processing program 4010 may execute necessary processing for providing access by any means other than the above-mentioned access request (for example, a database query or a CKD-format access request).

The cache control program 4020 can copy data stored in the storage devices 1030 to the cache memory 1020 in conjunction with the access processing program 4010 or autonomously (such copying including migration). The cache control program 4020 may further create and/or update, for example, redundant data represented by the RAID from data stored in the cache memory 1020 as processing for enhancing reliability.

Incidentally, the cache control program 4020 can execute the above-described processing also on LUs provided by another storage apparatus 1000 instead of the storage devices 1030 included in its own storage apparatus 1000.

The configuration control program 4030 can execute processing for referring to and/or updating at least one of the storage device information 4050, the PG configuration information 4060, the internal LU configuration information 4070, and the LU path information 4080 in response to a configuration change and/or configuration reference request. The configuration change and/or configuration reference request is issued from, for example, at least one of the management computer 1200, the host 1100, and other computers. Incidentally, the configuration control program 4030 receives other requests from the management computer 1200 described later and responds to such requests.

The storage device information 4050 includes information about the storage devices 1030. The PG configuration information 4060 includes configuration information about parity groups (hereinafter sometimes abbreviated as PG). The internal LU configuration information 4070 includes information to configure part or all the storage devices included in a parity group as internal logical units (hereinafter referred to as the internal logical unit or the internal LUs). The LU path information 4080 includes information indicating a correspondence relationship between the internal LUs and LUs provided by the access port 1013 to the host 1100 (hereinafter sometimes referred to as the LU path definition). It should be noted that the following explanation about the internal LUs will be focused on a case where the internal LUs do not extend across a plurality of parity groups, but the present invention is not limited to such a case. The internal LUs may be configured across a plurality of parity group areas by means of concatenation and striping.

The internal LUs are logical existence prepared for a case where a plurality of ports are associated with one storage area or a case where the storage area has, even temporarily, no association with all the ports. Furthermore, if a request inquiring about the capacity or block size for a logical unit is received from the host 1000 or the management computer 1200, the controller 1010 may send the capacity or block size of the internal LU corresponding to the logical unit designated by the inquiry request. Similarly, a request inquiring about an identifier of a logical unit is received from the host 1000 or the management computer 1200, the controller 1010 may send a value based on the LUN assigned to the logical unit and send a value based on the identifier of the internal logical unit corresponding to the logical unit.

Incidentally, at least one of more, or all the storage device information 4050, the internal LU configuration information 4060, the internal LU configuration information 4070, and the LU path information 4080 will be sometimes collectively referred to as the storage configuration information. The storage configuration information may include other information. The storage configuration information stores information about the storage devices 1030, the parity groups, the internal LUs, and the LUs as well as a mutual relationship between them, the details of which will be explained below.

Information and Programs of Management Computer

Figure 9:
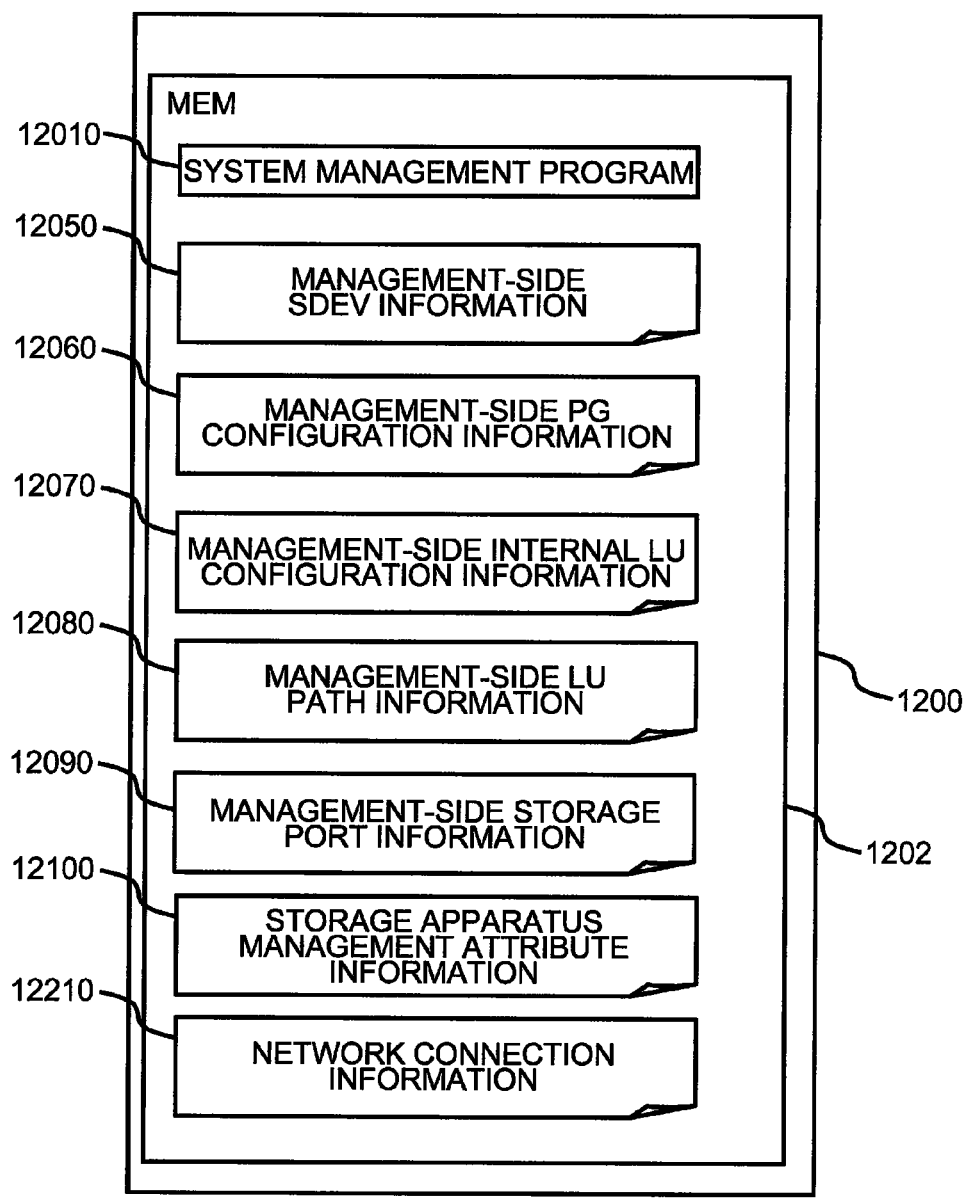
FIG. 9 shows information and programs stored in a memory for the management computer.

FIG. 9 shows computer programs and information stored in the memory 1202 for the management computer 1200.

The memory 1210 stores a system management program 12010, management-side storage device information 12050, management-side PG configuration information 12060, management-side internal LU configuration information 12070, management-side LU path information 12080, management-side replacement candidate storage device information 12090, surplus capacity policy information 12100, and logical unit operation information 12110. Incidentally, the memory 1202 may store data other than those listed above or omit part of the above-listed information.

The system management program 12010 is a program for managing the storage apparatus 1000 or the host 1100.

The management-side storage device information 12050 stores information about the storage devices 1030 installed in the storage apparatus 1000.

The management-side PG configuration information 12060 stores information about parity groups defined in the storage apparatus 1000.

The management-side internal LU configuration information 12070 stores information about internal LUs defined in the storage apparatus 1000.

The management-side LU path information 12080 stores information about logical units defined in the storage apparatus 1000.

The management-side storage port information 12090 stores information about ports of the storage apparatus 1000.

The storage apparatus management attribute information 12100 stores management attributes of the storage apparatus 1000.

The network connection information 12210 stores a connection relationship between the ports of the host 1100 and the ports of the storage apparatuses. The system management program 12010 receives connection information from devices constituting the network 1200, definition information about the host 1100, and/or connection information from the storage apparatus 1000, and repeats creating or updating the content of the network connection information 12210.

Incidentally, the management computer 1200 may store the system management program 12010 in the memory 1210 by using media such as CD-ROMs. Also, the management computer 1200 may store the system management program 12010, which is distributed from a distribution computer (not shown in the drawing), in the memory 1210 or store the system management program 12010 in the memory 1210 by executing an installation program distributed from the distribution computer.

It should be noted that at least one or more, or all the management-side storage device information 12050, the management-side internal LU configuration information 12060, the management-side internal LU configuration information 12070, the management-side LU path information 12080, the management-side storage port information 12090, and the storage apparatus management attribute information 12100 will be sometimes collectively referred to as the management-side storage configuration information. The management-side storage configuration information may include other information. The management-side storage configuration information stores information about the storage devices 1030, the parity groups, the internal LUs, and the LUs as well as a mutual relationship between them, the details of which will be explained below.

Information and Programs of Display Computer

Figure 10:
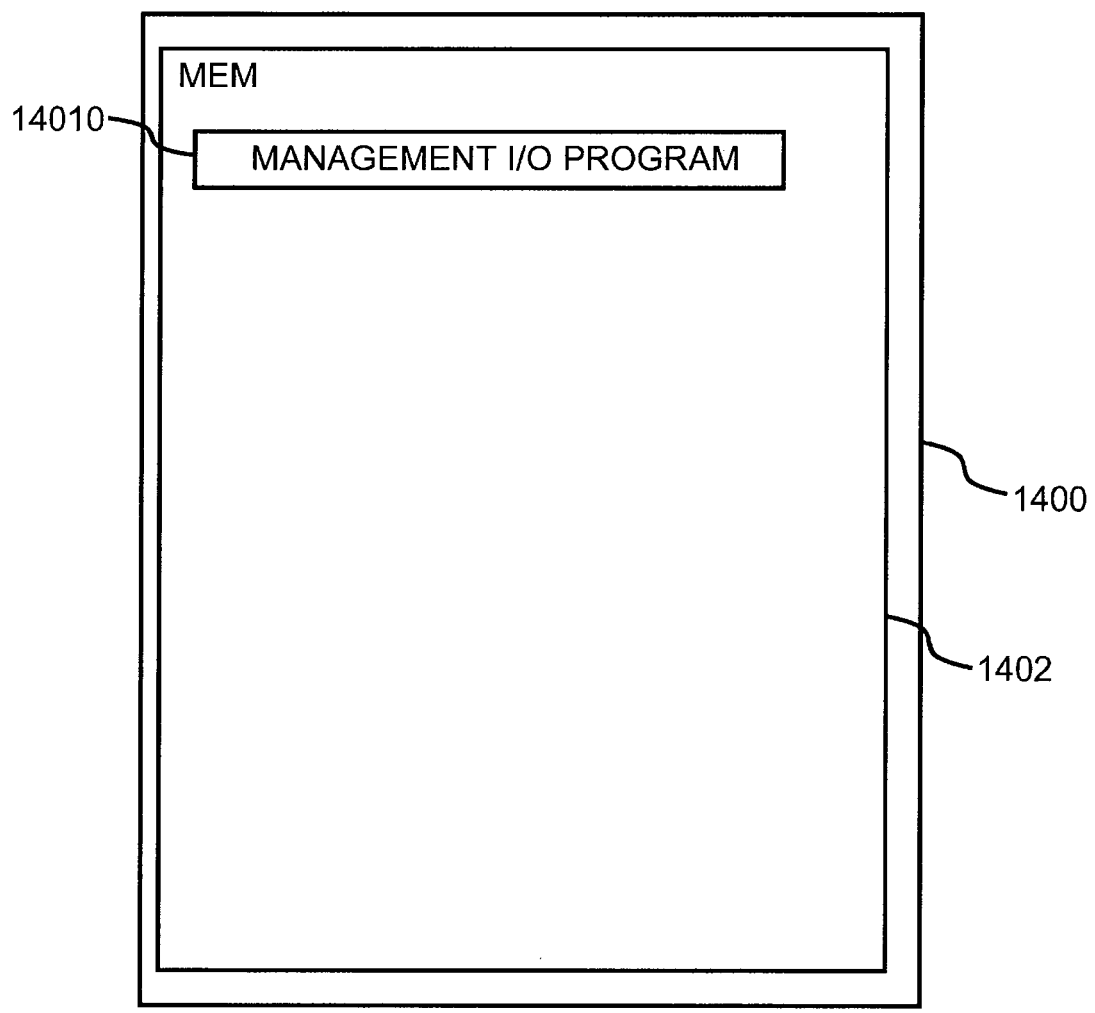
FIG. 10 shows programs stored in a memory for the display computer.

FIG. 10 shows a computer program and information stored in the memory 1402 for the display computer 1400.

A management I/O program 14010 displays management information on the input/output device 1405 in accordance with display information sent from the management computer 1200 and sends management operation for the input/output device 1405 as operation content information to the management computer 1200. Incidentally, the management I/O program 14010 may be a program downloaded from the management computer 1200 and stored in the memory 1402. Similarly, the management I/O program 14010 may execute processing for part of the programs executed by the management computer 1200. In this case, part of the information stored in the management computer 1200 may be stored in the memory 1402.

When the system management program 12010 for the management computer 12000 has the management I/O program 14010 for the display computer 1400 display a screen on the input/output device 1405, the simplest way to realize the screen display would be for the system management program 12010 to send a screen image as display information and for the management I/O program 14010 to obtain the screen image from the display information and display it on the input/output device 1405. However, if the management I/O program is highly-functional, it might be better to send character codes as the display information rather than sending character images. The same can be said for graphics such as lines, quadrangles, and circles.

Another example in which the highly-functional management I/O program 14010 is used may be a program having a function that incorporates a unique data structure for the management I/O program 14010 to receive the display information, and information about the received data structure into a display component of the management I/O program 14010 and displays such unique data structure and the information about it. An example of the display component is a table for displaying information in a list format. When the management I/O program 14010 receives the data structure sent as the display information from the system management program 12010, the management I/O program applies the received information to its table format and displays it on the screen for the input/output device 1405.

In addition, the management I/O program 14010 may act in place of the system management program 12010 to execute general processing which is generally used. An example of the general processing is processing for sorting the above-mentioned table. Specifically speaking, when the management I/O program 14010 receives a sorting instruction from outside with regard to the table for displaying the data structure information received from the system management program 12010, the management I/O program 14010 may execute processing for sorting the information and displaying the result on the table again.

Therefore, any type of information and processing may be used as the display information and the management I/O program 14010 according to this embodiment as long as the information which the system management program 12010 intends to display can be displayed by the management I/O program 14010 on the input/output device 1405.

Similarly, any type of information may be used as operation information (information sent from the management I/O program 14010 to the system management program 12010) and any type of processing may be used as the management I/O program 14010 as long as the user input and operation received by the input/output device 1405 can be delivered from the management I/O program 14010 to the system management program 12010.

It should be noted that there may be a case where the concept of parity groups does not exist, depending on embodiments of the storage apparatuses. The present invention can be also applied to such a case. This is because it is only necessary to read the processing relating to the parity groups as processing relating to the storage devices. Similarly, there may be a case where the concept of internal LUs does not exist, depending on embodiments of the storage apparatuses. The present invention can be also applied to such a case. Specifically speaking, it is only necessary to replace the internal LUs in explanations with the logical units.

Description of Block Size

Figure 11:
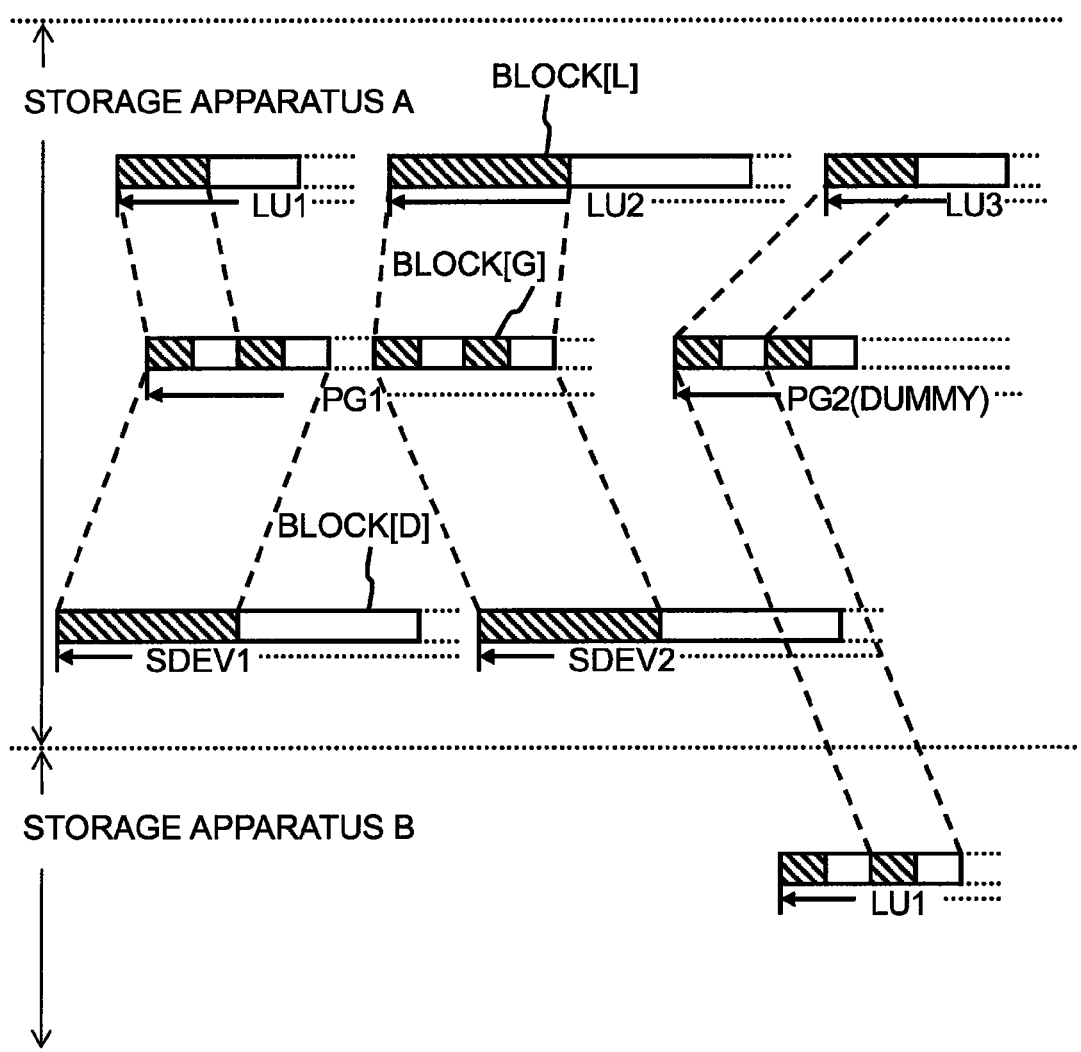
FIG. 11 shows an example of a block size relationship in storage apparatuses.

Before proceeding to any further explanations, the block size according to this embodiment will be explained with reference to FIG. 11. In this embodiment, address spaces (each of which, to be exact, indicates an identifier of the relevant device and an address space in the device) are classified into four layers as described below and different block sizes may be used for these layers or the same block size may be used for these layers.

(Layer 1) An address space to be used when accessing LUs of another storage apparatus.

(Layer 2) An address space to be used when accessing the storage devices 1030. When this layer is specified in the following explanation, [D] may be attached to the end of the relevant word.

(Layer 3) An address space allocated to a parity group in order for the controller 1010 to manage data in the cache memory 1020. In this embodiment, it is possible that the storage devices 1030 of various block sizes may be connected to the controller 1010. So, the controller 1010 can allocate an address space of a specified block size (for example, 512 bytes which is the most generally used minimum block size in SCSI) to a parity group so that the above-mentioned various block sizes do not have to be considered as little as possible for I/O processing and cache control processing. For this purpose, conversion of the block size at the time of staging and destaging processing for copying data between the cache memory 1020 and the storage devices 1030 are performed. When this layer is specified in the following explanation, [G] may be attached to the end of the relevant word.

(Layer 4) An address space to be used when accessing LUs (or internal LUs described later). Since LUs of block size other than the 512-byte block size may be sometimes provided to the host 1100, a block size different from that of a cache level is used. When this layer is specified in the following explanation, [L] may be attached to the end of the relevant word.

It should be noted that each block in Layer 1 to Layer 4 may include control data or a redundancy code (for example, the controller 1010 issues an I/O request in order to store the redundancy code, together with data, in a block [D] of the storage device 1030).

Incidentally, since an LU of another storage apparatus 1000 is recognized as a storage device to perform cache control according to this embodiment, a dummy parity group is defined for the relevant LU for the sake of convenience to perform addressing. However, if the LU of another storage apparatus 1000 can be used as whole or part of an LU provided by its own storage apparatus, it is unnecessary to use the dummy parity group.

Information Managed in Storage Apparatus

Figure 40:
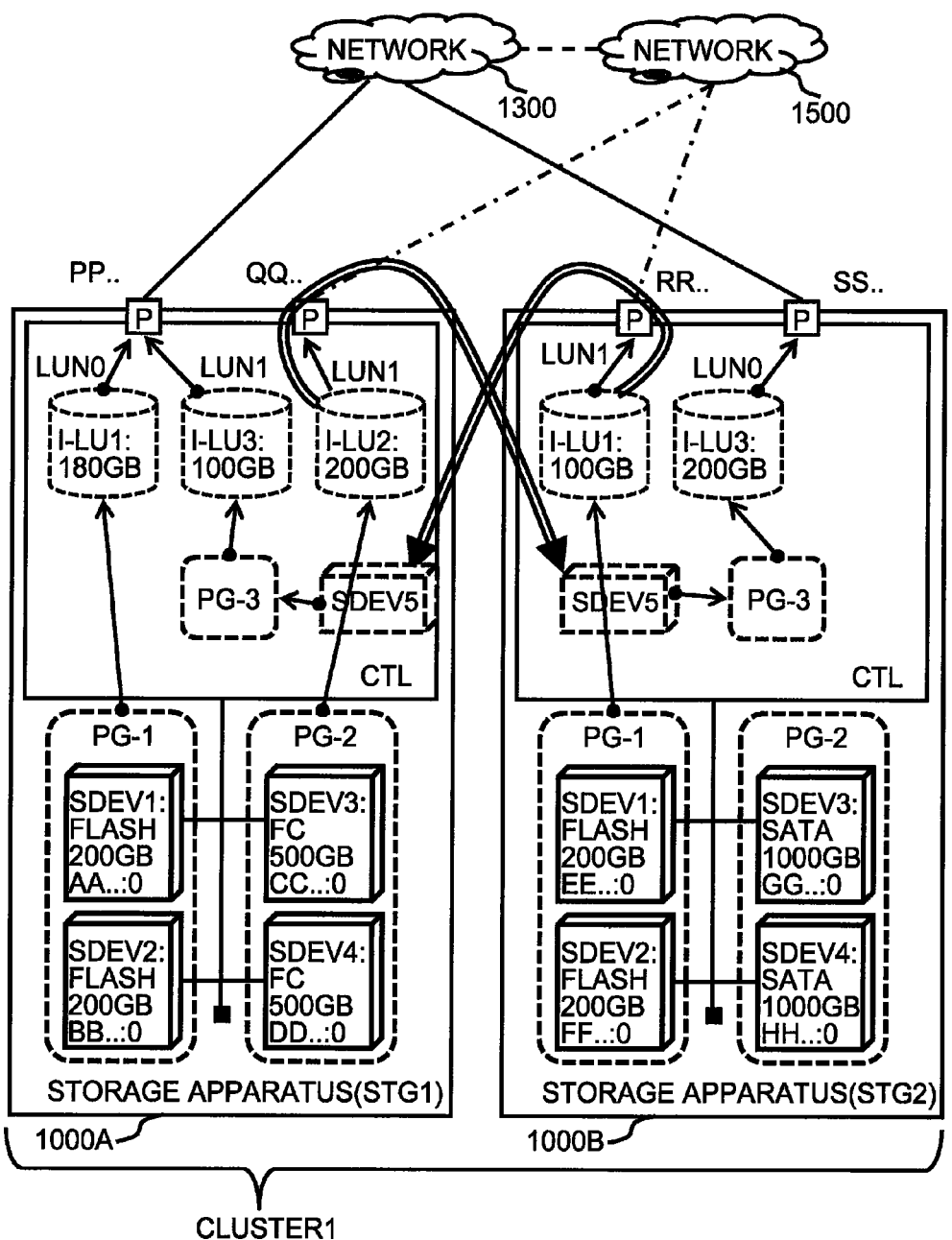
FIG. 40 shows a configuration example for a storage system.
Figure 41:
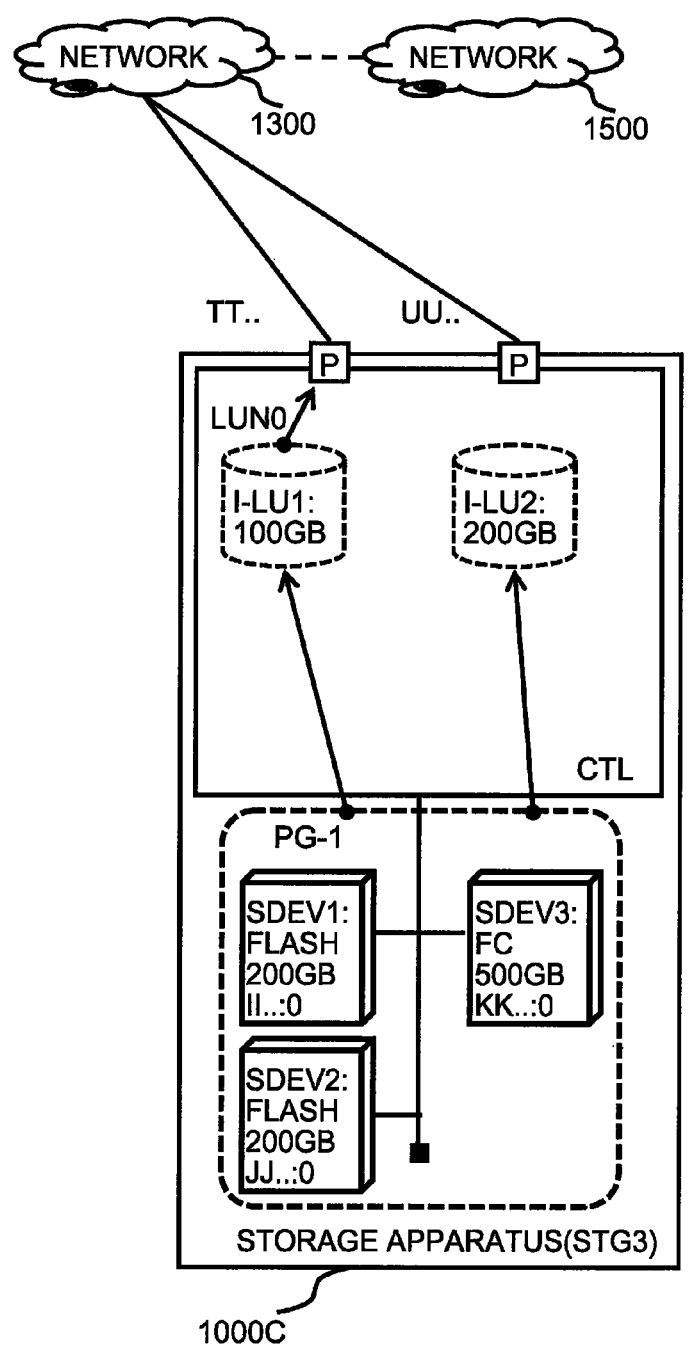
FIG. 41 shows a configuration example for a storage system.

Information managed in the storage apparatus 1000 will be explained below. Incidentally, values exemplified in diagrams for each piece of information are values based on the assumption that particularly the storage apparatus 1000A is used in the configuration shown in FIG. 40 and FIG. 41. However, the examples also include values other than this configuration.

Storage Device Information

Figure 12:
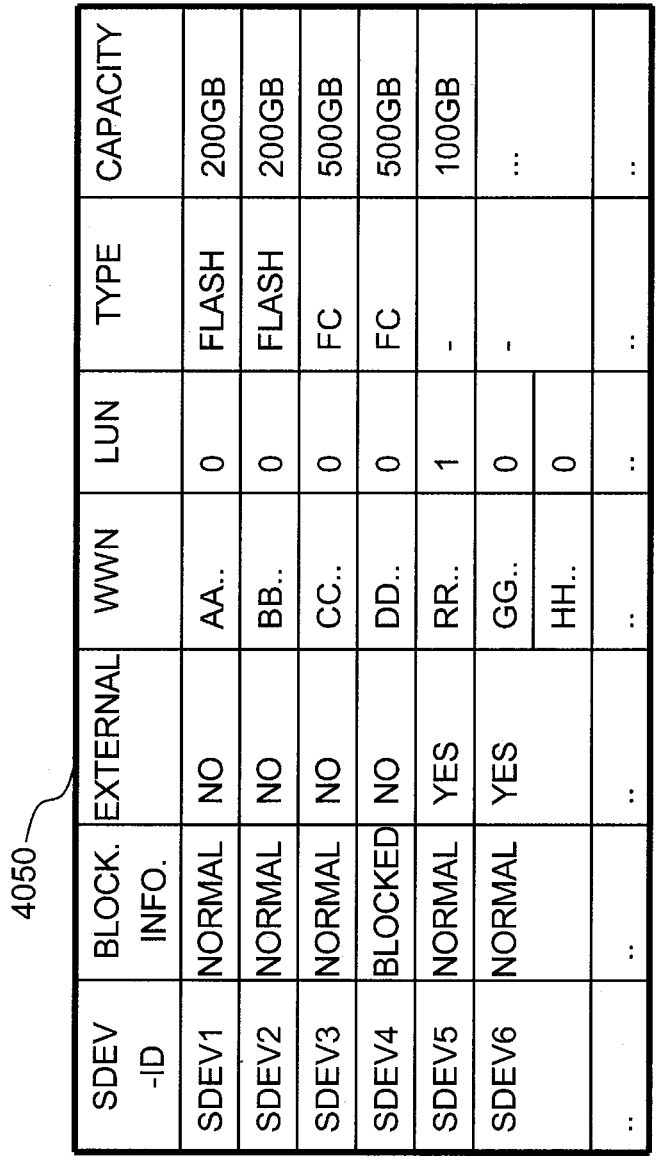
FIG. 12 shows the content of storage device information.

FIG. 12 shows an example of the storage device information 4050 stored in the controller 1010.

The storage device information 4050 has the following information (H1) to (H6) with regard to each identifier of the storage device 1030 corresponding to each storage device 1030.

(H1) Blockage Information

The blockage information becomes a blocked state when the relevant storage device cannot be used; otherwise, the blockage information becomes a normal state. Incidentally, examples of the circumstance where the relevant storage device cannot be used are a hardware failure and a case where the storage device 1030 is pulled out.

(H2) External Flag

If the storage device corresponding to the storage device identifier is an LU of another storage apparatus, the external flag is Yes; and if the storage device corresponding to the storage device identifier is a storage device 1030 included in its own storage apparatus, the external flag is No.

(H3) WWN (World Wide Name)

A necessary Fibre Channel communication identifier to access the storage device 1030. If the external flag is No, the relevant WWN is a WWN of a storage device included in its own apparatus; and if the external flag is Yes, the relevant WWN is a WWN of a port of another storage apparatus. Incidentally, since the port number (which may be sometimes called the port ID) is created from the WWN and that value is used to perform communication according to the actual Fibre Channel, the port number may be registered in this column. Furthermore, besides the port number, another identifier used for the controller 1010 to communicate with the storage device 1030 (for example, an IP address, a TCP/IP port number, iSCSI name, and so on) may substitute for the WWN. Similar substitutes may be hereinafter used for the WWN.

(H4) LUN (Logical Unit Number)

If the storage device provides only one logical unit, this LUN column may be omitted. On the other hand, if the external flag is Yes, the relevant LUN is an LUN of a port indicated in (H3) for another storage apparatus. If it is apparent that the storage device 1030 responds to only a fixed LUN, this entry may be omitted.

(H5) Storage Device Type

Information indicating the storage device type, for example, whether the relevant storage device is a SATA drive, a flash drive, or a Fibre Channel (FC) drive, is stored in this column. If the external flag is Yes, the content of this column may be omitted.

(H6) Providing Capacity of Storage Device

This value may be obtained by the controller 1010 inquiring about the relevant storage device, but other methods may be used to obtain this value.

Incidentally, a plurality of combinations of WWNs and LUNs may exist with regard to one storage device (for example, a case of SDEV6). This case means that there are a plurality of communication paths between the controller 1010 and the storage device 1030 (or an LU of another storage apparatus).

It should be noted that information indicating a physical location of each storage device 1030 mounted in the storage apparatus may be included in the storage device information 4050 although such information is not described in the drawing.

Incidentally, the virtual LUs used in the explanation of FIG. 2 are LUs defined based on the LUs of another storage apparatus that can be accessed using the WWN and LUN whose external flag is ON.

PG Configuration Information

Figure 13:
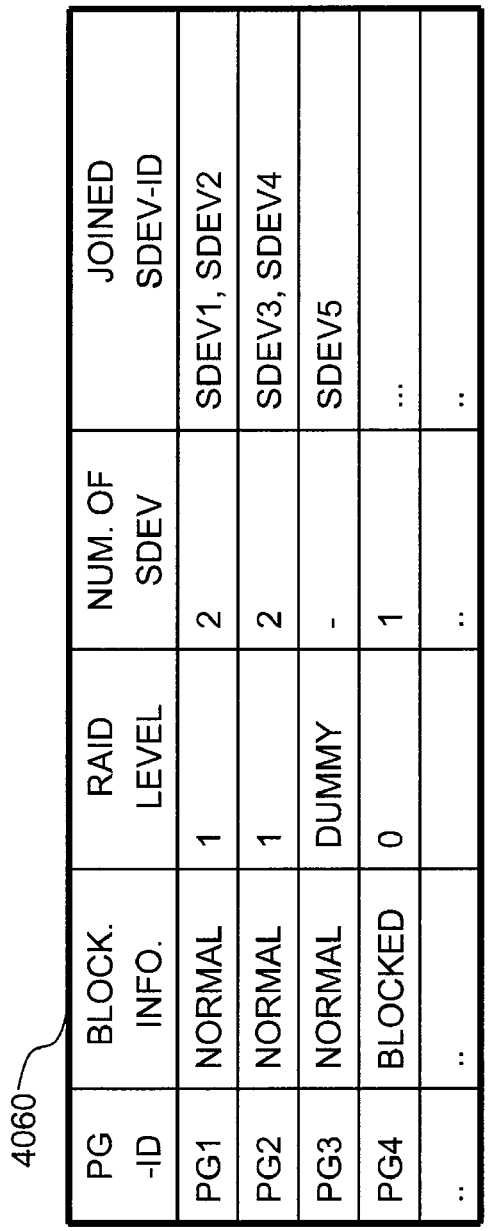
FIG. 13 shows the content of parity group (PG) configuration information.

FIG. 13 shows an example of the PG configuration information 4060.

The PG configuration information 4060 has the following information (I1) to (I3) with regard to an identifier of each parity group (PG):

(I1) Blockage Information

The blockage information becomes a blocked state when the relevant storage device cannot be used; otherwise, the blockage information becomes a normal state. Incidentally, examples of the circumstance where the relevant storage device cannot be used may be when a multiplicity of the following event examples happen at the same time:

(Event 1) hardware failure; and (Event 2) removal of the storage device(s) 1030.

(I2) RAID Level

If a value Dummy is in this column, an identifier described as the identifier of a joining storage device(s) indicates an LU of another storage apparatus. Incidentally, since a plurality of storage devices are grouped into a parity group, a parity group corresponding to an LU of another storage apparatus may be sometimes referred to as the dummy parity group.

(I3) Number of Storage Devices 1030 Belonging to Parity Group and Identifier of that Storage Device Incidentally, in a case of a dummy parity group, an identifier of an LU of another storage apparatus 1000 is registered as the identifier of the storage device.

It should be noted that as in a part of the case shown in FIG. 13, this embodiment may be designed so that an internal LU(s) may be created directly from the storage devices without creating a parity group.

Figure 14:
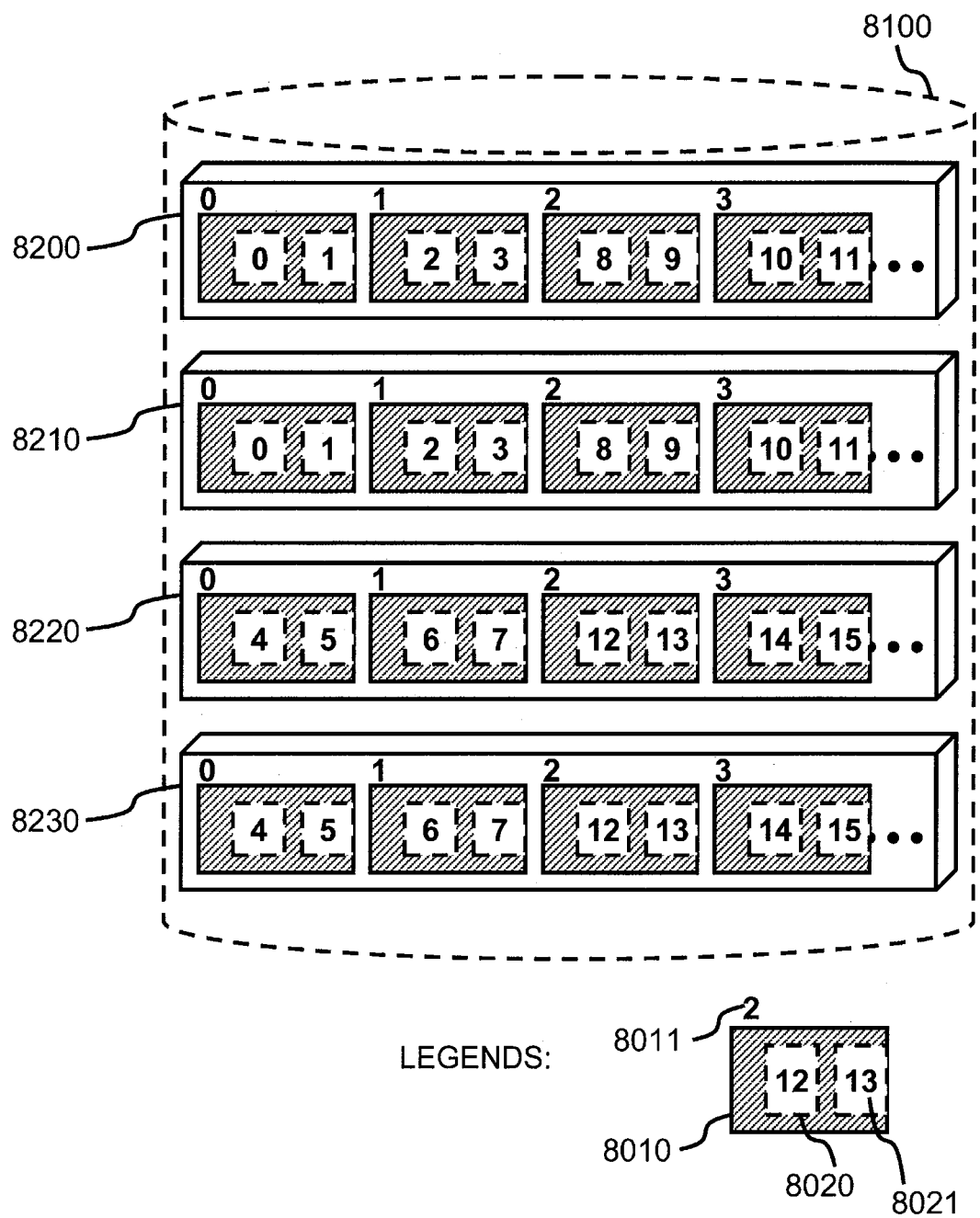
FIG. 14 shows a first example of address spaces in a parity group.
Figure 15:
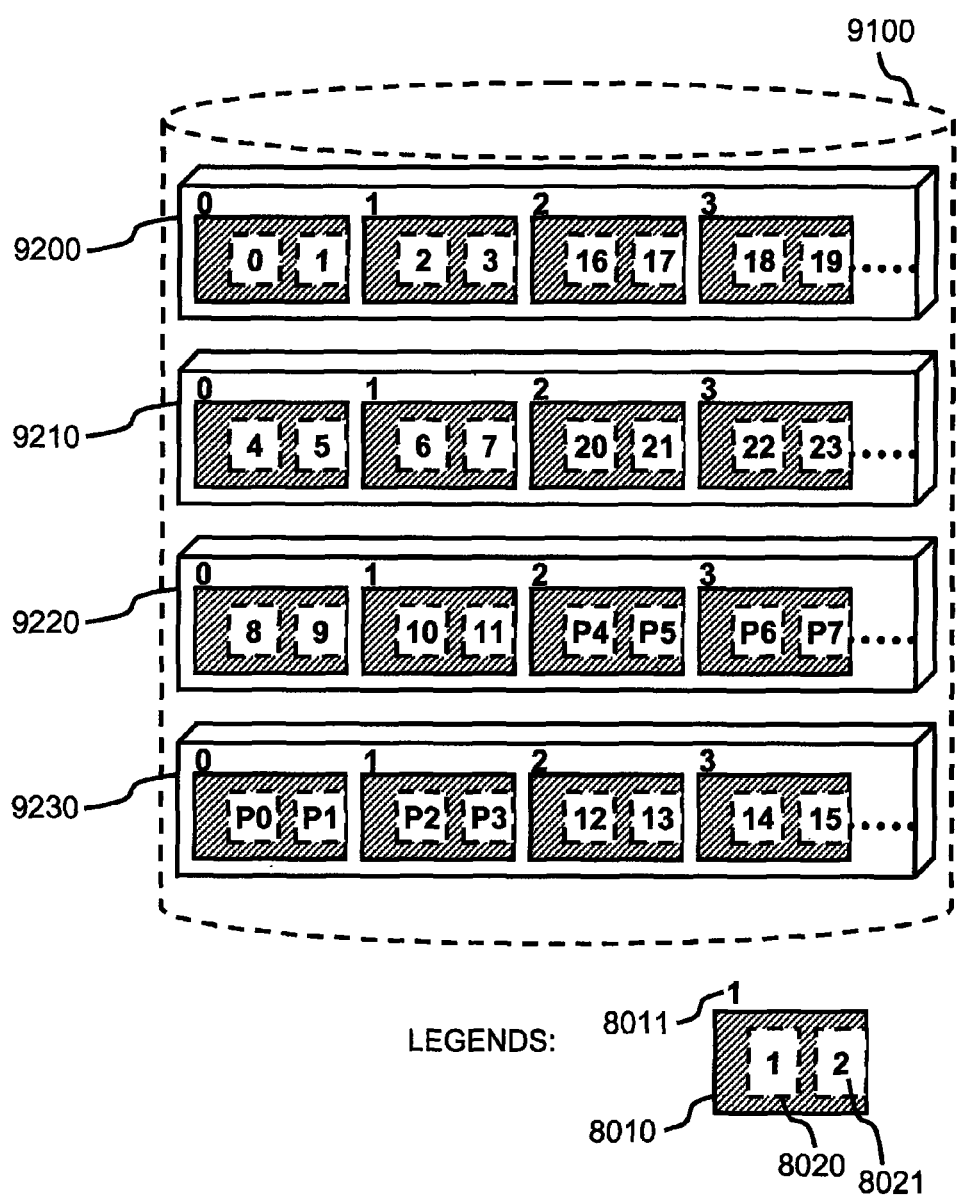
FIG. 15 shows a second example of address spaces in a parity group.

As described earlier, the controller 1010 can allocate address spaces to a parity group. FIG. 14 shows a relationship between an address space [G] of a parity group and an address space [D] of storage devices 1030, for which RAID1+0 is taken as an example. FIG. 15 shows a similar relationship of an example of RAID5.

Description of Examples

FIG. 14 and FIG. 15 show a case where a parity group 8100 is configured by using four storage devices 8200, 8210, 8220, 8230. A hatched box 8010 represents a storage device block [D] and the block address [D] is shown as 8011. A box 8020 with a dotted line frame in the box 8010 is a block [G] allocated by the controller 1010 to the parity group 8100 and the block address [G] assigned by the controller 1010 is indicated as 8021. Incidentally, the block size [G] of the block 8020 may possibly be 512 bytes, which is the minimum block size that can be provided according to the SCSI standards, but other size may be used.

RAID1+0:

In the case of RAID1+0, the controller 1010 allocates the same address spaces to two storage devices (in this example, the storage devices 8200 and 8210, and the storage devices 8220 and 8230) for the sake of mirroring and then performs striping. In the case of striping, the controller 1010 switches the continuous address spaces [G] to another storage device for every set of a specified number of blocks (hereinafter referred to the number of continuous blocks for striping) (for example, four blocks with respect to the blocks [G] and two blocks with respect to the blocks [D]). It should be noted that the stripe size (size of access by reading or writing data from all the storage devices in a parity group) can be calculated by the following formula:

Stripe Size=(Number of Continuous Blocks for Striping[$G$])*(Number of Storage Devices/2)*(Block Size[$G$]).

Incidentally, striping for RAID1+0 is omitted in the case of RAID1, so the explanation thereof is omitted.

RAID5:

In the case of RAID5, the controller 1010 also performs striping processing on the basis of the number of continuous blocks for striping and allocate parity storage areas (in this example, addresses P0 to P3 are areas for storing parity of addresses 0 to 11). The stripe size in the case of RAID5 can be calculated according to the following formula:

Stripe Size=(Number of Continuous Blocks for Striping[$G$])*(Number of Storage Devices−1)*(Block Size[$G$]).

Internal LU Configuration Information

Figure 16:
FIG. 16 shows the content of internal LU configuration information.

FIG. 16 shows an example of the internal LU configuration information 4070.

The internal LU configuration information 4070 has the following information (H1) to (H6) with regard to each identifier of the internal LUs. It should be noted that the LUs provided as storage areas to the host 1100 are provided to an external device by defining paths based on the internal LUs. Incidentally, the term the external device herein used may indicate another type of device instead of, or in addition to, the host 1100, for example, a virtualization switch or another storage apparatus. In other words, that other type of device, instead of or in addition to the host 1100, can issue an access request to the storage apparatus.

(J1) Blockage Information

The blockage information becomes a blocked state when the relevant internal LU cannot be used (for example, when the relevant parity group is blocked, when an area is not allocated to the relevant internal LU, or when the corresponding LU of another storage apparatus 1000 cannot be accessed); otherwise, the blockage information becomes a normal state.

(J2) Parity Group ID

The parity group ID is an identifier of a parity group associated as a storage area for the relevant internal LU.

(J3) Start Address [G] and Ending Address [G] of Parity Group Indicated by Parity Group ID A parity group used as a storage area for the relevant internal LU, and a start block address [G] and an ending block address [G] in the parity group are indicated. Incidentally, this entry is managed by the controller 1010. So, the block addresses are managed in blocks as recognized by the controller. In that case, it is also possible to prevent a plurality of internal LUs from using the blocks [D] of the same striping storage device by setting values of the start address [G] and the ending address [G] in consideration of the block size or stripe size of the storage device 1030.

When a plurality of parity groups are used to define an internal LU, a plurality of pieces of information (J2) and (J3) are registered in an entry like I-LUx in the internal LU configuration information 4070.

(J4) Block Size [L]

The controller 1010 sets the block size to, for example, 512 bytes. However, there may be a case where the host 1100 requests the block size larger than 512 bytes, the block size based on a request from the host 1100 is retained.

LU Path Information

FIG. 17 shows an example of the LU path information 4080.

For example, the following information (K1) to (K3) is retained in the LU path information 4080.

(K1) An identifier of an internal LU provided to the host 1100

(K2) WWN (or an identifier of the access port 1013)

This information indicates from which port 1013 the internal LU is provided to the host 1100. Incidentally, other types of identifiers such as the port number may be substituted for the WWN. Incidentally, when the term the port identifier is mentioned, that identifier is any of the above-mentioned values.

(K3) LUN

This information indicates as which LUN of which WWN described in (K2) the relevant internal LU is provided to the host.

It should be noted that since only a limited number of LUNs can be defined, it is unnecessary to assign WWNs and LUNs to all the internal LUs defined in the storage apparatus 1000; and the LUNs may be utilized effectively by assigning certain WWNs and LUNs to certain internal LUs during certain hours and to different internal LUs during different hours.

Processing of Storage Apparatus

Parity Group Definition

Figure 18:
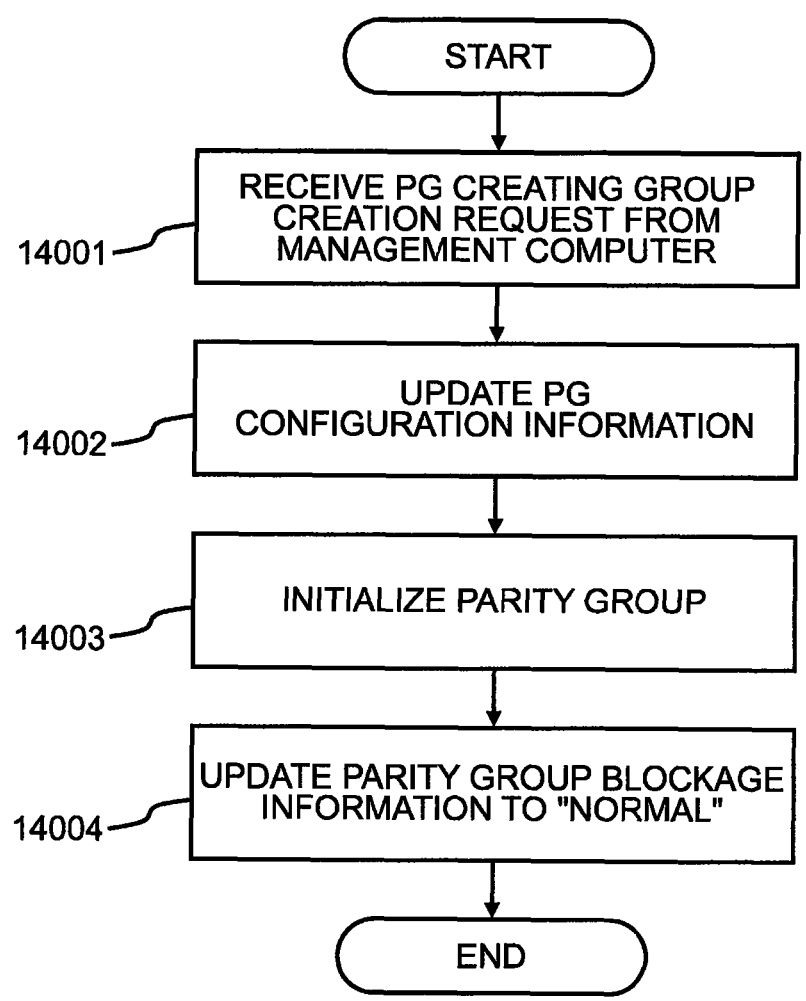
FIG. 18 shows a flow of parity group definition processing executed in the storage apparatus.

FIG. 18 is a flowchart illustrating parity group definition processing executed by the configuration control program 4030. Each step will be explained below.

(Step 14001) The configuration control program 4030 receives a parity group definition request including the identifiers and RAID level of a plurality of storage devices 1030 from the management computer 1200 (the identifiers can be replaced with a mounting position in the physical storage apparatus).

(Step 14002) The configuration control program 4030 creates and/or updates the PG configuration information 4060 based on information associated with the parity group definition request (each storage device identifier and RAID level).

(Step 14003) The configuration control program 4030 initializes a parity group (including creation of mirror data and parity data).

(Step 14004) The configuration control program 4030 changes blockage information about the relevant parity group in the PG configuration information 4060 from the blocked state to the normal state to indicate that the parity group can be used; and returns a completion message to the management computer 1200.

Incidentally, when receiving an undefined parity group request (designating the parity group ID) to make the parity group undefined, the configuration control program 4030 deletes information about the designated identifier from the PG configuration information 4060.

Internal LU Definition

Figure 19:
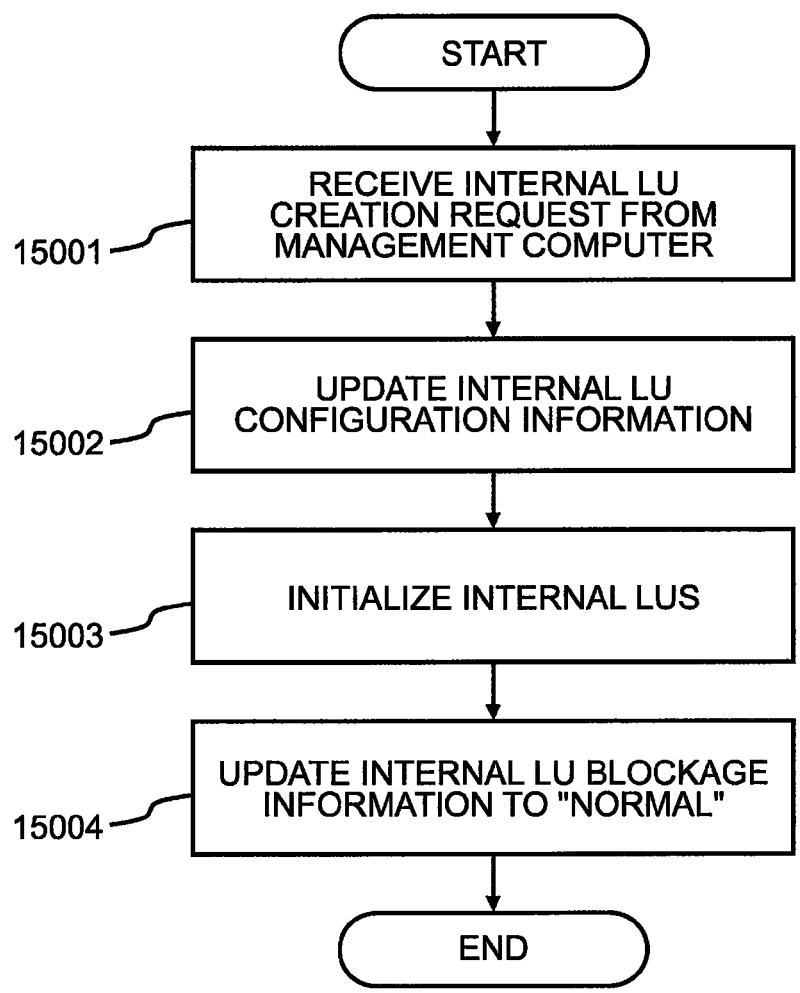
FIG. 19 shows a flow of internal LU definition processing executed in the storage apparatus.

FIG. 19 is a flowchart illustrating internal LU definition processing executed by the configuration control program 4030. Each step will be explained below.

(Step 15001) The configuration control program 4030 receives an internal LU definition request including part or all information (Argument 1) to (Argument 4) shown below from the management computer 1200:

(Argument 1) an identifier of a parity group or a port identifier (WWN or port ID) and LUN of another storage apparatus;
(Argument 2) a start address [G] of the parity group (or the LU of another storage apparatus);
(Argument 3) the storage capacity of the internal LU or an ending address [G] of the parity group (or the LU of another storage apparatus); and
(Argument 4) the block size [L] of the internal LU. If the internal block size is fixed, this argument may be omitted.

It should be noted that (Argument 2) and (Argument 3) may be received in other forms as long as the start address [G] and the ending address [G] of the parity group can be finally obtained.

(Step 15002) The configuration control program 4030 creates and/or updates the internal LU configuration information 4070 based on information associated with the internal LU definition request.

(Step 15003) The configuration control program 4030 executes processing for initializing the internal LU as needed. For example, the configuration control program 4030 may create an internal LU management area as part of the initialization processing.

(Step 15004) The configuration control program 4030 changes blockage information about the relevant internal LU in the internal LU configuration information 4070 from the blocked state to the normal state to indicate that the internal unit can be used; and returns a completion message to the management computer 1200.

Incidentally, when receiving an undefined internal LU request (designating the internal LU identifier) to make the internal LU undefined, the configuration control program 4030 deletes information about the designated identifier from the internal LU configuration information 4070.

LU Path Definition

Figure 20:
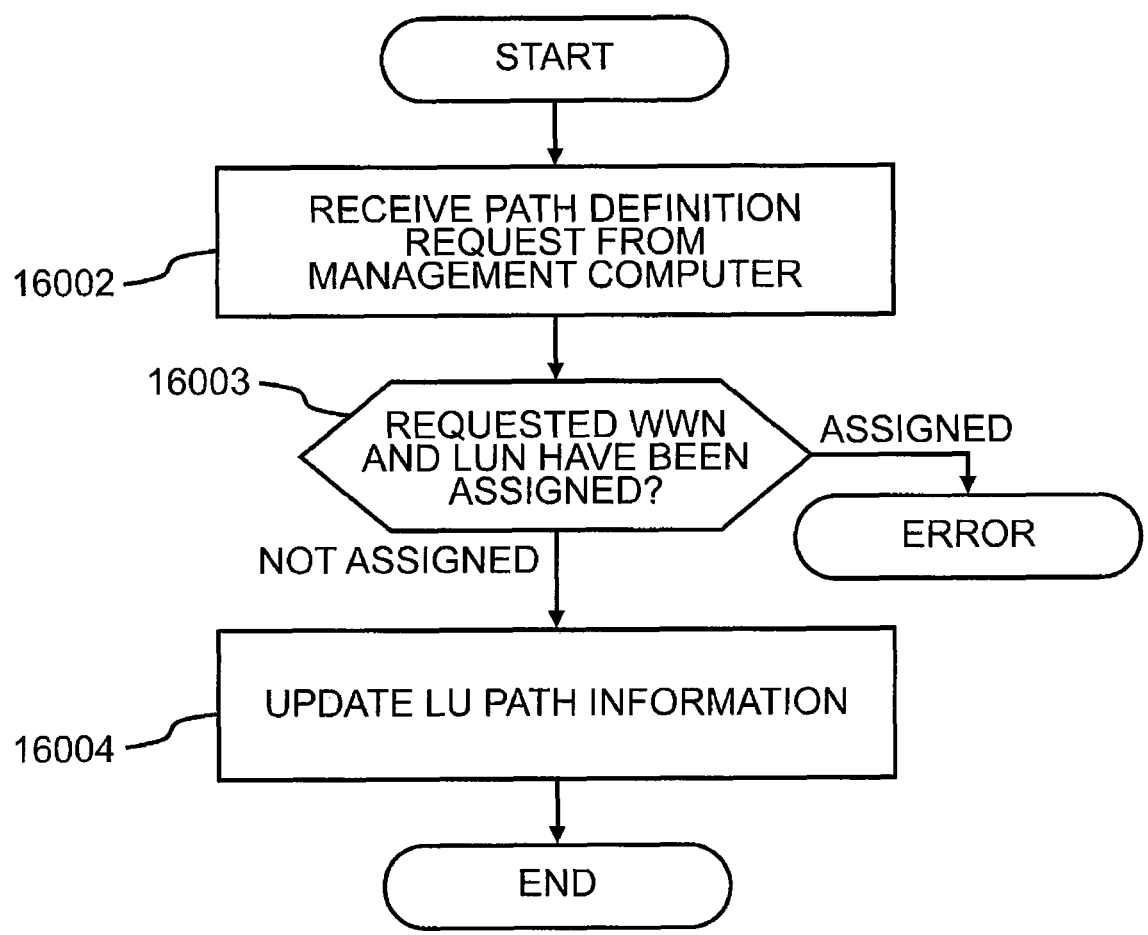
FIG. 20 shows a flow of LU path definition processing executed in the storage apparatus.

FIG. 20 is a flowchart illustrating LU path definition processing executed by the configuration control program 4030. Each step will be explained below.

(Step 16002) The configuration control program 4030 receives a path definition request including an identifier of an internal LU and port information (or other information only if it is identification information that can be finally converted into the identifier of the access port 1013 or the WWN) and an LU from the management computer 1200.

(Step 16003) The configuration control program 4030 checks whether or not the WWN and LUN designated by the request have been assigned; and if they have been assigned, the configuration control program 4030 responds to the request as an error and terminates the processing. If they have not been assigned, the configuration control program 4030 performs step 16004.

(Step 16004) The configuration control program 4030 creates and/or updates the LU path information 4080 based on information associated with the request and returns a completion message to the management computer 1200.

It should be noted that a plurality of path definitions may be performed on the internal LU in order to multiplex access paths from the host 1100. Also, the configuration control program 4030 may search for, and assign, an unused WWN and LUN instead of designating the WWN and LUN in the LU path definition request.

Incidentally, when receiving an LU path definition cancellation request for cancelling a path definition, the configuration control program 4030 cancels the designated path definition from the LU path information. It should be noted that an example of a method for designating the LU path in this request is a method of designating the identifier of the internal LU or a combination of the WWN and the LUN, but other designation methods may be used.

External LU Definition

Figure 27:
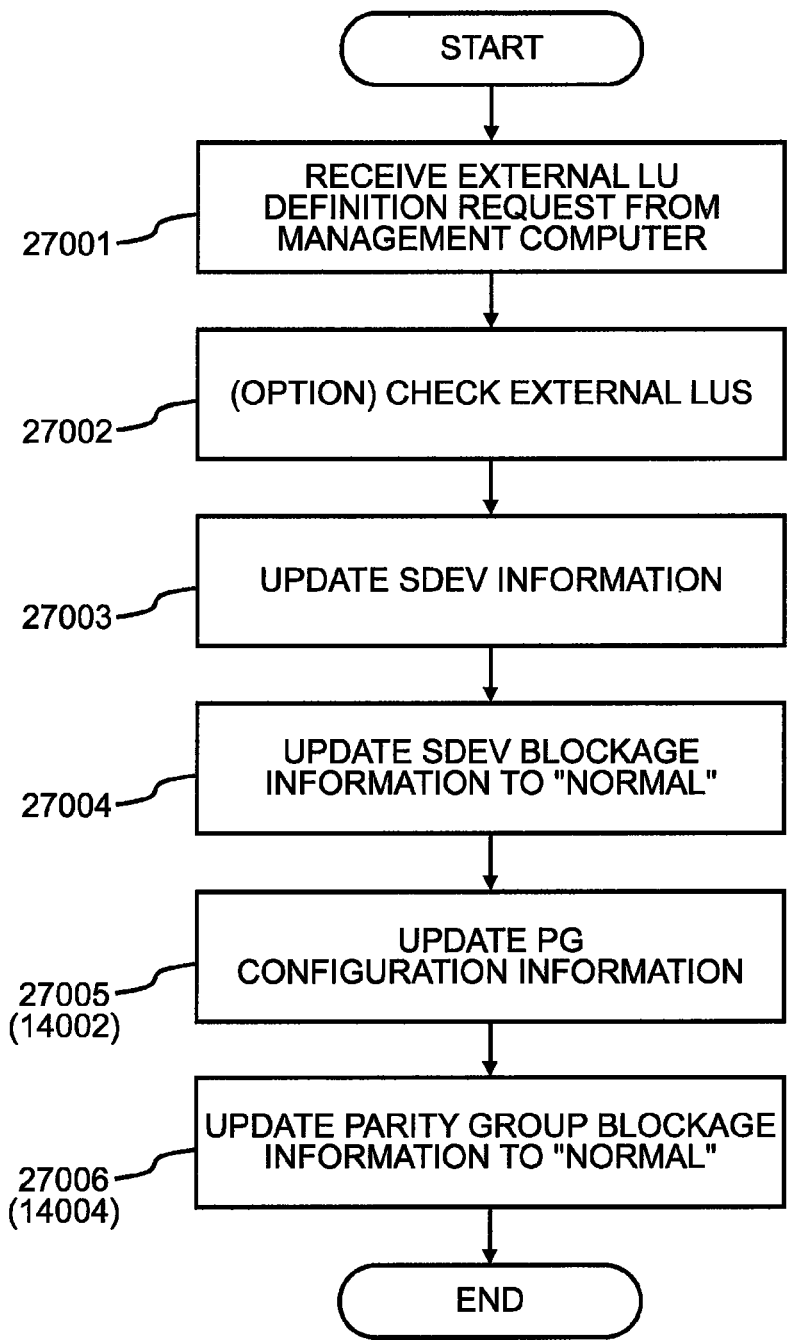
FIG. 27 shows a flow of external LU definition processing executed in the storage apparatus.

FIG. 27 is a flowchart illustrating external LU definition processing executed by the configuration control program 4030. Each step will be explained below. Incidentally, an external LU(s) means an LU(s) of another storage apparatus.

(Step 27001) The configuration control program 4030 receives an external LU definition request designating an LU of another storage apparatus from the management computer 1200. As an example of designating the LU of another storage apparatus, the WWN and LU of the port of the relevant storage apparatus may be designated or the identifier of that storage apparatus and the identifier of the internal LU may be designated.

(Step 27002) (Option) The configuration control program 4030 checks whether the LU of the designated storage apparatus exists or not. If the LU of the designated storage apparatus does not exist, the configuration control program 4030 may return the relevant request as an error. Incidentally, an example of the existence checking method is a method of using a read request or an inquiry request.

(Step 27003) The configuration control program 4030 obtains an identifier of an unused storage device and adds the identifiers of the storage apparatus and LU designated in the external LU definition request, together with the identifier of the storage device, to the SDEV information 4060 (or updates the SDEV information 4060).

(Step 27004) The configuration control program 4030 changes the blockage information about the relevant storage device (its entity is the external LU) from the blocked state to the normal state to indicate that the storage device can be used.

(Step 27005) The configuration control program 4030 adds information about a dummy parity group, for which the identifier of the storage device obtained in step 27003 indicates its joining storage device, to the PG configuration information 4060 (or updates the PG configuration information 4060).

(Step 27006) The configuration control program 4030 changes the blockage information about the relevant parity group in the PG configuration information 4060 from the blocked state to the normal state to indicate that the parity group can be used; and returns a completion message to the management computer 1200.

Incidentally, when receiving an external LU definition cancellation request (designating the storage device ID) for cancelling an external LU definition, the configuration control program 4030 cancels information about the designated identifier from the SDEV information 4050 and deletes information about the dummy parity group corresponding to the designated storage device from the PG configuration information 4060.

Blockage Detection

The configuration control program 4030 detects component blockage caused by, for example, failures, power interruption, or removal of a component. A flow of blockage detection processing will be explained below.

(L1) The configuration control program 4030 obtains the status of each component. Incidentally, if the component is a controller or a storage device, the configuration control program 4030 may obtain the status or logs of programs operating on the relevant component. The program 4030 may use a report from each component as an alternative for inquiry in this processing.

(L2) The configuration control program 4030 judges whether each component is blocked or not, by checking the obtained status; and if there is no blockage, the processing returns to (L1).

(L3) If it is determined in (L2) that the relevant component is blocked, the configuration control program 4030 transfers the identifier of the component, which is determined to be blocked, to the management computer 1200 and has the management computer 1200 display it to the user.

Incidentally, the blockage detection of the storage devices 1030 and dynamic pairing after the blockage detection will be explained later. Also, the circumstance where some storage devices 1030 cannot be accessed due to blockage of components other than the storage devices 1030 may take place; and in that case, processing described later (dynamic pairing in particular) may also be executed.

Blockage Detection of Storage Device 1030

A flow of processing executed by the configuration control program 4030 for detecting blockage of the storage device 1030 will be explained below.

(M1) The storage device 1030 returns at least one of the information (G1) to (G8) in response to a request from the configuration control program or actively sends these pieces of information.

(M2) The configuration control program 4030 checks the received information and judges whether the storage device is blocked or not. An example of the judgment method is as follows:

(Judgment Method 1) in a case of a processing failure represented by an access request error, the judgment is made by checking reception for a specified number of times (including once or more).

(M3) The configuration control program 4030 changes the blockage information about the storage device, which is determined to be blocked, in the storage device configuration information 4050 to the blocked state and indicates that the storage device cannot be used.

(M4) The configuration control program 4030 judges whether or the relevant parity group is in a state incapable of processing a read/write request due to the blocked storage device 1030, by referring to the PG configuration information and the storage device configuration information; and if the parity group cannot process the read/write request, the configuration control program 4030 changes the blockage information about the relevant parity group to the blocked state (that is, the parity group cannot be used). Incidentally, regarding the judgment method in a case of redundancy method involving mirroring like RAID1+0, the judgment is made by checking whether both storage devices, which constitute a pair with dualized data, are in the blocked state or not; and in a case of RAID5, the judgment is made by checking whether or not the number of storage devices in the blocked state in the parity group is two or more.

(M5) The configuration control program 4030 refers to the internal LU configuration information and thereby sets the blockage information about the internal LU(s), whose data is stored in the blocked parity group, to the blocked state (that is, the internal LU(s) cannot be used).

(M6) The configuration control program 4030 notifies the management computer 1300 of identification information about the blocked storage device 1030 as necessary. Information about a reason(s) for blockage (for example, which judgment method was used to determine that the storage device 1030 is blocked) may be attached to this notice. If a parity group(s), internal LU(s), and LU(s) which are blocked by the blockage of the storage device 1030 exist, their identification information may be reported to the management computer 1300. Incidentally, the management computer 1300 which has received this notice may possibly display these pieces of information as failure information to the user.

It should be noted that a state of a parity group that includes the storage device in the blocked state and is capable of processing an access request will be called a degenerated state in the following explanation. In response to an access request for the parity group in the degenerated state, data restoration processing is executed to respond to the relevant request. Incidentally, the data restoration processing indicates restoration of data in the blocked storage device from redundant data. In a case of mirroring, the same data as that in the blocked storage device exists in another storage device, so that data in that other storage device is used for the processing. In a case of a parity method, this processing is executed to restore data in the blocked storage device by calculating the data in the blocked storage device from data remained without being blocked and the parity.

Dynamic Pairing of Storage Device

Dynamic pairing processing executed by the configuration control program 4030 will be explained below.

(N1) The configuration control program 4030 waits until blockage of a storage device is detected by the failure detection processing.

(N2) The configuration control program 4030 finds a parity group related to the storage device which was detected in N1 to be blocked (for example, a parity group including that storage device), by referring to the PG configuration information 4060.

(N3) The configuration control program 4030 judges whether or not the data restoration processing can be executed on the found parity group; and if the data restoration processing cannot be executed, the configuration control program 4030 gives up the execution (for example, terminates the processing). If the data restoration processing can be executed, the configuration control program 4030 performs N4 and subsequent steps.

(N4) The configuration control program 4030 searches for an alternate storage device that would fit into the parity group. Incidentally, possible search conditions are the following conditions similar to the information and check items provided to define the parity group. However, conditions other than those listed below may be used for the search.

(Condition 1) Data capacity and type of the storage device (Condition 2) Select a storage device 1030, regarding which blockage of one component other than the storage device would not cause double blockage of the storage device 1030 (in order to avoid blockage of the parity group as much as possible).

(Condition 3) A storage device which does not belong to any parity group.

(N5) The configuration control program 4030 restores data to the alternate storage device by means of the data restoration processing (hereinafter referred to as the restoration copy processing). More specific content of the restoration copy processing will be exemplified as follows:

(N5-1) The configuration control program 4030 initializes information indicating a copy completion position (copy completion position information) at the starting address of the storage device.

(N5-2) The configuration control program 4030 restores only several blocks of data in the blocked storage device from the copy completion position information and writes it to the alternate storage device.

(N5-3) The configuration control program 4030 moves the copy completion position information forward by the number of the written several blocks.

(N5-4) The configuration control program 4030 repeats the processing from (N5-1) to (N5-3) until the copy completion position information reaches the ending address of the storage device.

(N6) The configuration control program 4030 newly registers the alternate storage device in the parity group and excludes the blocked storage device.

Regarding an access request for the blocked storage device for which the above-described restoration copying is performed, data is restored to the alternate storage device with regard to the blocks [D] before the copy completion position information, so that the controller 1010 may return the data to the host 1100 (in a case of a read access request) or store write data to the alternate storage device (in a case of a write access request). It should be noted that the controller 1010 can execute the following processing with regard to block addresses at and after the copy completion position information.

(O1) In the case of receiving a read request, data stored in the blocked storage device 1030 is restored to the cache memory 1020 by the data restoration processing and that data is returned to the host 1100.

(O2) In the case of receiving a write request, redundant data (such as parity data and mirror data) is updated so that the write data for the present request can be restored in response to subsequent read requests or write requests.

Write Processing

Figure 21:
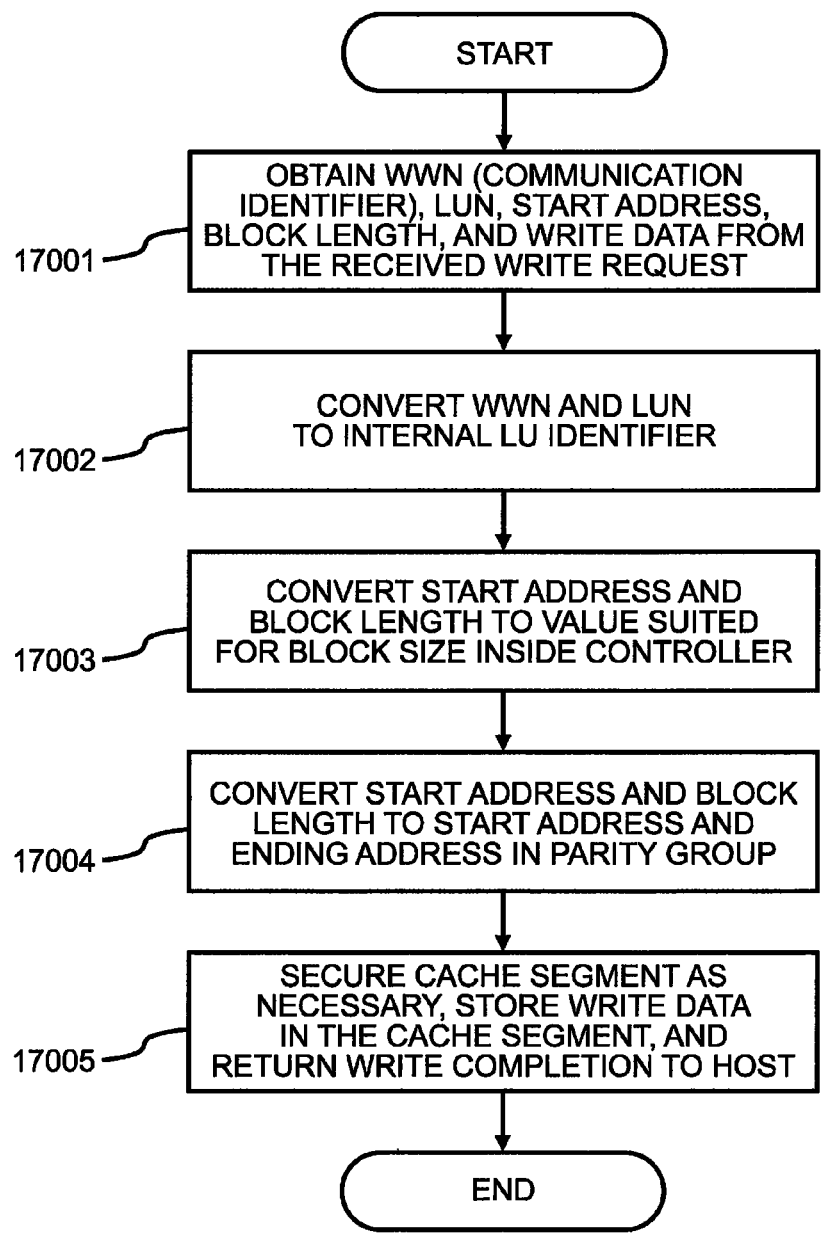
FIG. 21 shows a flow of write processing executed in the storage apparatus.

FIG. 21 is a flowchart illustrating processing executed when the access processing program 4010 receives a write request. Moreover, FIG. 24 is a schematic diagram showing an example of a data flow and changes in the storage device 8200 and the storage device 8210 of the RAID1+0 parity group shown in FIG. 14 and two caches (CM-A and CM-B). Furthermore, FIG. 25 and FIG. 26 are schematic diagrams showing examples of a data flow and changes in the storage device 9200 and the storage device 9230 in the RAID1 parity group shown in FIG. 15 and the two caches (CM-A and CM-B).

Premises and Examples of Schematic Diagrams

FIGS. 24 to 26 are diagrams showing a data flow and data changes between the cache memories and the storage devices when the block size [L] is disclosed to the host 1100 as being 512 B (Bytes) and a write request is received by block 2 with regard to an internal LU to which an area is allocated from the top of the parity group. Also, boxes with numbers in the cache memories and the storage devices indicate blocks [G] allocated by the controller 1010 to the parity group and the addresses of such blocks [G]. In this example, the storage device block size [D] is twice as large as the block size [G].

It should be noted that a continuous address area (cache segment) in the cache is allocated by using continuous blocks of the storage device (four blocks [G] and two blocks [D] in the example) for the area management of the cache memory 1020 in order to reduce information for associating data areas in the cache memory with data areas in the storage devices. So, for example, the controller 1010 manages attribute information (Q1) to (Q6) shown below for every cache segment.

(Q1) Address in the cache segment (Q2) The identifier of the parity group and the block address [G] in the parity group (Q3) Staging information for every block [G] in the cache segment If there is a black belt under the block [G] in the cache in the schematic diagram, it means that the relevant data has been staged.

(Q4) Dirty information (which means the relevant information has been updated, but has not been reflected in the storage device) for every block [G] in the cache segment If there is a black belt above the block [G] in the cache block in the schematic diagram, it means that the relevant data is dirty.

(Q5) Old data information (Q6) Parity update requiring information

If there is a black belt above a box in which the letter P is written without any number in FIGS. 25 and 26, it means that a parity update is required; and if only the box in which the letter P is written without any number is indicated, it means that a parity update is not required.

Regarding both the schematic diagrams, an explanation will start from the state where the blocks [G] 0 and 1 are in a staged state for the sake of reading.

Write Request Processing Flow

The content of processing executed when the access processing program 4010 receives a write request will be explained with reference to the flowchart in FIG. 21 and examples in FIGS. 24 to 26. Incidentally, the following processing indicates that data can be written by using the cache memory in both a case where the write target is an LU corresponding to its own storage device, and a case where the write target is an LU corresponding to an LU of another storage apparatus.

(Step 17001) The access processing program 4010 obtains the WWN, the LUN, the start block address [L], the block length [L], and write data from a write request received by the controller 1010. Again, the controller 1010 reports the block size of the internal LU configuration information 4070 about the corresponding internal LU as the block size [L] of the relevant LUN to the host 1100 in advance and the start block address and the block length in the write request are based on that block size [L] as the premise. It should be noted that since the actual write request includes a port ID instead of the WWN, it is necessary to convert the port ID into the WWN.

(Step 17002) The access processing program 4010 finds an internal LU number from the WWN, LUN, and LU path information. Incidentally, when a network other than Fibre Channel is used, another method for finding the internal LU number from the write request may be substituted for step 17001 and step 17002. For example, in a case of iSCSI, the internal LU number can be found by combining an IP address and a port number or using an iSCSI target name instead of the WWN and combining the iSCSI target name and the LUN.

(Step 17003) The access processing program 4010 uses the internal LU configuration information 4070 and converts the start address and the block length in the read request (the start block address and block length based on the block size which was reported to the host 1100 in advance) into a value based on the block length managed within the controller 1010.

(Step 17004) The access processing program 4010 uses the internal LU configuration information 4070 and converts the start block address [L] and the block length [L] in the request into the parity group identifier, the start block address [G], and the ending block address [G]. Conversion calculation is performed according to the following formulas.

Start Block Address[*G*]=(Block Size[*L*]*Start Block Address[*L*]/Block Size[*G*])+(Start Block Address [*G*]of Internal LU Configuration Information)

Ending Block Address[*G*]=(Block Size[*L*]*Block Length[*L*]/Block Size[G])+Start Block Address [*G*]

(Step 17005) The access processing program 4010 stores the write data in the cache. When this happens, and if data of the necessary block [G] has been staged to the cache, the data in the cache is updated with the write data. However, even if the staged block data exists, if the parity update requiring information is No (updated) and dirty information (that is, write data on which the previous update was based) is set to the block to be stored in this embodiment, it is necessary to use the block [G] data as old data in the current parity update. Therefore, another cache segment is secured and the write data is stored in that cache segment. If the write data does not exist in the cache, a cache segment is secured and the write data is stored in that cache segment when necessary.

Incidentally, if the write data is stored in the two caches, even if one cache is blocked, the write data can be retained. Also, at the same time as storage, the access processing program 4010 sets the staging information, the dirty information, and the parity update requiring information about the stored block and returns a response to the write request to the host 1100. Referring to FIG. 25 and FIG. 25(1), the write data in the block [G] 2 is written to the two caches and the staging information and the dirty information are set.

The above-described flow is the flow of the access processing program 4010.

From Parity Creation to Destaging

Figure 22:
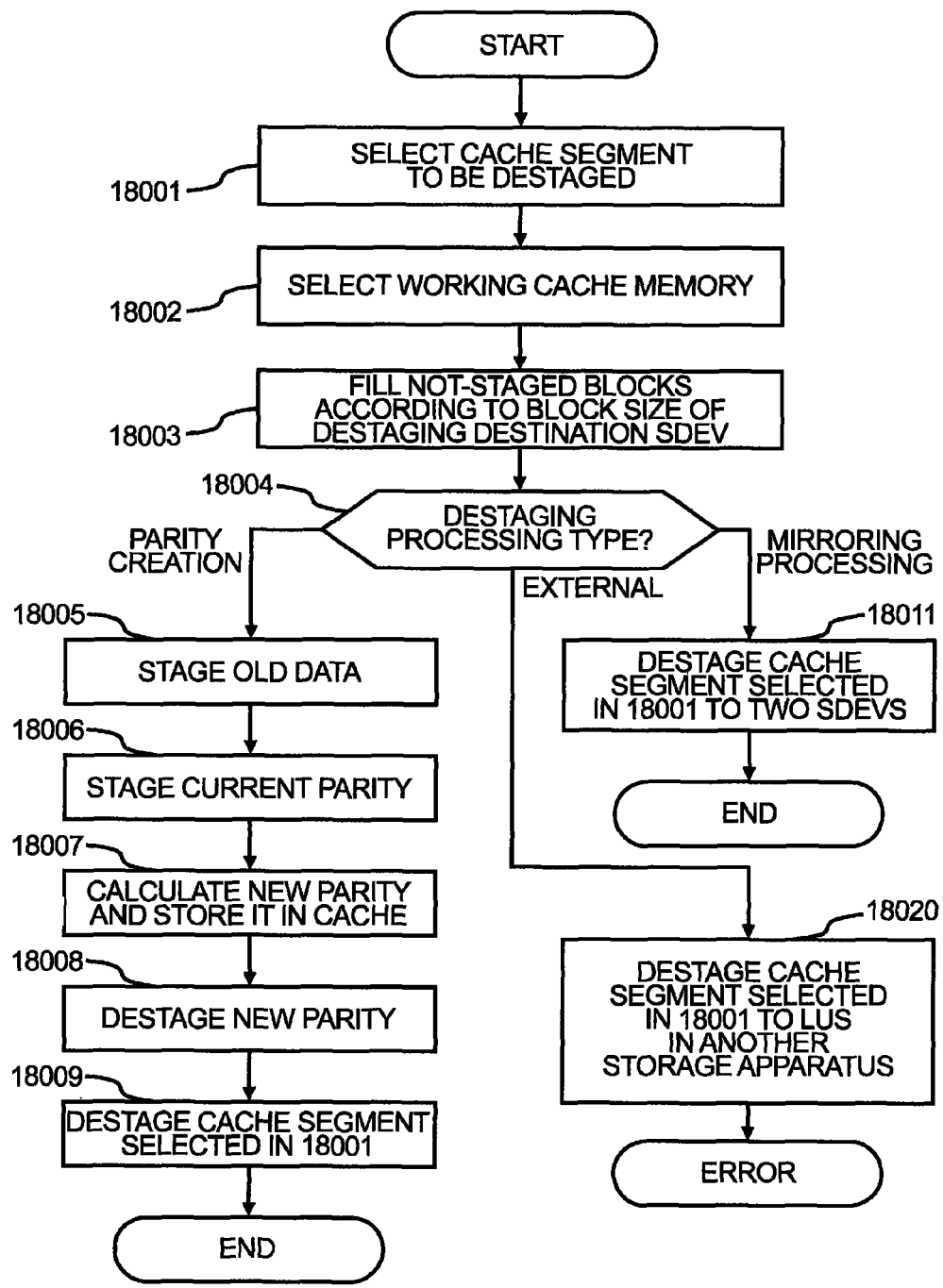
FIG. 22 shows a flow of destaging processing executed in the storage apparatus.

FIG. 22 shows a processing sequence for parity creation and destaging repeatedly executed by the cache control program 4020.

(Step 18001) The cache control program 4020 selects a parity creation or destaging target cache segment by a cache algorithm such as LRU (Least Recently Used). Referring to FIGS. 24 and 25 (hereinafter sometimes referred to as the schematic diagrams), the blocks 2 and 3 are selected.

(Step 18002) The cache control program 4020 decides which write data stored in which of the two caches should be used for parity creation and destaging according to a formula based on a parity group ID and a block address of the cache segment to be destaged. In the schematic diagrams, it is decided to use the write data in CM-A.

(Step 18003) The cache control program 4020 fills the not-staged block [G] in the cache segment to be destaged, according to the block size [D] of the destaging destination storage device 1030. This is performed in order to make it possible to read and write data in the cache memory on a block basis.

Specifically speaking, a plurality of blocks [G] in the cache segment are divided from its top into a storage device block size [D] (that is, divided into a destaging unit); and if a dirty block [G] and a block [G] in a state partially not staged yet exist in each divided section, data corresponding to the block [G] in the not-staged state is copied from the storage device 1030. This copying is performed by firstly staging the block [D] including the dirty block [G] (for example, the block 2) and the block [G] in the not-staged state (for example, the block 3) to another area in the cache and copying only the block [G] in the not-staged state from there. The schematic diagram (for example, FIG. 22(1)) shows that the block 3 is in the not-staged state.

(Step 18004) If parity creation is required, the cache control program 4020 executes step 18005 on the cache segment to be destaged; and if mirroring is required, the cache control program 4020 executes step 18011 on the cache segment to be destaged; and if destaging to an external LU is required, the cache control program 4020 executes step 18020 on the cache segment to be destaged.

(Step 18005) The cache control program 4020 stages old data, which is stored in the destaging destination storage device 1030 for the cache segment for the purpose of the parity creation, to a cache segment different from the cache segment to be destaged. Incidentally, this staging may be performed by using the same area as the cache segment to which the data was staged to adapt to the storage device block size in step 18003 or by staging necessary data for both the cache segments in advance in step 18003 (necessary pieces of data for both the cache segments are collectively staged in the schematic diagram of FIG. 24(2)). Furthermore, if data used for the previous parity update exists in the cache, staging can be omitted.

(Step 18006) The cache control program 4020 stages the block [L], which stores parity corresponding to the cache segment to be destaged, from the storage device 1020 to the cache segment (the blocks P2 and P3 are staged to CM-B in the schematic diagram of FIG. 25(2)). Incidentally, if the parity calculated last time exists in the cache, staging can be omitted.

(Step 18007) The cache control program 4020 calculates new parity by using the write data in the cache segment to be destaged, the old data staged in step 18005, and the current parity staged in step 18006 and stores the calculated new parity in a cache segment different from the current parity by setting dirty information. The relevant program 4020 cancels the parity update requiring information for the cache segment to be destaged and discards the old data staged in step 18005 and step 18006 and the parity cache segment. The parity P2 for the block 2 is dirty in the schematic diagram of FIG. 25(3).

(Step 18008) The cache control program 4020 destages the cache segment for the new parity calculated in step 18007 and cancels the dirty information. The parity P2 and P3 is destaged in the schematic diagram of FIG. 26(4).

(Step 18009) The cache control program 4020 destages the cache segment to be destaged and cancels the dirty information. After this destaging is completed, the write data in one of the caches, thereby completing the destaging processing. Incidentally, the order of this step and step 18008 may be reversed.

(Step 18011) The cache control program discards the data staged to another cache segment in order to fill the not-staged block in step 18003. The cache control program 4020 destages the write data in the cache segment to be destaged, to the two storage devices 1030 having a mirror relationship. The relevant program discards the write data in one cache after waiting for the completion of destaging to both the storage devices 103. The schematic diagram in FIG. 24(3) shows that the blocks 2 and 3 are destaged from CM-A.

(Step 18020) The cache control program discards the data which is staged to another cache segment to fill the not-staged block in step 18003. The cache control program 4020 then destages the write data in the cache segment to be destaged, to an external LU which is the destaging destination. After waiting until the completion of destaging to the external LU, the relevant program discards the write data in one of the cache. Incidentally, destaging to the external LU is performed by using the network 1500 and the port connected to the network 1500.

The above-described processing is the parity creation processing.

Next, the content of the destaging processing used in the above-described processing will be described below.

(R1) The cache control program 4020 converts the block address [G] of the parity group for the cache segment into the identifier of the storage device and the block address [D] of the storage device by means of striping calculation and block size conversion.

(R2) The cache control program 4020 sends a write request with the block address [D] obtained in (R1) to the storage device found in (R1) or another storage apparatus. Incidentally, in a case of external LUs where a plurality of WWNs and LUNs are registered in the SDEV information 4050, it is only necessary to designate any one of the WWNs and LUNs by means of request transmission.

Similarly with regard to staging, the cache control program 4020 converts the block address [G] of the parity group into the identifier of the storage device and the block address [D] of the storage device and sends a read request to the storage device 1030 or another storage apparatus. In a case of the external LUs where a plurality of WWNs and LUNs are registered in the SDEV information 4050, it is only necessary to designate any one of the WWNs and LUNs by means of request transmission.

Also, the cache control program 4020 may add the redundancy code such as LRC or CRC to the write data at the time of destaging to the storage device 1030 and check it at the time of staging in order to enhance reliability. Furthermore, the cache control program 4020 may compare the data stored in the storage device with the data in the cache after destaging to make sure that the data has been stored with certainty. If any abnormality is detected by the check in any of these cases, the cache control program 4020 can execute the storage device blockage detection processing and the data restoration processing.

Read Processing

Figure 23:
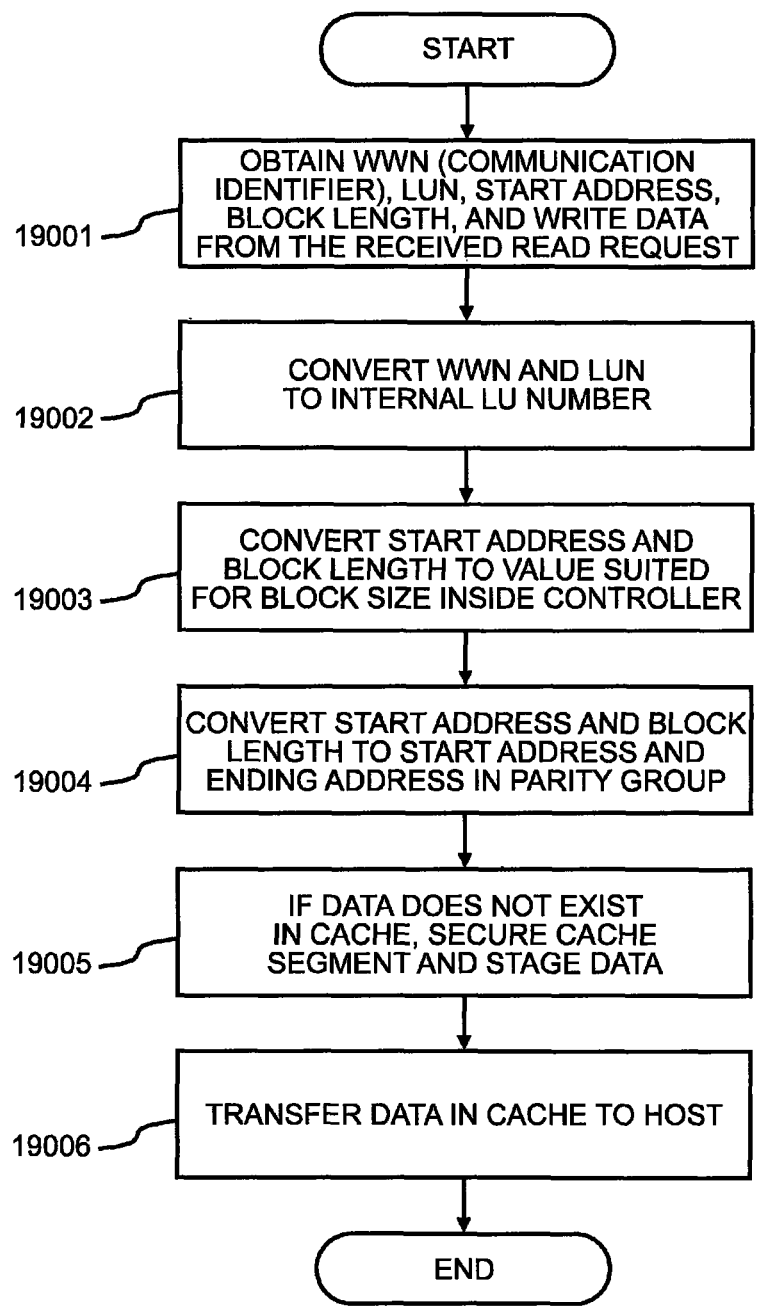
FIG. 23 shows a flow of read processing executed in the storage apparatus.

FIG. 23 shows an example of a flow of processing executed when the access processing program 4010 receives a read request. Incidentally, the following processing indicates that data reading can be performed by using the cache memory in both a case where the read target is an LU corresponding to its own storage device, and a case where the read target is an LU corresponding to an LU of another storage apparatus. Each step will be explained below.

(Step 19001) The access processing program 4010 obtains the WWN, LUN, start block address, block length, and read data from the read request received by the controller 1010.

(Step 19002) The access processing program 4010 converts the WWN and LUN into an internal LU identifier based on the LU path information. Incidentally, the same method as used in the write processing may be substituted for step 19001 and step 19002.

(Step 19003) The access processing program 4010 uses the internal LU configuration information 4070 and converts the start address and the block length in the read request (the start block address and the block length based on the block size which was reported to the host 1100 in advance) into a value based on the block length managed within the controller 1010.

(Step 19004) Furthermore, the access processing program 4010 uses the internal LU configuration information 4070 and converts the internal LU identifier and the converted start block address and block length into the parity group ID and the start block address and the ending block address of the parity group. Regarding calculation for the conversion, a value obtained by adding the start block address to the start address of the internal LU configuration information 4070 is used as the start block address in the parity group, and a value obtained by adding the block length to the start block address in the parity group is used as the ending block address in the parity group.

(Step 19005) The access processing program 4010 checks if data requested by the read request exists in the cache; and if such data does not exist, the access processing program 4010 secures a cache segment and copies the data to the cache by the staging processing.

(Step 19006) The access processing program 4010 transfers the data in the cache to the host 1100.

The above-described flow is the flow of the access processing program 4010. Incidentally, the WWN, the LUN, the start block address, and the block length may be checked in any of the steps in this processing sequence.

Incidentally, the storage apparatus 1000 does not have to be composed of one device. For example, it is possible that the storage device 1030 and the controller 1010 may exist as separate devices and be connected via a backend access network. Furthermore, an access control program for limiting the host capable of accessing LUs may be added to the controller 1010 or a local replication program for creating LU replicas in the same storage apparatus 1000 or a remote mirroring program for mirroring data to a different storage apparatus may be executed. More specifically, for example, a storage apparatus which uses the storage devices 1030 may be used at a copy source and a copy destination when performing remote mirroring.

Transmission of Storage Configuration Information

The configuration control program 4030 refers to part or all the storage configuration information in response to a configuration information reference request from the management computer 1200 and sends response information including at least one of the following content. The data format of data included in the response information does not have to be the same as that used to store data in the storage configuration information.

The content regarding the storage devices stored in the storage device information 4050: the blockage information, WWN, LUN, type, and providing capacity. As a matter of course, the content of all the storage devices does not have to be included in the response information. Also, part of the attribute values does not have to be included in the response information.

The content regarding parity groups stored in the PG configuration information 4060: the blockage information, RAID level, the number of storage devices belonging to the relevant parity group, and identifiers of storage devices. As a matter of course, the content of all the parity groups does not have to be included in the response information. Also, part of the content does not have to be included in the response information.

The content regarding internal LUs stored in the internal LU configuration information 4070: the blockage information, source ID, start address, ending address, and block size. As a matter of course, the content of all the internal LUs does not have to be included in the response information. Also, part of the content does not have to be included in the response information.

The content regarding the LU path definition stored in the LU path information 4080: the internal LU identifier, WWN, and LUN. As a matter of course, the content of all the LU path definition does not have to be included in the response information. Also, part of the content does not have to be included in the response information.

Incidentally, there are the following forms as specific examples of arguments of the configuration information reference request and the information included in the response information.

(Form 1) If a "storage device" is designated in the request, the content of the storage device information 4050 about all the storage devices 1030 in the storage apparatus 1000 which received the request is included in the response information.

(Form 2) If a "parity group" is designated in the request, the content of the PG configuration information 4060 about all the parity groups in the storage apparatus 1000 which received the request is included in the response information.

(Form 3) If an "internal LU" is designated in the request, the content of the internal LU configuration information 4070 about all the internal LUs in the storage apparatus 1000 which received the request is included in the response information.

(Form 4) If an "LU path definition" is designated in the request, the content of the LU path information 4080 about all the LU path definitions in the storage apparatus 1000 which received the request is included in the response information.

(Form 5) All the pieces of response information included in Forms 1 to 4 are included collectively.

(Form 6) One or more identifiers indicating specific entities, that is, the storage device(s), parity group(s), internal LU(s), or LU path definition(s), are designated in the request and the content regarding the designated entities from Form 1 to Form 4 is included in the response information (for example, by designating the identifier of a certain storage device and including an LU path definition to which a port designated by designating the port identifier relates).

Incidentally, the port identifier for the relevant storage apparatus may be included in the storage configuration information; and as a matter of course, this information may be included in the response information (for example, as additional information for Form 5).

Incidentally, the reliability may be enhanced by gathering a plurality of external LUs to form a parity group and creating redundant data such as RAID1 or RAID5.

Storage Configuration Information Update Timing in Consideration of Clustering

As a result of the above-described processing, the storage apparatus 1000 can provide LUs based on its own storage devices 1030 and provide LUs using the storage devices 1030 (or provided LUs) of other storage apparatuses belonging to the storage cluster. Therefore, the storage apparatuses 1000 can borrow and lend the storage capacity to each other more flexibly, so that the storage cluster can be operated flexibly.

As necessary information to lend or borrow the storage capacity, there is information for accessing an external LU, which is generated in the storage configuration information by the external LU definition processing (for example, the WWN and the LUN, or the identifiers of the storage apparatus and the internal LU). Incidentally, generating information about the external LUs after adding another storage apparatus which provides the external LUs to the storage cluster (for example, when receiving a series of requests sent from the management computer to provide LUs by using the external LUs), is more favorable than generating such information at the time of addition of that other storage apparatus to the storage cluster. As the number of the storage apparatuses 1000 joining the storage cluster, or the number of parity groups and internal LUs defined in the joining storage apparatuses increases, an information amount of the storage configuration information in the storage apparatus 1000 which uses the external LUs increases enormously, which is not favorable in terms of memory usage and a processing speed.

Furthermore, it is difficult to realize complete cache coherency in terms of processing efficiency in a storage cluster with the network 1500 installed outside the storage apparatuses. Therefore, if an internal LU defined in storage apparatus A is used by storage apparatus B as an external LU, it is favorable to invalidate the cache for the storage apparatus B or limit access to that internal LU to access via the storage apparatus B for a specified period of time (in other words, to inhibit access to the internal LU of the storage apparatus A without the intermediary of the storage apparatus B). If the installed LU is always provided by the storage apparatus A in the above-described case, it is inefficient for the storage apparatus B to retain information as the external LU; and, therefore, it is more efficient to create information on demand when the storage apparatus B starts using the internal LU of the storage apparatus A as the external LU.

Details of Management Computer

Next, the management computer 1200 will be explained.

Details of Information Retained by Management Computer

FIG. 28 shows an example of the management-side storage device information 12050.

The management-side storage device information 12050 stores the following information about the storage devices 1030 mounted in each storage apparatus:

(MA1) an identifier of the relevant storage device 1030;

(MA2) blockage information about the storage device 1030;

(MA3) the type of the storage device 1030; and (MA4) providing capacity of the storage device 1030.

Incidentally, each of (MA1) to (MA4) mentioned above has the same meaning as that of the storage device information 4050 explained with reference to FIG. 5. However, the management-side storage device information 12050 and the storage device information 4050 do not necessarily have to have the same data structure. Similarly, even if the management-side storage device information 12050 and the storage device information 4050 have information with the same meaning, they do not have to store them in the same data expression form. The WWNs and LUNs of the storage devices 1030 may be stored in this information.

FIG. 29 shows an example of the management-side PG configuration information 12060.

The management-side PG configuration information 12060 stores the following information about the parity groups defined in each storage apparatus:

(MB1) an identifier of the relevant parity group;

(MB2) blockage information about the parity group;

(MB3) a RAID level of the parity group; and (MB4) the number of storage devices belonging to the parity group and identifiers of the storage devices.

Incidentally, each of (MAB) to (MB4) mentioned above has the same meaning as that of the PG configuration information 4060 explained with reference to FIG. 6. However, the management-side PG configuration information 12060 and the PG configuration information 4060 do not necessarily have to have the same data structure. Similarly, even if the management-side PG configuration information 12060 and the PG configuration information 4060 have information with the same meaning, they do not have to store them in the same data expression form.

Figure 30:
FIG. 30 shows the content of management-side internal LU configuration information.

FIG. 30 shows an example of the management-side internal LU configuration information 12070.

The management-side internal LU configuration information 12070 stores the following information about the internal LUs defined in each storage apparatus:

(MC1) an identifier of the relevant internal LU;
(MC2) blockage information about the internal LU;
(MC3) an identifier of a source in which the internal LU is defined (the identifier of the source means the identifier of the parity group in its own apparatus or the port identifier (WWN or port ID) and LUN of another storage apparatus);
(MC4) block size of the internal LU; and
(MC5) providing capacity of the internal LU. It is possible that this capacity may be a value which is calculated by the controller 1010 based on the start address, the ending address, and the block size of the internal LU configuration information 4070 and received from the controller 1010. However, if the management computer 1200 can receive the start address and the ending address of the internal LU configuration information 4070, the management computer 1200 may calculate the value.

Incidentally, each of (MC1) to (MC5) mentioned above has the same meaning as that of the internal LU configuration information 4070 explained with reference to FIG. 7. However, the management-side internal LU configuration information 12070 and the internal LU configuration information 4070 do not necessarily have to have the same data structure. Similarly, even if the management-side internal LU configuration information 12070 and the internal LU configuration information 4070 have information with the same meaning, they do not have to store them in the same data expression form.

Furthermore, the management-side internal LU configuration information 12070 may have a reservation flag that indicates a future plan to use the relevant internal LU and can be designated by the user or the system. This reservation flag uses a logical value True/False; and if the reservation flag is True, it indicates a future plan to use the relevant internal LU. So, when the reservation flag is True, it is possible to provide a function inhibiting allocation of the internal LU to the host.

FIG. 31 shows an example of the management-side LU path information 12080.

The management-side LU path information 12080 stores the following information about logical units defined in each storage apparatus:

(MD1) an identifier of the relevant internal LU provided to the host 1100;
(MD2) a WWN (or an identifier of the access port 1013) (this information indicates from which port 1013 the internal LU is provided to the host 1100; and it should be noted that other types of identifier such as the port number may be used instead of the WWN; and the content may be different from the relevant information of the LU path information 4080 [for example, managing the storage apparatus according to the WWN and managing the management computer according to the port number]); and (MD3) an LUN.

Incidentally, each of (MD1) to (MD3) mentioned above has the same meaning as that of the LU path information 4080 explained with reference to FIG. 13. However, the management-side LU path information 12080 and the LU path information 4080 do not necessarily have to have the same data structure. Similarly, even if the management-side LU path information 12080 and the LU path information 4080 have information with the same meaning, they do not have to store them in the same data expression form.

FIG. 32 shows an example of the management-side storage port information 12090.

The management-side storage port information 12090 is information storing WWNs of ports included in each storage apparatus. Incidentally, it is possible that the content stored in this information may be obtained from the storage apparatus 1000 as part of acquisition of the storage configuration information.

FIG. 33 shows an example of the storage apparatus management attribute information 12010.

The storage apparatus management attribute information 12010 stores the following information about the storage apparatuses 1000 to be managed by the management computer:

(ME1) an identifier of the relevant storage apparatus 1000;
(ME2) a managed attribute of the storage apparatus 1000; and
(ME3) a management communication identifier of the storage apparatus 1000 (such as an IP address).

Incidentally, the following values may be used as the managed attribute of the storage apparatus, but other values may also exist:

an identifier of a storage cluster;
an identifier indicating that clustering is not performed (Standalone); and
an identifier indicating that management by the management computer 1200 is not performed (Unmanaged).

Incidentally, it is possible that the storage apparatus 1000 to be managed may be a storage apparatus detected by any of the following means or may be detected by other means.

The management system receives the identifier of the storage apparatus 1000 and the management communication identifier from the user and registers them in the above-described information.

The management system scans the range of a specified IP address and detects the storage apparatus 1000.

When the storage apparatus 1000 has a discovery function detecting an identifier of another storage apparatus connected via the network, the management system may obtain and use an identifier list of storage apparatuses detected by the discovery function from the storage apparatus 1000 or the user may be made to select the storage apparatus.

Creation and Update of Management-side Storage Configuration Information

Figure 34:
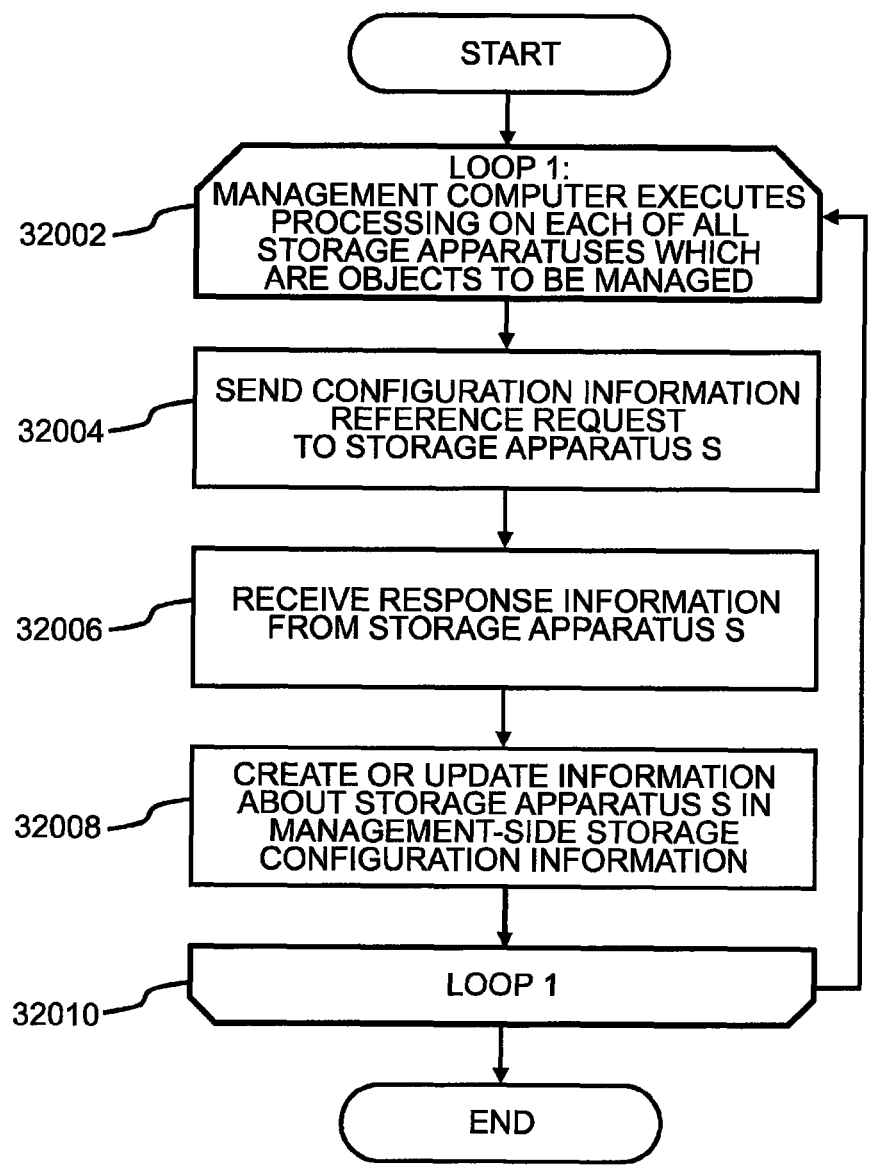
FIG. 34 shows a flow of processing for creating and updating management-side storage configuration information.

Next, processing for creating and updating the management-side storage configuration information will be explained with reference to FIG. 34. Incidentally, configuration changes of the storage apparatus 1000 may be reflected in the management-side storage configuration information by repeatedly executing the following processing.

(Step 32002, step 32010) The system management program 12010 executes processing from step 32004 to step 32008 on each of all the storage apparatuses 1000 to be managed by the management computer. Incidentally, the storage apparatus 1000 which is being processed in a loop will be hereinafter referred to as storage apparatus S. Incidentally, all the storage apparatuses 1000 are specified by specifying the storage apparatuses 1000 which are registered in the storage apparatus managed attribute information 12010 and are not registered as Unmanaged (or a cluster identifier or Standalone is registered). However, other methods may be used.

(Step 32004) The system management program 12010 sends a configuration information reference request to the storage apparatus S.

(Step 32006) The system management program 12010 receives the response information corresponding to the configuration information reference request from the storage apparatus S.

(Step 32008) The system management program 12010 creates or updates information about the storage apparatus S for the management-side storage configuration information based on the received response information.

Incidentally, there may be a storage apparatus 1000 to be managed by the management computer 1200, on which the above-described processing should not be executed. Also, the request and the response information in step 32004 and step 32006 have been described as including all pieces of the storage configuration information about the storage apparatus S. However, as explained in the description of Storage Configuration Information, there are various methods for obtaining the storage configuration information and these methods may be used together (for example, when it is apparent that information about a specified parity group has changed, update time would be obviously shorter if only the information about that parity group is obtained to update the management-side storage configuration information).

Furthermore, if it is apparent that the management-side storage configuration information will change as a result of management operation of the storage apparatus explained below, the management-side storage configuration information may be updated as an extension of the processing for management operation. This update may be performed by a method of invoking the processing in FIG. 33 and a method of specifying how the management-side storage configuration information would change, as a result of a search and updating the management-side storage configuration information to the specified content.

Storage Apparatus Management Screen and Processing

Figure 35:
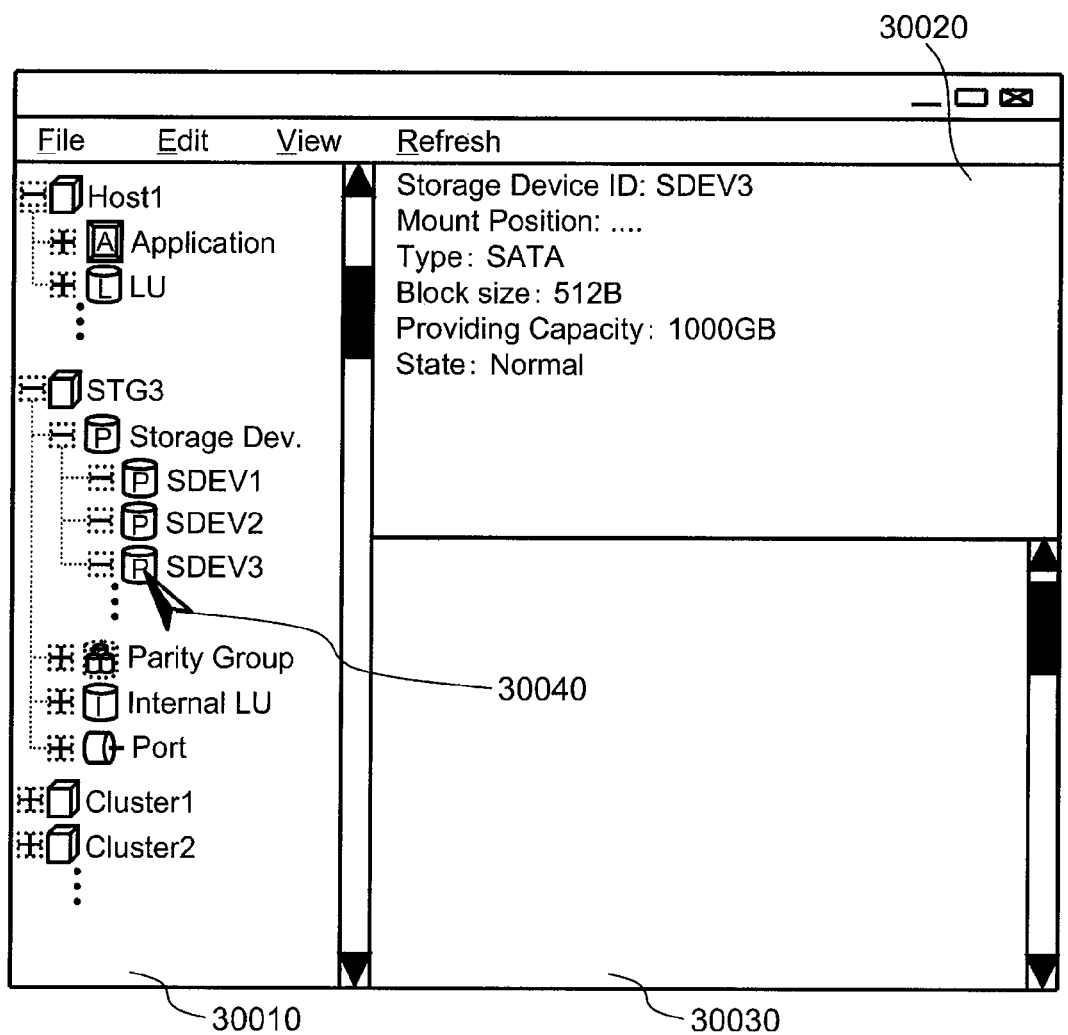
FIG. 35 shows a storage device information display example for the management system.

FIG. 35 shows a screen example displayed by the management computer 1200 on the input/output device for the display computer 1400.

A screen display includes three panes, that is, a first pane 30010, a second pane 30020, and a third pane 30030 and each pane displays information indicated below and assists input by the input/output device. A pane means each one of some display areas formed by dividing one window. The following explanation will be given by using a screen composed of a plurality of panes; however, a configuration in which screens corresponding to the aforementioned first to third panes are displayed in separate windows and are mutually synchronized by the user operation and then updated can be also applied.

(First Pane) Display objects that mean the storage apparatus 1000 and physical components (such as FMD) of the storage apparatus 1000 managed by the management computer 1200 or logical components logically generated by setting them to the storage system 100 (such as parity groups, internal LUs, and logical units). Incidentally, the display objects in FIG. 35 indicate icons and/or character strings, but may be other images or sounds. The first pane may further display the display objects which mean the host 1100 managed by the management computer 1200 and physical or logical components of the host 1100 (such as application execution instances).

Furthermore, the first pane displays a superior relationship or subordinate relationship between the display objects (as indicated with dotted lines in FIG. 35). The first pane displays the display objects showing all the components corresponding to each of the storage systems 1000 and the host 1100 (hereinafter referred to as the list display objects when such display objects are emphasized; and if it is particularly unnecessary to distinguish the list display objects from the aforementioned display objects, they will be simply referred to as the display objects). The display objects in FIG. 35 which uniquely specify each component such as the storage devices, parity group, internal LU, and port in FIG. 35 and to which identifiers are not attached are the list display objects.

(Second Pane) The second pane displays management information about a component (whether physical or logical) of the storage apparatus 1000 or the host 1100 corresponding to the display object designated from the input/output device 1405 by using the first pane. Incidentally, if a list display object is designated in the first pane, the second pane displays summary management information about the component (whether logical or physical) corresponding to the list display object.

(Third Pane) If the list display object is designated from the input/output device by using the first pane, the third pane displays management information about each of one or more components (whether logical or physical) corresponding to that list display object.

Incidentally, if there is a description stating that display object A is located at a superior position to (or in a superior relationship with) display object B, it means that the display object A is located closer than the display object B to a root in a tree display in the first pane. If there is a description stating that the display object A is located at a subordinate position to (or in a subordinate relationship with) the display object B, it indicates that the display object A is located closer than the display object B to a leaf in the tree display in the first pane.

Incidentally, if the input/output device 1405 includes a pointing device (for example, a mouse, a touch pad, a touch screen, or a pen tablet), the management computer 1200 expands and displays the relevant display objects having a subordinate relationship with the designated display object by double-clicking the display object. Although a GUI is assumed in FIG. 35 and screen diagram examples described below, but console output using a command line interface (CLI) may also be used.

Configuration or Status Display

FIG. 35 to FIG. 39, FIG. 42, FIG. 44, FIG. 46, and FIG. 47 are screens for displaying information about the components of the storage apparatus 1000. Incidentally, needless to say, these screens and other screen displays described below by the system management program 12010 are displayed by referring to the management-side storage configuration information. Incidentally, FIG. 35 to FIG. 38 are described by taking a storage apparatus 1000 not included in a storage cluster as an example; however, a similar screen may be displayed about a storage apparatus 1000 included in a storage cluster or displayed as a storage cluster. Furthermore, FIG. 42 and FIG. 44 may be applied to a storage apparatus not included in a storage cluster. Also, the number of panes on the screen display may not be limited to three.

A screen in FIG. 35 displays information about a selected storage device 1030 in the second pane by selecting the storage device 1030 as a display object in the first pane. Incidentally, if a display object (not shown in the drawing) corresponding to an external LU is selected in the first pane, the second pane may display a WWN and LU for accessing the external LU as information about the external LU, other than the information shown in FIG. 35.

It should be noted that the system management program 12010 may send a parity group definition request (which designates a storage device(s) designated by the user) to the storage apparatus including that designated storage device(s) by having the user designate one or more storage devices on this screen.

Figure 36:
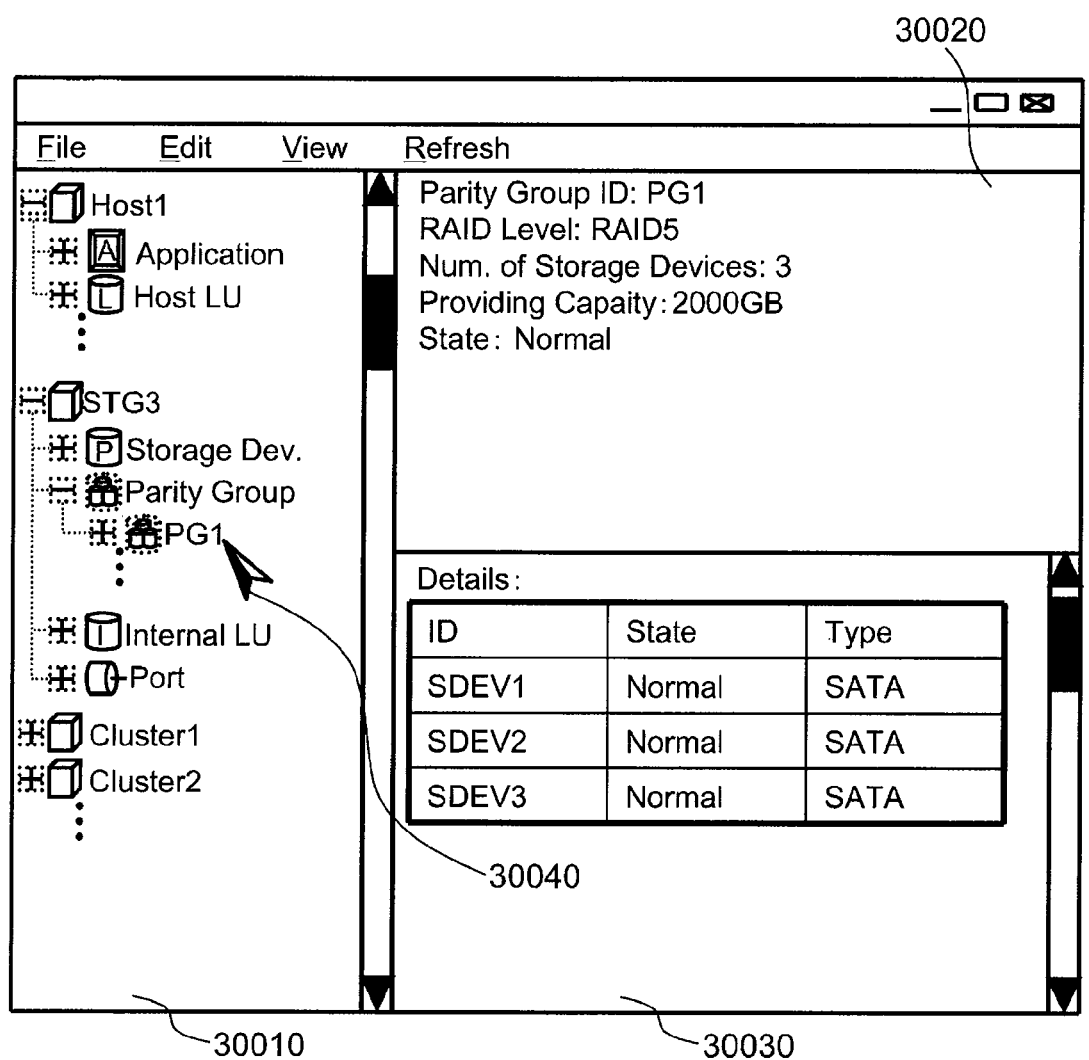
FIG. 36 shows a parity group information display example for the management system.

A screen in FIG. 36 displays information about a selected parity group in the second pane by selecting the parity group as a display object in the first pane. Incidentally, if a parity group including an external LU is selected in the first pane, part or all the pieces of information about the external LU explained with reference to FIG. 35 may be collectively displayed as additional information in the second pane (for example, the WWN and the LUN, and the identifier of the storage apparatus 1000 obtained by WWN conversion). It should be noted that the providing capacity of the parity group is calculated based on the storage capacity and RAID level of the joining storage devices 1030, but other methods may be used for calculation.

Incidentally, the system management program 12010 may send a parity group definition request (which designates a parity group designated by the user and a start address and ending address determined based on the providing capacity) to a storage apparatus including the designated parity group by having the user designate the parity group and the providing capacity on this screen. Similarly, the system management program 12010 may send an undefined parity group request (which designates a parity group designated by the user) to a storage apparatus including the designated parity group by having the user designate the parity group on this screen.

Figure 37:
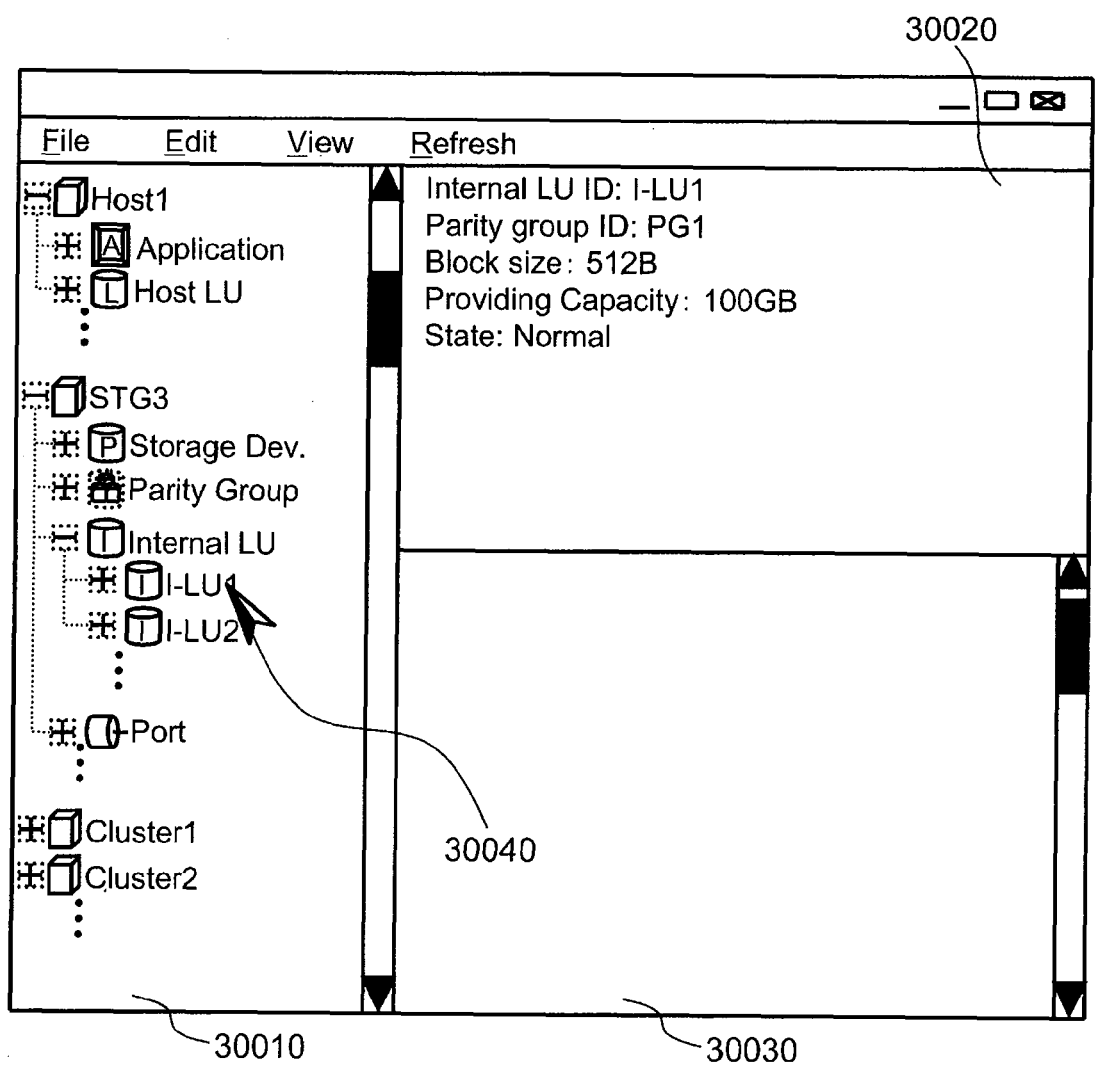
FIG. 37 shows an internal LU information display example for the management system.

A screen in FIG. 37 displays information about a selected internal LU in the second pane by selecting the internal LU as a display object in the first pane. Incidentally, if an internal LU defined in a parity group including an external LU is selected in the first pane, part or all the pieces of information about the external LU explained with reference to FIG. 35 may be collectively displayed as additional information in the second pane (for example, the WWN and the LUN, and the identifier of the storage apparatus 1000 obtained by WWN conversion). It should be noted that the providing capacity of the internal LU is calculated based on the start address, the ending address, and the block size of the management-side internal LU configuration information, but other methods may be used for calculation.

Incidentally, the system management program 12010 may send an LU path definition request (which designates an internal LU and port designated by the user) to a storage apparatus including the designated port by having the user designate the internal LU and the port on this screen. Similarly, the system management program 12010 may send an undefined internal LU request (which designates the internal LU designated by the user) to a storage apparatus including the designated internal LU by having the user designate the internal LU on this screen.

Figure 38:
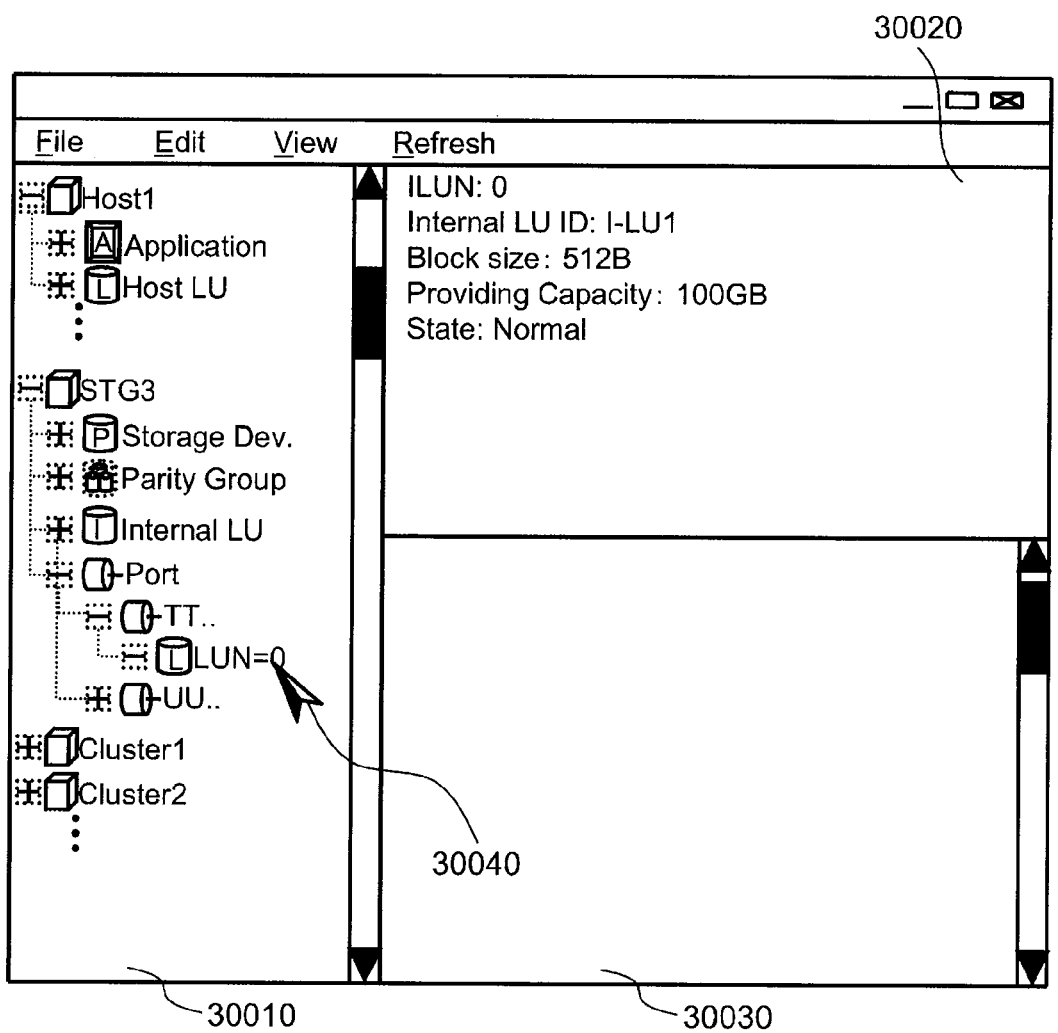
FIG. 38 shows an LU path information display example for the management system.

A screen in FIG. 38 displays information about a selected LU in the second pane by selecting the LU as a display object in the first pane. Incidentally, if an LU corresponding to an internal LU defined in a parity group including an external LU is selected in the first pane, part or all the pieces of information about the external LU explained with reference to FIG. 35 may be collectively displayed as additional information in the second pane (for example, the WWN and the LUN, and the identifier of the storage apparatus 1000 obtained by WWN conversion). Incidentally, it is possible to use the providing capacity calculated based on the internal LU corresponding to the providing capacity of the LU, but other methods may be used for calculation. Incidentally, the system management program 12010 may send an LU path definition cancellation request (which designates a port and LU designated by the user) to a storage apparatus providing the designated LUN by having the user designate the port and LUN on this screen.

Capacity Display of Storage Cluster

Figure 39:
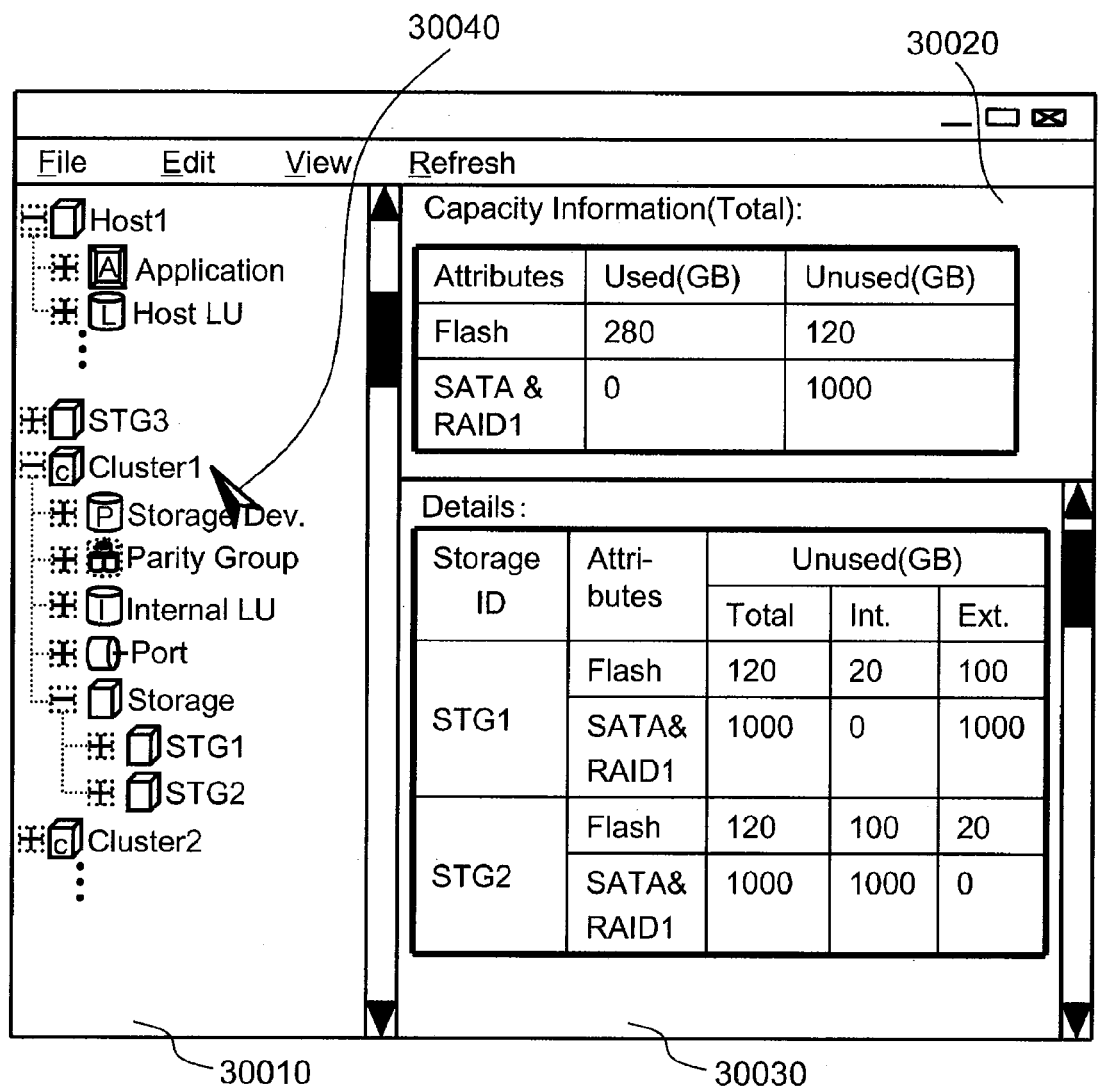
FIG. 39 shows a capacity information display example of the management system.

A screen in FIG. 39 displays capacity summary information about a selected storage cluster in the second pane by selecting the storage cluster as a display object in the first pane; and displays, in the third pane, the details of capacity information about each storage apparatus 1000 included in the storage cluster. Incidentally, a case where a value of the capacity display matches an attribute condition or attribute condition set for one or more storage devices or parity groups designated by the user is shown; however, there will be no problem even if there is no condition. Incidentally, a set of one or more attribute conditions will be hereinafter referred to as the attribute condition set.

The used capacity and the unused capacity of each attribute condition set displayed in the second pane are calculated according to the following standards:

Used Capacity: the total providing capacity of internal LUs for which path definitions are set. However, the providing capacity of the internal LUs related to external LUs is excluded (in order to avoid redundant calculation). Incidentally, the providing capacity of the internal LUs without path definitions may be added (in a case where the internal LUs without path definitions are also considered to have been used). Furthermore, even in the case of the internal LUs without path definitions, those whose reservation flag explained earlier with reference to FIG. 30 is True may be considered to be in use as the internal LUs which are scheduled to be used in the future (in a case where they have the reservation flag).

Unused Capacity: the total capacity of storage areas in parity groups in which the internal LUs are not defined. Incidentally, the providing capacity of the internal LUs without path definitions may be added (in a case where the internal LUs without path definitions are considered to be unused). Furthermore, even in the case of the internal LUs without path definitions, those whose reservation flag is True may be excluded from the unused capacity (in a case where the internal LUs without path definitions are considered to be unused and have the reservation flag).

Firstly, possible objects to be calculated are all the parity groups and the internal LUs defined in all the storage apparatuses 1000 belonging to the storage cluster. However, there may be a case where storage devices used by only the controller 1010 exist; and all the parity groups and the internal LUs in the storage apparatus do not always have to be the objects to be calculated.

The capacity information displayed in the third pane is information indicating the details of the unused capacity of each storage apparatus belonging to the storage cluster. The capacity value of each storage apparatus and/or each attribute condition set displayed in the third pane is calculated according to the following standards:

Unused Capacity (total): the same as that of the second pane.

Unused Capacity (in a case of using the internal storage devices): this is a column indicated as Int. in this drawing. The total capacity of storage areas in the parity groups in which the internal LUs are not defined. However, the parity groups which are objects to be calculated are parity groups defined in the storage apparatuses which are objects of the summary (total capacity is an example of the summary). Incidentally, the providing capacity of the internal LUs without path definitions may be added (in a case where the internal LUs without path definitions are considered to be unused). Furthermore, even in the case of the internal LUs without path definitions, those whose reservation flag is True may be excluded from the unused capacity (in a case where the internal LUs without path definitions are considered to be unused and have the reservation flag).

Unused Capacity (in a case of using the external storage devices): this is a column indicated as Ext. in this drawing. The total capacity of storage areas in the parity groups in which the internal LUs are not defined. However, the parity groups which are objects to be calculated are parity groups defined in the storage apparatuses which are not the objects of the summary. Incidentally, the providing capacity of the internal LUs without path definitions may be added (in a case where the internal LUs without path definitions are considered to be unused). Furthermore, even in the case of the internal LUs without path definitions, those whose reservation flag is True may be excluded from the unused capacity (in a case where the internal LUs without path definitions are considered to be unused and have the reservation flag).

It should be noted that there are the following patterns of standards for selecting the storage apparatuses which are not the summary objects with regard to the unused capacity (in the case of using the external storage devices).

(Pattern 1) A set of storage apparatuses obtained by excluding the storage apparatuses, which are the summary objects, from all the storage apparatuses 1000 included in the storage cluster.

(Pattern 2) A set of storage apparatuses obtained by excluding storage apparatuses, with which the summary object storage apparatuses cannot communicate without the intermediary of another storage apparatus, from Pattern 1.

(Pattern 3) A set of storage apparatuses obtained by excluding storage apparatuses, with which the summary object storage apparatuses cannot communicate even with the intermediary of another storage apparatus, from Pattern 1.

Incidentally, the state of incapable of communication includes the state of incapable of communication due to a connection form of the network 1500 or the setting of the network device. Also, a case where communication cannot be performed due to the network setting of the storage apparatus may be considered as the state of incapable of communication.

Incidentally, the providing capacity of the parity group can be calculated based on the RAID level and value of joining storage devices stored in the management-side PG configuration information 12060 and the providing capacity of the relevant storage devices stored in the management-side storage device information 12050. However, other calculation methods may be used.

Incidentally, the providing capacity of the internal LU can be calculated based on the providing capacity of the parity group and the start address and the ending address of the management-side internal LU configuration information 12070. However, other calculation methods may be used.

Since a storage area in the parity group in which internal LUs are not defined is a storage area of the parity group, which is not included in the start address and the ending address stored in the management-side internal LU configuration information 12070, this capacity can be calculated based on the providing capacity of the parity group and the start address and the ending address of the management-side internal LU configuration information 12070. However, other calculation methods may be used. For example, if the management computer has information for managing unused areas of the parity group (unused area management information), reference may be made to this information.

Incidentally, the management computer 1200 stores condition information indicating a plurality of attribute condition sets described earlier (not shown in the drawing) in the memory 1201. Also, the system management program 12010 may create, change, or delete an attribute condition set in accordance with an instruction of the user. Furthermore, the summary object, besides the storage apparatus, may be a port of the storage apparatus. This is because it would be easier to recognize the unused capacity as viewed from the port if an LU is defined by designating the port for the purpose of LU creation described below.

LU Creation

Figure 42:
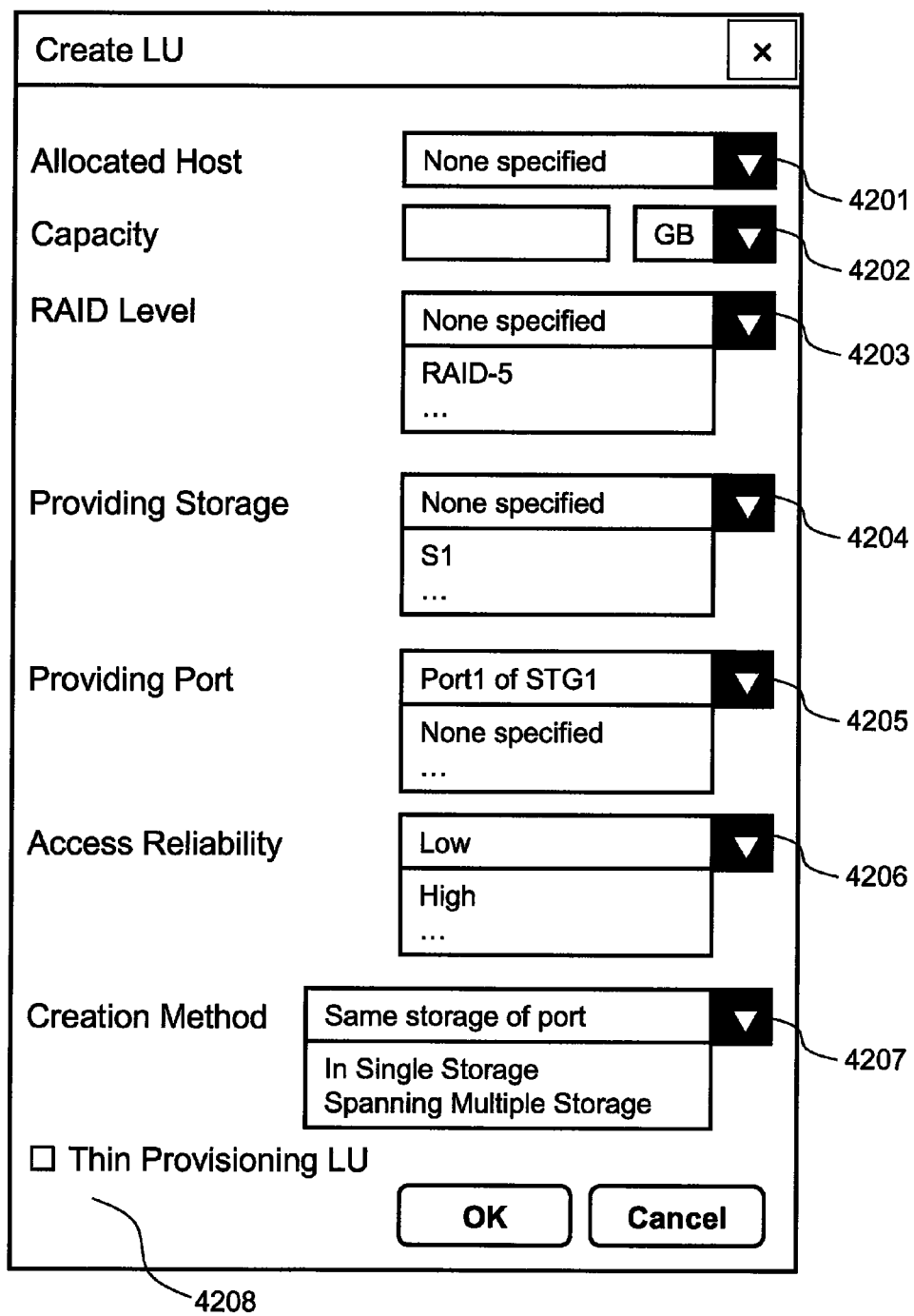
FIG. 42 shows an LU creation screen example for the management system.

The system management program 12010 according to this embodiment creates an LU with the designated providing capacity at the designated port (or a port that can be accessed by the designated host) by searching for an appropriate storage apparatus 1000 and an unused area of a parity group based on (1) the providing capacity, (2) the identifier of the port or the host, (3) (option) other conditions, which are received from the user. FIG. 42 is a screen for that purpose. However, the system management program may have an LU creation processing screen other than the screen shown in FIG. 42. Incidentally, this screen is displayed by operating a display object indicating, for example, a storage cluster.

In the example shown in FIG. 42, each user input described above corresponds to the content entered below.

(1) Providing Capacity: an input field 4202

(2) Port or Host Identifier: an input field 4205 or an input field 4201

(3) Other Conditions: an input field 4203, input field 4204, input field 4206, input field 4207, and/or input field 4208

Incidentally, the meaning of each field in FIG. 42 and search standards for the system management program 12010 when the relevant information is input to the relevant field are as follows.

(Input Field 4201) When the host is designated, the system management program 12010 specifies a port of the storage apparatus 1000, which can be accessed by the designated host, and defines an internal LU in an unused area of a parity group for the storage apparatus 1000 with the specified port. Incidentally, the system management program 12010 specifies the port of the storage apparatus 1000, which can be accessed by the designated host, by referring to the network connection information 12210.

(Input Field 4203) When the RAID level is designated, the system management program 12010 defines an internal LU in an unused area of a parity group of the designated RAID level.

(Input Field 4204) When the providing storage apparatus is designated, the system management program 12010 defines an internal LU in an unused area of a parity group in the designated storage apparatus.

(Input Field 4205) When the port is designated, the system management program 12010 defines an internal LU in an unused area of a parity group in a storage apparatus 1000 having the designated port.

(Input Field 4206) When high reliability is designated, the system management program 12010 defines an internal LU in an unused area of a (dummy) parity group based on an external LU for which a plurality of access paths exist.

(Input Field 4207) When Same Storage of Port is designated, the system management program 12010 defines an internal LU in an unused area of a parity group in which the relevant storage device exists in the same storage apparatus as the port specified in the input field 4201 or the input field 4205. This standard can be interpreted as not using an external LU.

When In Single Storage is designated, the system management program 12010 permits an unused area of a parity group defined without allowing a plurality of external LUs to be mixed, in addition to Same Storage of Port.

When Spanning Multiple Storage is designated, the system management program 12010 permits an unused area of a parity group defined by allowing a plurality of external LUs to be missed, in addition to Same Storage of Port.

(Input Field 4208) When this field is checked, the system management program 12010 may permit an internal LU definition using the thin provisioning technique.

Incidentally, the input fields in FIG. 42 are not mandatory, except for the providing capacity field 4202, the input field 4201, or the input field 4205.

LU Creation Processing

Figure 43:
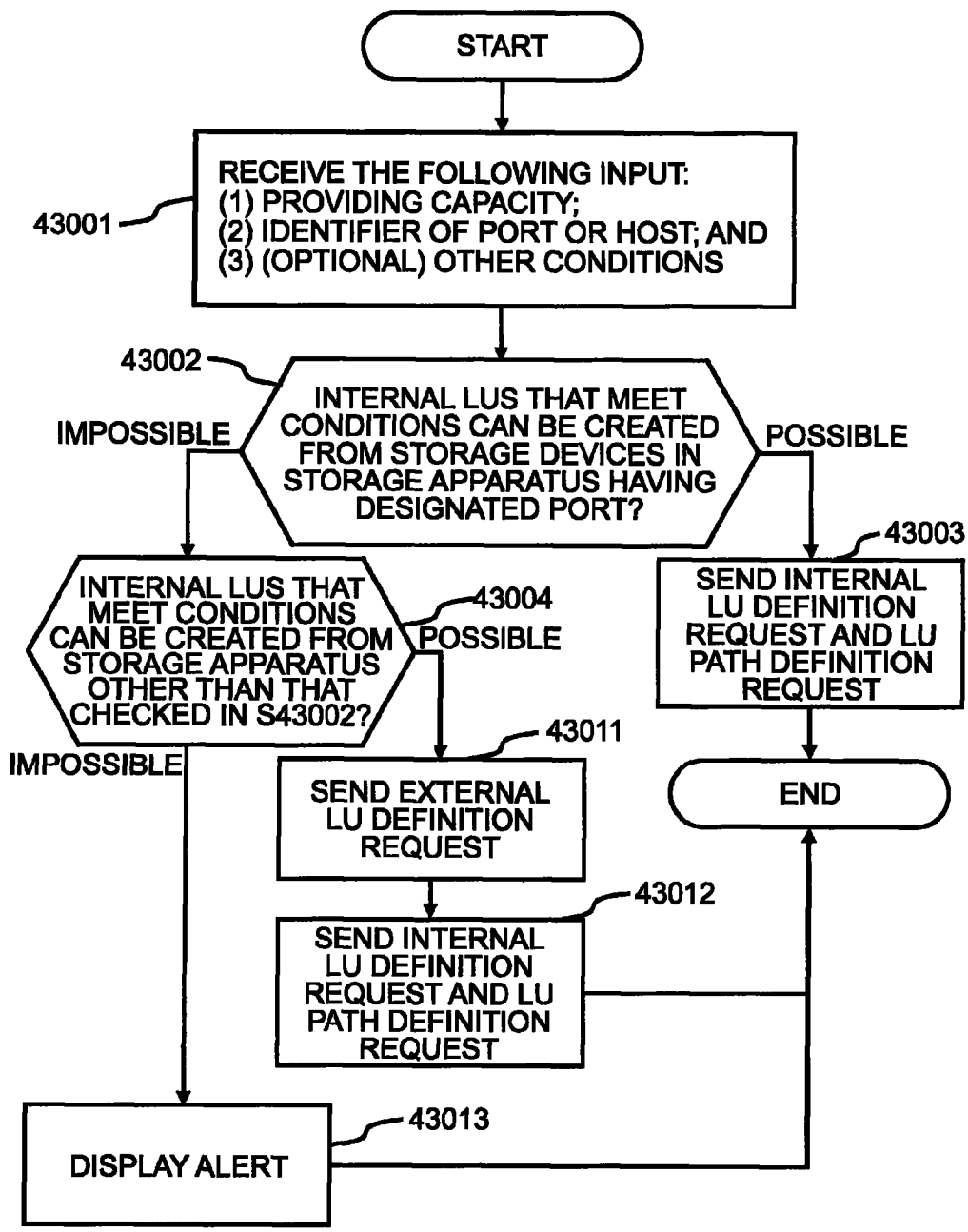
FIG. 43 shows a flow of LU creation processing for the management system.

FIG. 43 shows a flow of LU creation processing executed by the system management program 12010. The following explanation will be given in accordance with this flow. Incidentally, upon executing the processing, the system management program 12010 refers to the management-side storage configuration information.

(Step 43001) The system management program 12010 receives (1) the providing capacity, (2) the identifier of the port or the host, (3) (option) other conditions, via the management I/O program 14010 from the user.

(Step 43002) The system management program 12010 judges whether or not a parity group having an unused area equal to or more than the providing capacity can be searched from parity groups defined from the storage devices 1030 in the storage apparatus having the designated storage apparatus port (or the port which can be accessed from the host). Incidentally, if other conditions are set, those conditions are considered when performing the search. Incidentally, the port of the storage apparatus which can be accessed from the host can be specified by referring to the network connection information 12210.

(Step 43003) If it is determined as the judgment result of step 43002 that such an unused area exist (that is, the internal LU can be defined), the system management program 12010 sends an internal LU definition request based on the unused area searched in step 43002 and the providing capacity, to the storage apparatus with the designated port. Then, the system management program 12010 sends an LU path definition request, which designates the defined internal LU and the designated port, to the storage apparatus with the designated port.

(Step 43004) If it is determined as the judgment result of step 43002 that such an unused area does not exist (that is, the internal LU cannot be defined in the same storage apparatus as that of the port), the system management program 12010 judges whether or not the parity group with the unused are equal to or more than the providing capacity can be searched from among the parity group defined from the storage devices 1030 in other storage apparatuses. Incidentally, if other conditions are set, those conditions are considered when performing the search.

(Step 43011) If it is determined as the judgment result of step 43004 that such an unused area exist (that is, the internal LU can be defined), the system management program 12010 sends an internal LU definition request based on the unused area searched in step 43004 and the providing capacity, to another storage apparatus (the storage apparatus with the unused area). Then, the system management program 12010 sends an LU path definition request, which designates the defined internal LU and the designated port, to the above-mentioned other storage apparatus. Furthermore, the system management program 12010 sends an external LU definition request, which designates the LU defined in the above-mentioned other storage apparatus, to the storage apparatus with the designated port.

(Step 43012) The system management program 12010 sends an internal LU definition request, which designates the unused area of the dummy parity group defined in step 43011, to the storage apparatus with the designated port. Then, the system management program 12010 sends an LU path definition request, which designates the defined internal LU and the designated port, to the storage apparatus with the designated port.

(Step 43013) The system management program 12010 displays that it fails to create the LU.

The above-described processing is the LU creation processing. Incidentally, in the explanation about the LU creation processing, it is determined that the internal LU for which the LU path is not defined has been used; however, such an internal LU may be judged to be unused, like the case of the capacity display, and may be considered as a search object. Also, if the internal LU identifier can be used instead of designating the WWN and the LUN when accessing between the storage apparatuses, transmission of the LU path definition request to the other storage apparatus in step 43011 may be omitted.

When an LU is to be created by designating the host computer, the port, or the storage apparatus itself as described above, if an internal LU is defined from a parity group on the same conditions in both cases where the internal LU is defined from a parity group in the storage apparatus selected from the designated port or host (or the designated storage apparatus, which will be referred to as the directly-provided storage apparatus for the sake of convenience) and where the internal LU is defined from a parity group in the storage apparatus other than the above-mentioned storage apparatus, the internal LU provided from the parity group in the directly-provided storage apparatus is superior in reliability and performance (provided, however, that the load on the controller, a cache hit rate, and other factors can be ignored). In terms of reliability, this is because the network 1500 is installed between the devices and, therefore, the possibility of encountering a failure such as accidental cable disconnection increases.

Although it depends on the physical configuration and setting of the network 1500, an access request is processed via the network 1500. So, the network 1500 may sometimes become a bottleneck due to its transfer bandwidth, TOPS, and so on. Similarly, if transfer delay of the network 1500 is significant, particularly response time of a read request worsens. Also, it is obvious that the network 1500 tends to easily become a bottleneck if the LU creation form described above is excessively used.

However, if the parity group that meets the desired conditions does not exist or if the load is too high and inappropriate, there is no choice but to provide it from other storage apparatuses as described above. In the above-described LU creation processing, the suitable unused area is firstly searched from the internal parity groups by having the user input only the conditions; and if the search failed to find the suitable unused area, the unused area is searched from internal LUs (that is, parity groups and storage devices) in other storage apparatuses. Therefore, storage management that would have little impact in terms of the aforementioned reliability or performance can be realized.

Furthermore, because of the reasons described above, a storage apparatus to which a storage device is to be added should preferably be an apparatus that can easily become the directly-provided storage apparatus. The user can easily understand management issues, on a storage apparatus (or port) basis, such as which storage apparatus can still be used as the directly-provided storage apparatus and whether the unused capacity is deficient even if the internal LUs of other storage apparatuses are used, by displaying each of the internal unused areas (Int.) and the external unused areas (Ext.) in FIG. 39.

Incidentally, when grouping a plurality of LUs or performing, for example, remote copying or local copying by using a storage cluster according to this embodiment, all the LUs in the group should preferably be those defined by the storage apparatus, but may not be those defined by the storage apparatus.

Capacity Shortage Alert

Figure 44:
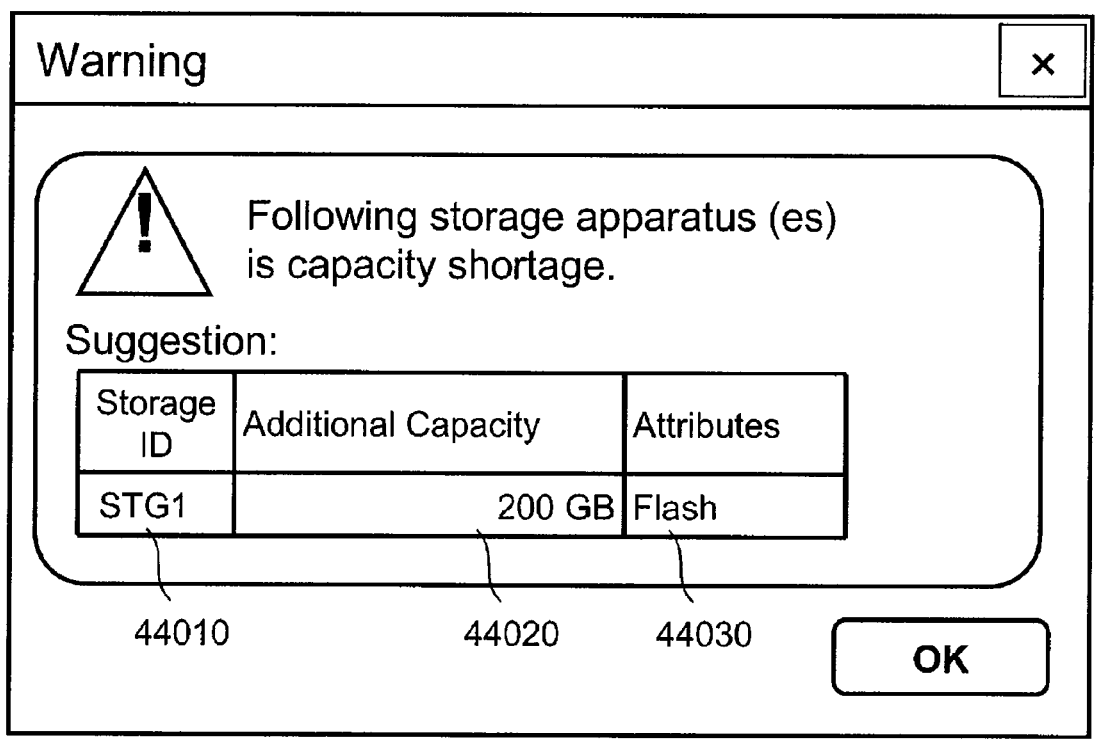
FIG. 44 shows a display example of a capacity shortage alert by the management system.

FIG. 44 is a screen regarding capacity shortage to be displayed by the management computer 1200 on the input/output device for the display computer 1400. Incidentally, this screen is displayed, for example, at the following timing:

(Timing 1) at the timing of execution of step 43013 in FIG. 44; and (Timing 2) at the timing when the system management program 12010 repeatedly (more preferably, periodically) monitors the unused capacity and detects that the unused capacity falls below a specified value (or rate).

Information displayed on this screen is as follows:

an identifier of the storage apparatus 1000 for which addition of a storage device is recommended (a plurality of identifiers may be displayed) 44010;

the type or attribute condition set of the storage device recommended to be added (a plurality of types or attribute condition sets may be displayed) 44030; and recommended additional capacity 44020.

Incidentally, it is possible that the additional capacity may be displayed as a capacity to be added on the parity group level (which can be said as the capacity of storage devices excluding the capacity of redundant data consumed by RAID processing). However, since it is necessary to add the storage device(s) including those for the redundant data from the viewpoint of the user adding the storage device(s), how much capacity is required as the storage device(s) may be displayed. In this case, it would be more kind to the user to display the additional capacity for each combination pattern of (1) the RAID level and (2) the number of storage devices joining the parity group.

Regarding Timing 1, the above-described display information may not be recommendations, but the type of the storage device(s), providing capacity, storage apparatus to which the storage device(s) should be added, that are required to create an LU which failed to be created by the flow in FIG. 43 may be displayed.

Capacity Shortage Detection Processing

Figure 45:
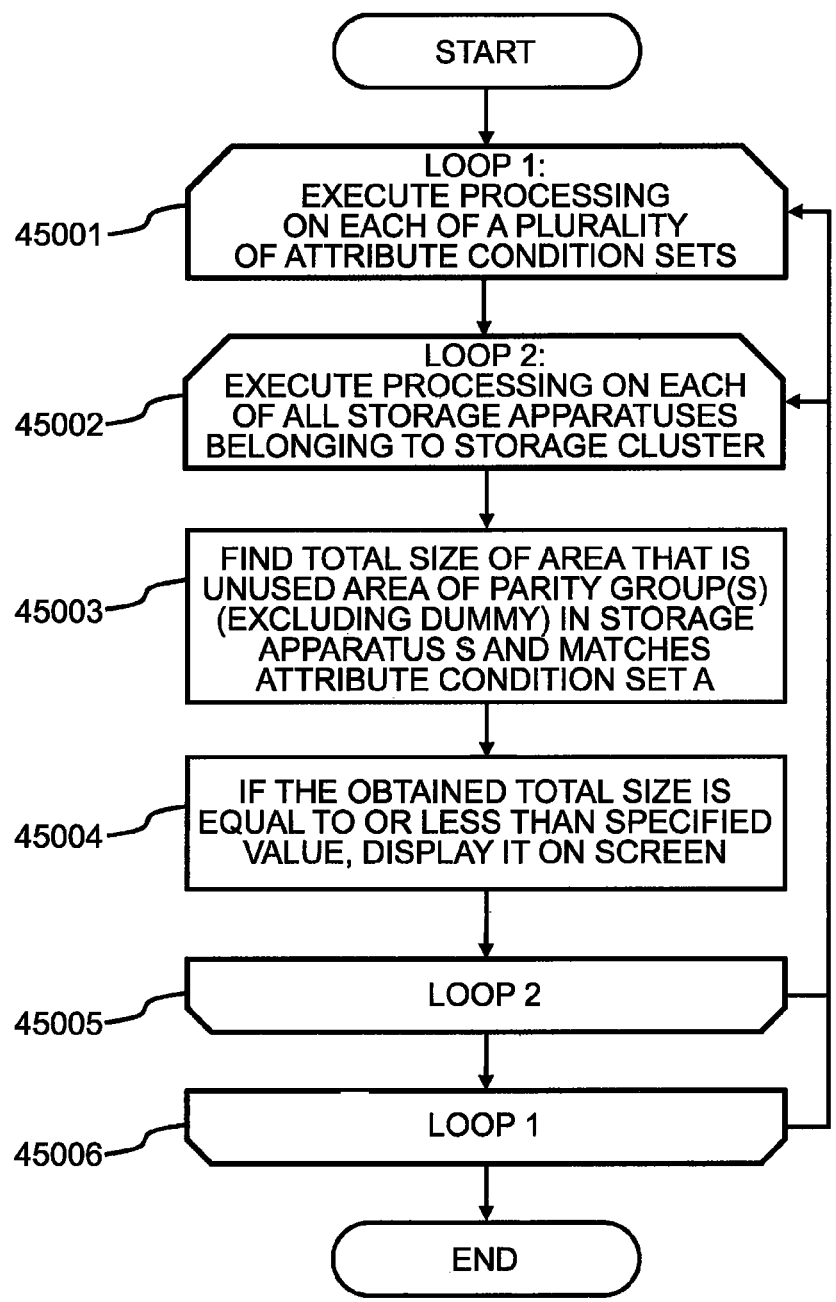
FIG. 45 shows a flow of capacity shortage detection processing by the management system.

FIG. 45 shows a flow of capacity shortage detection processing executed by the system management program 12010, assuming Timing 2. Incidentally, when the management computer manages a plurality of storage clusters, the following processing may be executed on each storage cluster or on a standalone storage apparatus as the target.

(Step 45001, step 45006) The system management program 12010 executes processing from step 45002 to step 45005 on each of the plurality of Attribute Condition Sets. Incidentally, the attribute condition set which is being processed in a loop will be hereinafter referred to as attribute condition set A in the following explanation. Incidentally, at least one the plurality of attribute condition sets mentioned above should preferably be the same as the plurality of attribute condition sets used in FIG. 39, but that is not mandatory.

(Step 45002, step 45005) The system management program 12010 executes step 45003 and step 34004 on each of all the storage apparatuses 1000 belonging to a specified storage cluster. Incidentally, the storage apparatus 1000 which is being processed in a loop will be hereinafter referred to as storage apparatus S in the following explanation.

(Step 45003) The system management program 12010 calculates a total capacity of unused areas which are in a parity group(s) (excluding a dummy) defined in the storage apparatus S and match the attribute condition set A. Incidentally, the calculation is performed by referring to the management-side storage configuration information.

(Step 45004) The system management program 12010 performs the screen display as described below in a case where the total capacity calculated in step 45003 is equal to or less than a specified value (or rate):

display the identifier of the storage apparatus S as the storage identifier 44010;

display, as the additional capacity 44020, the capacity equal to or more than a value obtained by subtracting the total capacity in step 45003 from a specified value; and display the content of the attribute condition set A as the type or attribute condition set (a plurality of types or attribute condition sets may be displayed) 44030 of the recommended storage device(s) to be added.

Incidentally, the information displayed in the above-described processing flow is the values suited for the case of Same Storage of Port in the input field 4207 in FIG. 42 upon the LU creation, while it is a suggestion to excessively enhance the storage devices if such information is used for the In Single Storage case or the Spanning Multiple Storage case, which is conditional on the use of external LU(s). Therefore, the system management program 12010 may display a screen suited for the In Single Storage case and the Spanning Multiple Storage case. In this case, the total size in step 45003 is calculated about all the storage apparatuses belonging to the storage cluster. Incidentally, the identifier of the storage apparatus in the case of the display in step 45004 may be displayed as Any of the Storage Apparatuses belonging to the Storage Cluster.

Joining in Storage Cluster, Removal from Storage Cluster, and Cluster Generation When defining a new storage cluster by using a storage apparatus 1000, the system management program 12010 receives the identifier of the storage apparatus from the user via the management I/O program 14010. Also, when having a storage apparatus join a defined storage cluster, the system management program 12010 receives the identifier of the storage apparatus and the identifier of the storage cluster from the user via the management I/O program 14010. Then, the system management program 12010 updates the managed attribute of the designated storage apparatus in the storage apparatus managed attribute information 12100 to the identifier of the new storage cluster (or the designated storage cluster). As a result, the storage cluster explained above can be used for management.

Figure 46:
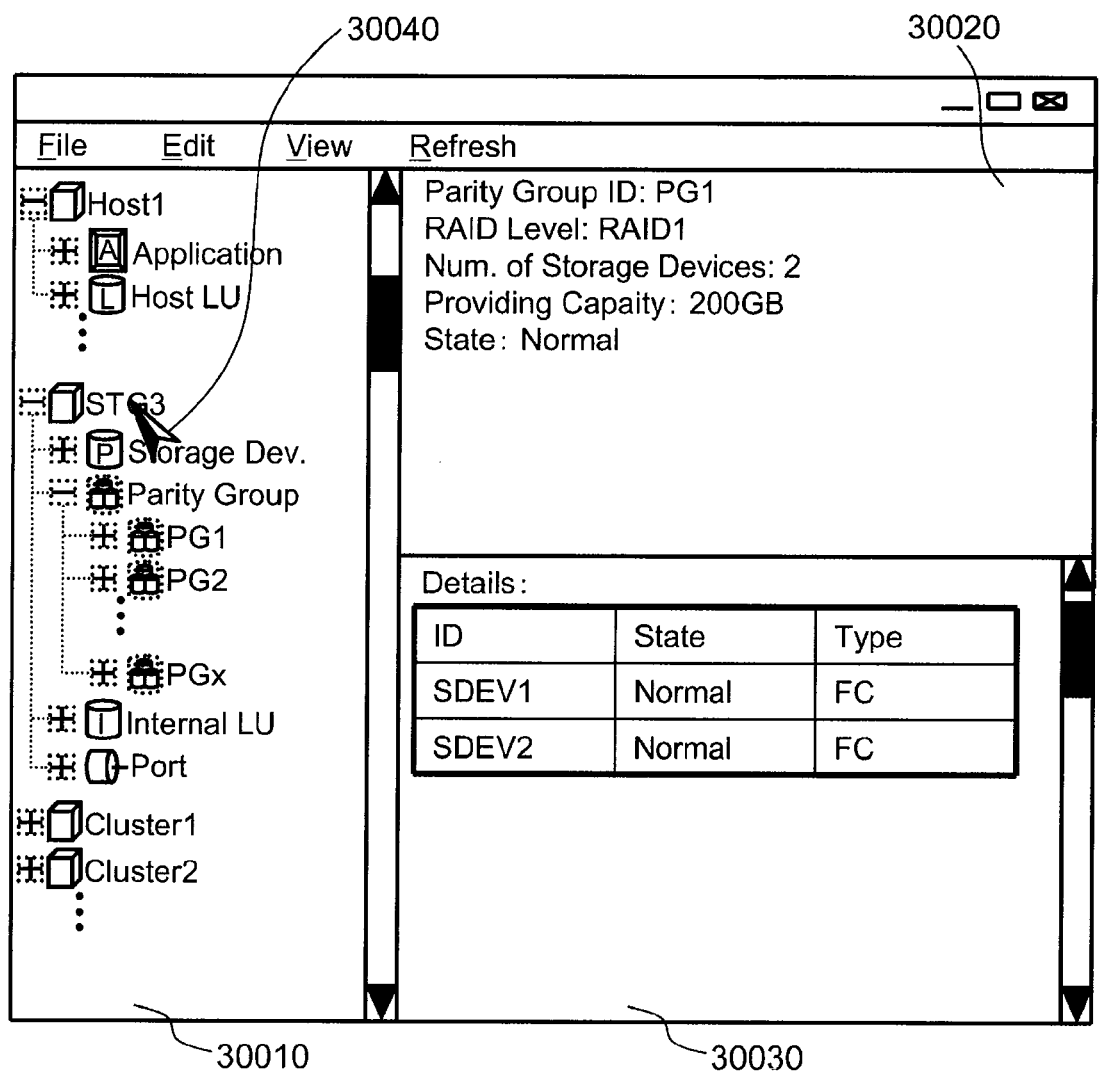
FIG. 46 shows a storage cluster operation screen example for the management system.
Figure 47:
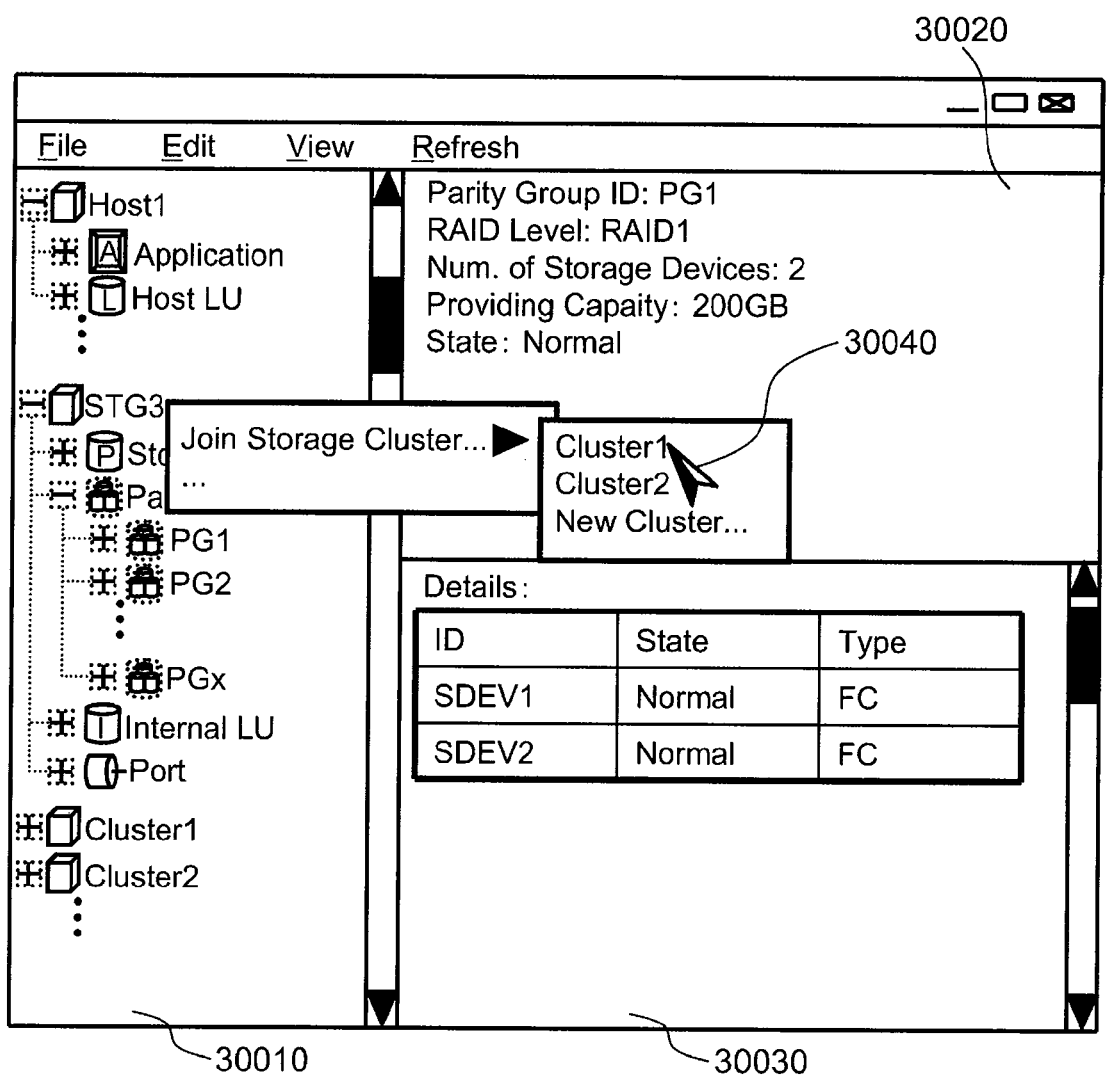
FIG. 47 shows a storage cluster operation screen example for the management system.

FIG. 46 and FIG. 47 are screen examples for having the user perform the above-described input. FIG. 46 shows a screen example immediately before starting the right click on a display object which is a storage apparatus required by the user to join a storage cluster. FIG. 47 shows a screen example after selecting Join Storage Cluster from a menu displayed as a result of the right click and immediately before designating Cluster 1 from defined storage clusters.

When removing any of storage apparatuses form a storage cluster, the following processing is executed.

(Step A) The system management program 12010 receives the identifier of the storage apparatus from the user via the management I/O program 14010.

(Step B) The system management program 12010 checks whether or not an LU (or internal LU) of the designated storage apparatus is used as an external LU by another storage apparatus in the storage cluster.

(Step C) If it is confirmed as a result of step B that the LU (or internal LU) of the designated storage apparatus is not used as an external LU, the system management program 12010 changes the managed attribute of the designated storage apparatus to Standalone. More specifically, the attribute information of the designated apparatus in the storage apparatus managed attribute information 12100 is changed to Standalone.

(Step D) If it is confirmed as a result of step B that the LU (or internal LU) of the designated storage apparatus is used as an external LU, an error indicating that the designated storage apparatus cannot be removed is returned. Incidentally, in this case, the identifier of the storage apparatus (and also the identifier(s) of the corresponding internal LU) using the LU, which is provided by the removal target storage apparatus, as the external LU may be displayed.

This embodiment has been explained above. Incidentally, the above explanation has been given mainly about the case where the storage device(s) not belonging to a parity group is not included in the unused area. This is because, for example, the storage device(s) not belonging to a parity group is used for sparing, so that it is sometimes better to not recognize them as being unused; or the unused area changes according to the RAID level of the parity group even if the same storage device is used, so the calculation is difficult. However, a storage device(s) for which no parity group is defined may be treated as an unused area.

Furthermore, in the cases of FIG. 46 and FIG. 47, a standalone storage apparatus is made by the user operation to join a storage cluster. However, if the management computer 1200 finds the standalone storage apparatus, it may automatically (or after issuing an alert) make the standalone storage apparatus join a specified storage cluster.

Such capacity shortage processing can facilitate the capacity management of the storage apparatuses by the user like the processing in FIG. 39.

(2) Second Embodiment

Figure 48:
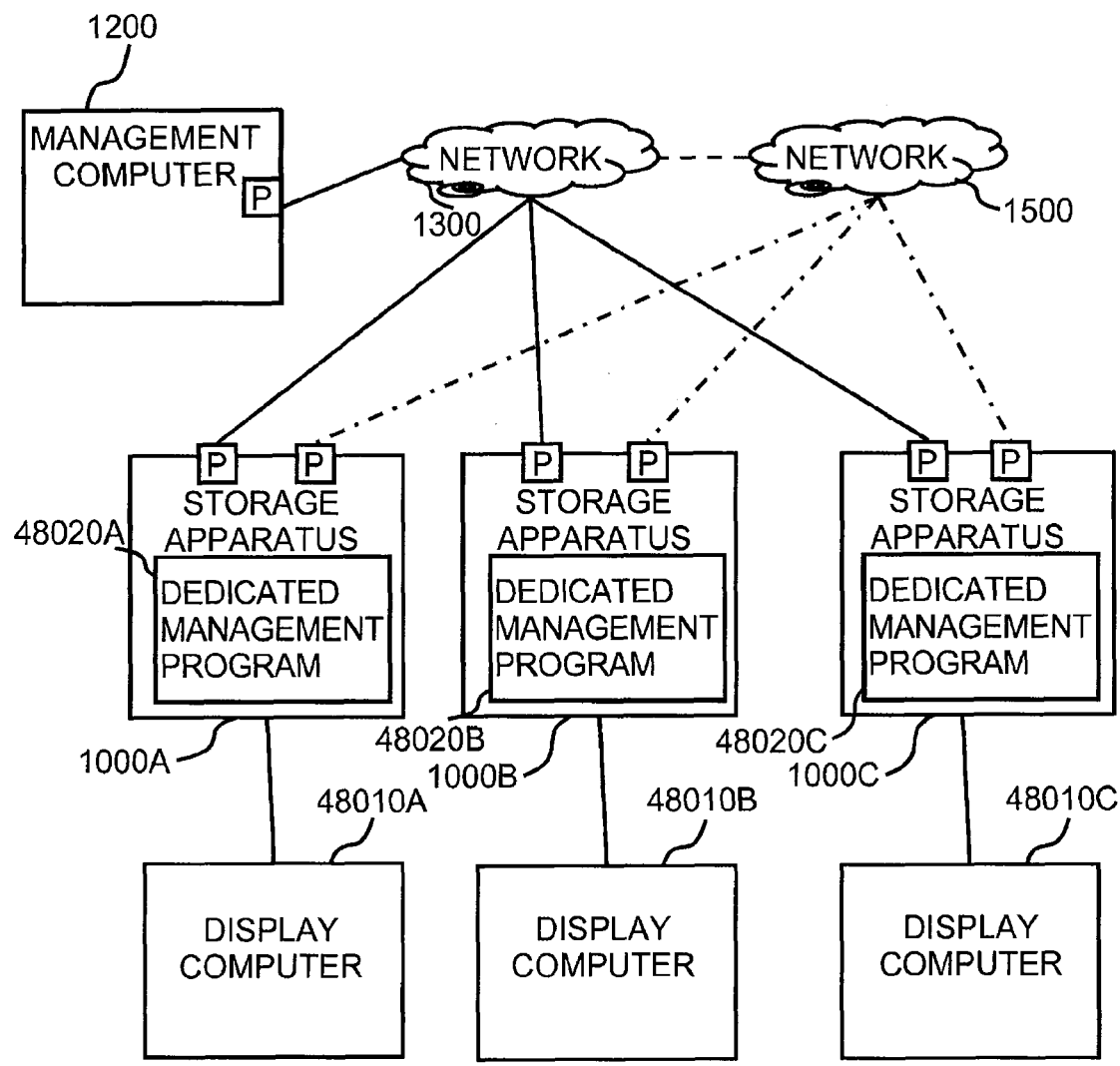
FIG. 48 shows the configuration of a computer system according to a second embodiment.

FIG. 48 shows a computer system according to this embodiment. Incidentally, the host 1100 and the display computer 1400 are omitted in the drawing, but they may exist as in the first embodiment.

As described in the first embodiment, a storage apparatus 1000 in standalone operation can be made to join a storage cluster. Therefore, the storage apparatus belonging to the storage cluster stores a dedicated management program 48020 for executing processing for managing its own storage apparatus and is configured to use a display computer 48010 to perform management input to, or output from, the dedicated management program 48020.

Incidentally, the dedicated management program 48020 does not perform configuration change processing and input/output processing on a plurality of storage apparatuses, and has a function similar to (but not necessarily completely the same as) that of the system management program 12010, except executing the processing by referring to the storage configuration information instead of the management-side storage configuration information. Furthermore, the display computer 48010 fulfills a role similar to that of the display computer 1400, but does not have to have completely the same program or hardware configuration as that of the display computer 1400.

However, if a configuration change or similar is performed after joining a storage cluster without using the management computer 1200, that may sometimes have adverse effect on accesses to other storage apparatuses 1000 belonging to the storage cluster (for example, an LU path definition of an LU used as an external LU may be cancelled or an internal LU may be deleted). In order to prevent such adverse effect, this embodiment inhibits the processing by the dedicated management program 48020 via the display computer 48010 which might cause a configuration change of the storage apparatus joining the storage cluster.

Figure 49:
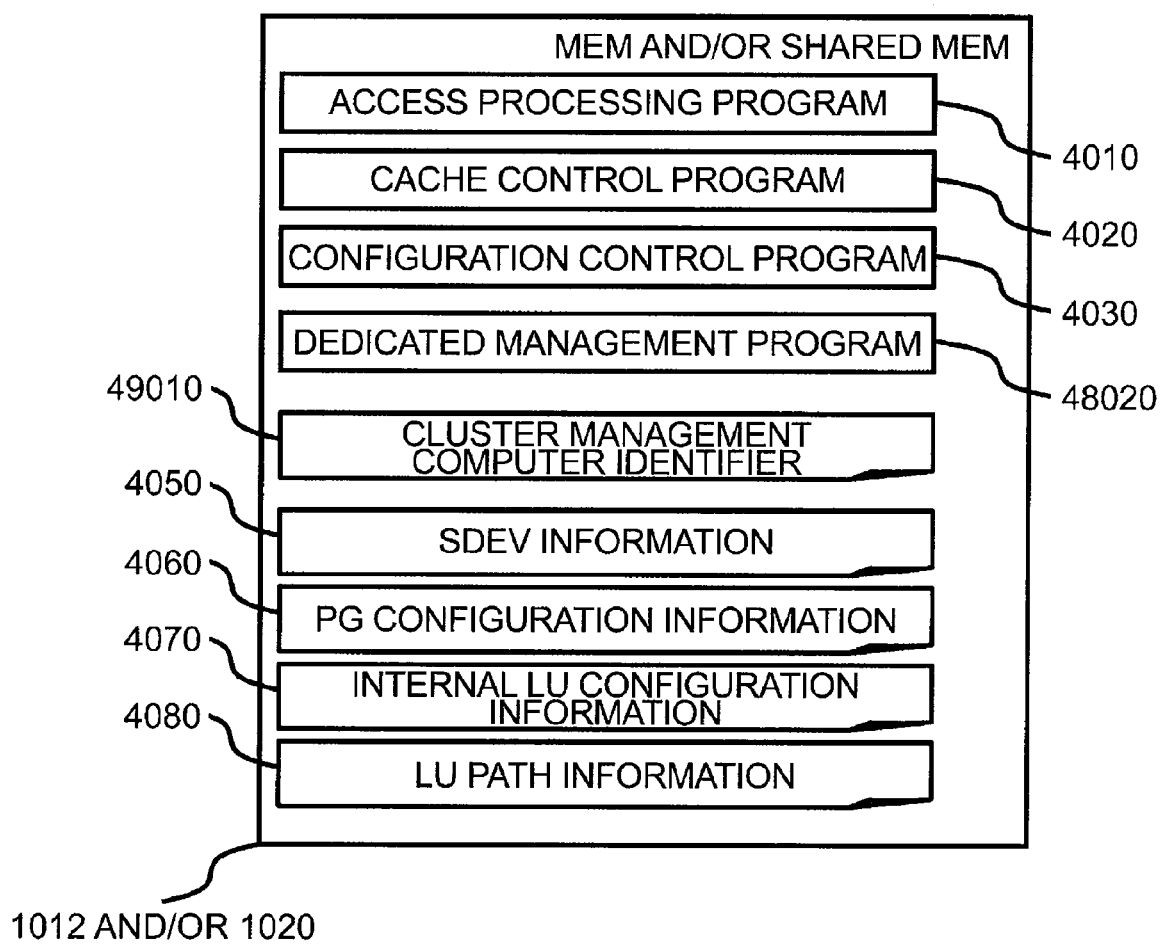
FIG. 49 shows information and programs stored in a memory and/or a cache memory for a storage apparatus according to the second embodiment.

FIG. 49 shows the content of the memory 1012 and/or the cache memory 1020 for the storage apparatus 1000. In this embodiment, the dedicated management program 48020 is stored in addition to the information and programs described in the first embodiment. The memory 1012 and/or the cache memory 1020 also stores a cluster management computer identifier 49010.

The cluster management computer identifier 49010 stores an identifier (more preferably, a communication identifier) of the management computer 1200 for managing the relevant storage apparatus as belonging to a storage cluster. Therefore, in a case of a standalone storage apparatus, a value indicating that the relevant storage apparatus does not belong to a storage cluster is stored as the identifier. Then, according to registered information sent from the management computer 1200 as part of the storage cluster joining processing, the cluster management computer identifier 49010 becomes the identifier of the management computer 1200. Also, if the processing executed by the management computer 1200 for removing the designated storage apparatus terminates normally, the management computer 1200 sends an instruction so that the cluster management computer identifier 49010 is updated again to the value indicating that the relevant storage apparatus does not belong to a storage cluster.

Figure 50:
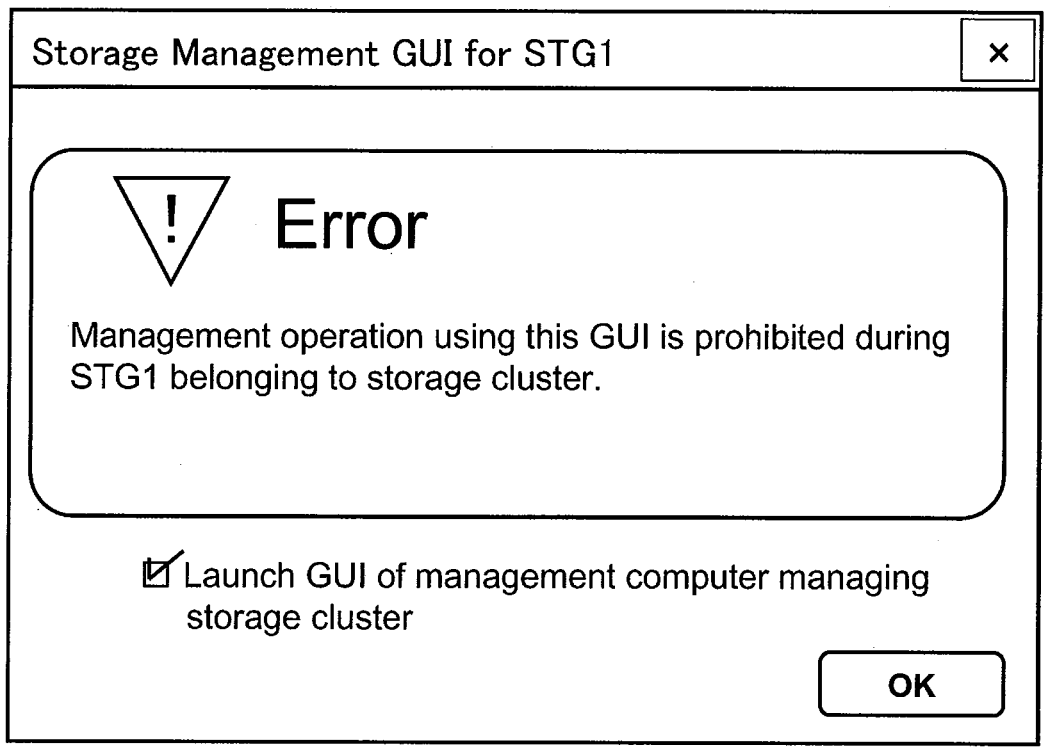
FIG. 50 shows a screen example displayed on a computer or program other than the management system for managing storage apparatuses included in a storage cluster.

On the other hand, the dedicated management program 48020 displays a screen on the display computer 48010 to inhibit the operation which might cause a change of at least part of the configuration. FIG. 50 shows an example of a screen to inhibit the entire operation.

The screen in FIG. 50 is displayed when the display computer 48010 starts management by communicating with the storage apparatus 1000. Incidentally, the management operation from the display computer 48010 is prohibited (inhibited) in this screen and a message stating that the reason for the prohibition (inhibition) is because the storage apparatus 1000 belongs to a storage cluster is displayed. Furthermore, as indicated on this screen, the screen may include a link to change the screen of the display computer 48010 to a screen provided by the management computer 1200 based on the information of the cluster management computer identifier 49010. Furthermore, the screen may be changed to the screen of the management computer 1200 without displaying such a link.

Incidentally, examples of a case where the entire management operation provided by the dedicated management program is not prohibited include a network setting operation (because communication with the management computer 1200 is disabled at least temporarily due to a configuration change (replacement) of the network 1300 or the network 1500) or operation to mount a storage device (because any function as a storage cluster would not be lost even without prohibiting the operation).

Also, if a computer (not shown in the drawing) that manages a specified storage apparatus by using the dedicated management program 48020 and does not manage other storage apparatuses exists, this embodiment can be applied in the same manner (it is only necessary to consider that computer as part of the storage apparatus). As another example of a case where the entire management operation is not prohibited, only the information display may be permitted and the operation relating to the setting which might cause a configuration change (update of the internal LU configuration information 4070, etc.) by the configuration control program 4030 may be prohibited. Since the configuration of the storage apparatus will not be changed in such a case, this embodiment can be applied in the same manner.

Incidentally, the display computer 48010 does not always have to display only the screen for the corresponding storage apparatus. For example, the display computer 48010 may activate a plurality of browser screens and display a management screen generated by the dedicated management program 48020 for storage apparatuses which are individually handled with their own browser screens. Furthermore, one display computer may display a management screen generated by the dedicated management program 48020 for a first storage apparatus for a certain period of time and display a management screen generated by the dedicated management program 48020 for a second storage apparatus for another period of time.

This embodiment described above discloses a computer system including a storage cluster including a specified storage apparatus, a first management system for managing the storage cluster, and a display computer for displaying a dedicated management screen for at least the specified storage apparatus. The embodiment also discloses that while the specified storage apparatus belongs to the storage cluster, at least part of the management operation is inhibited via the dedicated management screen displayed on the display computer; and after removing the specified storage apparatus from the storage cluster, the management operation is permitted.

(3) Third Embodiment

Figure 51:
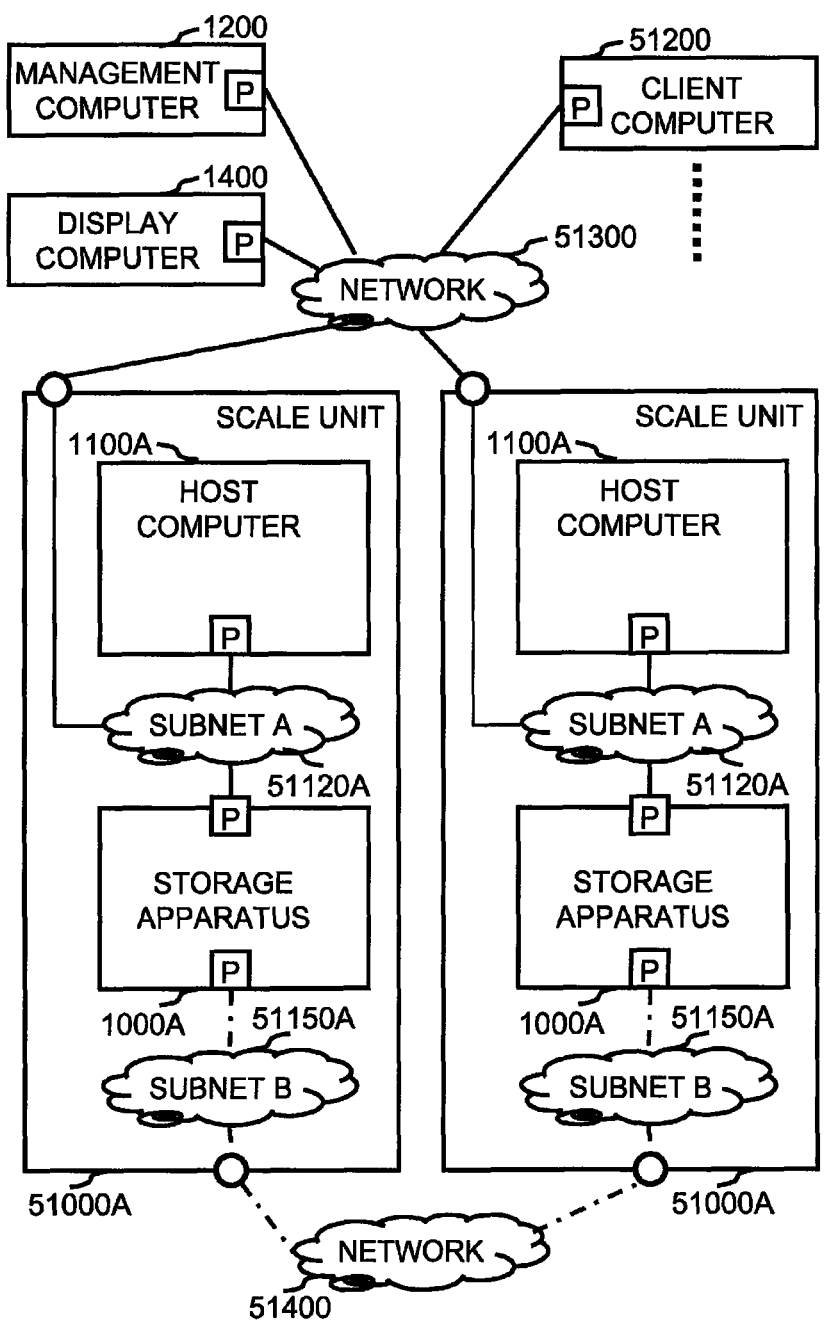
FIG. 51 shows the configuration of a computer system according to a third embodiment.

FIG. 51 shows another computer system according to this embodiment. The computer system includes the following components:

one or more scale units 51000 (the scale unit includes a host computer 1100, a storage apparatus 1000, subnet A 51120 for connecting the host computer 1100 and the storage apparatus 1000, and subnet B 51150 for connecting to the storage apparatus 1000);

a network 51300 (the network 51300 connects to the subnet A 51120 and fulfills a role equivalent to that of the network 1300; and it should be noted that the network 51300 may be also used for communication between the client computer 51200 and the host computer 1100; and the configuration and connection of the network 51300 can be changed flexibly);

a network 51400 (the network 51400 connects to the subnet B 51150 and fulfills a role equivalent to that of the network 1500; and the configuration and connection of the network 51400 can be changed flexibly); and one or more client computers 51200 (the client computer 51200 is a computer which accesses the host computer 1100).

Incidentally, a plurality of scale units is collectively referred to as a computer cluster. The scale unit 51000 serves as a unit to add a host resource and a storage resource to the computer cluster.

The roles of other computers and storage apparatuses are similar to those in the first embodiment and the second embodiment. The first embodiment and the second embodiment can be also applied to the above-described computer system.

(4) Fourth Embodiment

Figure 52:
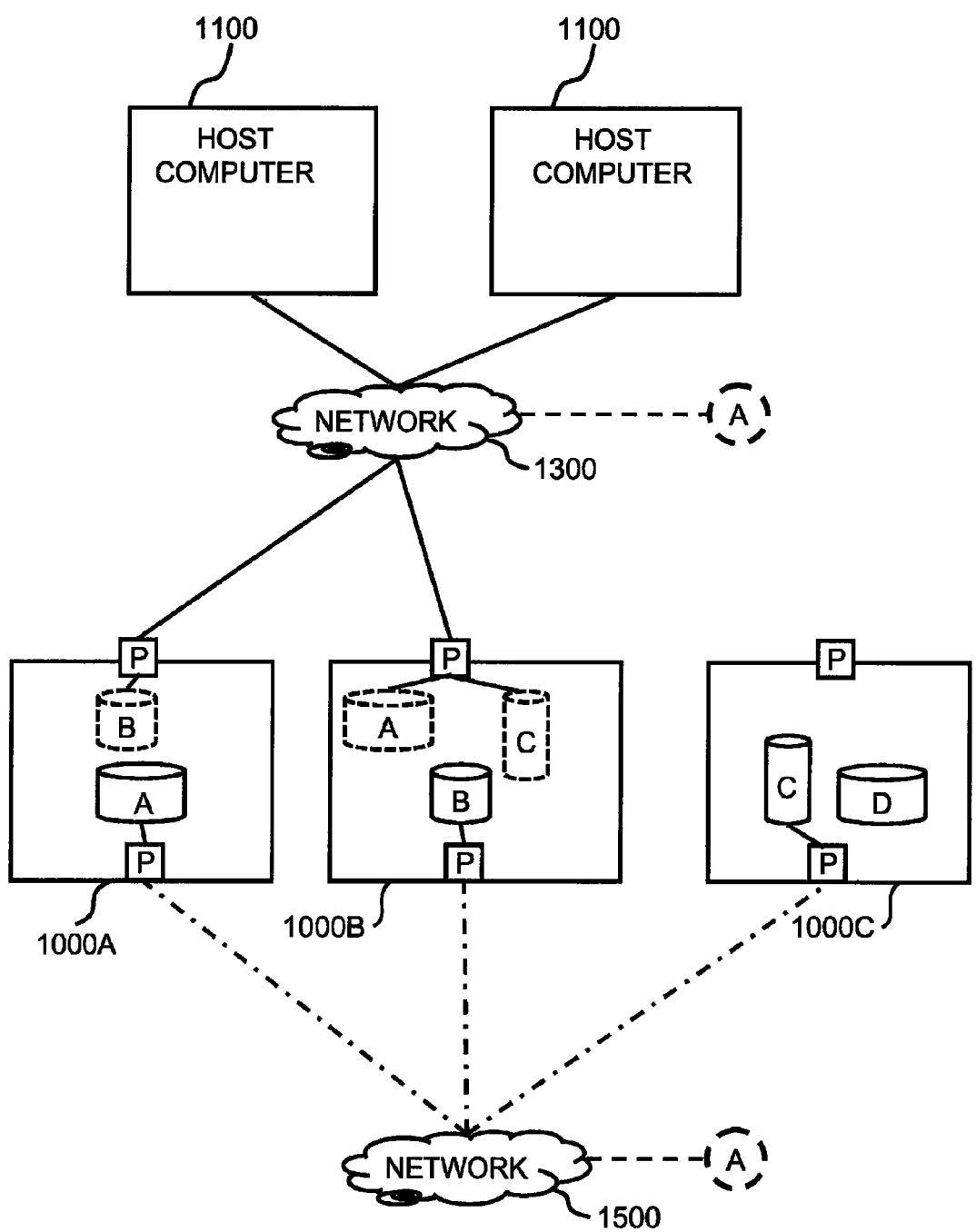
FIG. 52 shows the configuration of a computer system according to a fourth embodiment.

FIG. 52 shows a computer system according to this embodiment. The difference between this embodiment and the first embodiment is that a storage apparatus 1000C only provides its internal LU as a virtual LU of another storage apparatuses and an internal LU of another storage apparatus is not provided as a virtual LU of the storage apparatus 1000C in this embodiment. A storage apparatus like the storage apparatus 1000C will be referred to as the capacity providing storage apparatus in this embodiment. Therefore, the capacity providing storage apparatus does not have to have a function providing an internal LU of another storage apparatus as its own virtual LU. For ease of explanation, a basic explanation will be given below about the storage apparatus 1000C, explaining that the storage apparatus 1000C provides its LUs to only the storage apparatus 1000B. However, the storage apparatus 1000C may provide part of its internal LUs to the host computer 1100. Also, the storage apparatus 1000C may be configured to provide its internal LUs as virtual LUs to a plurality of storage apparatuses.

Figure 53:
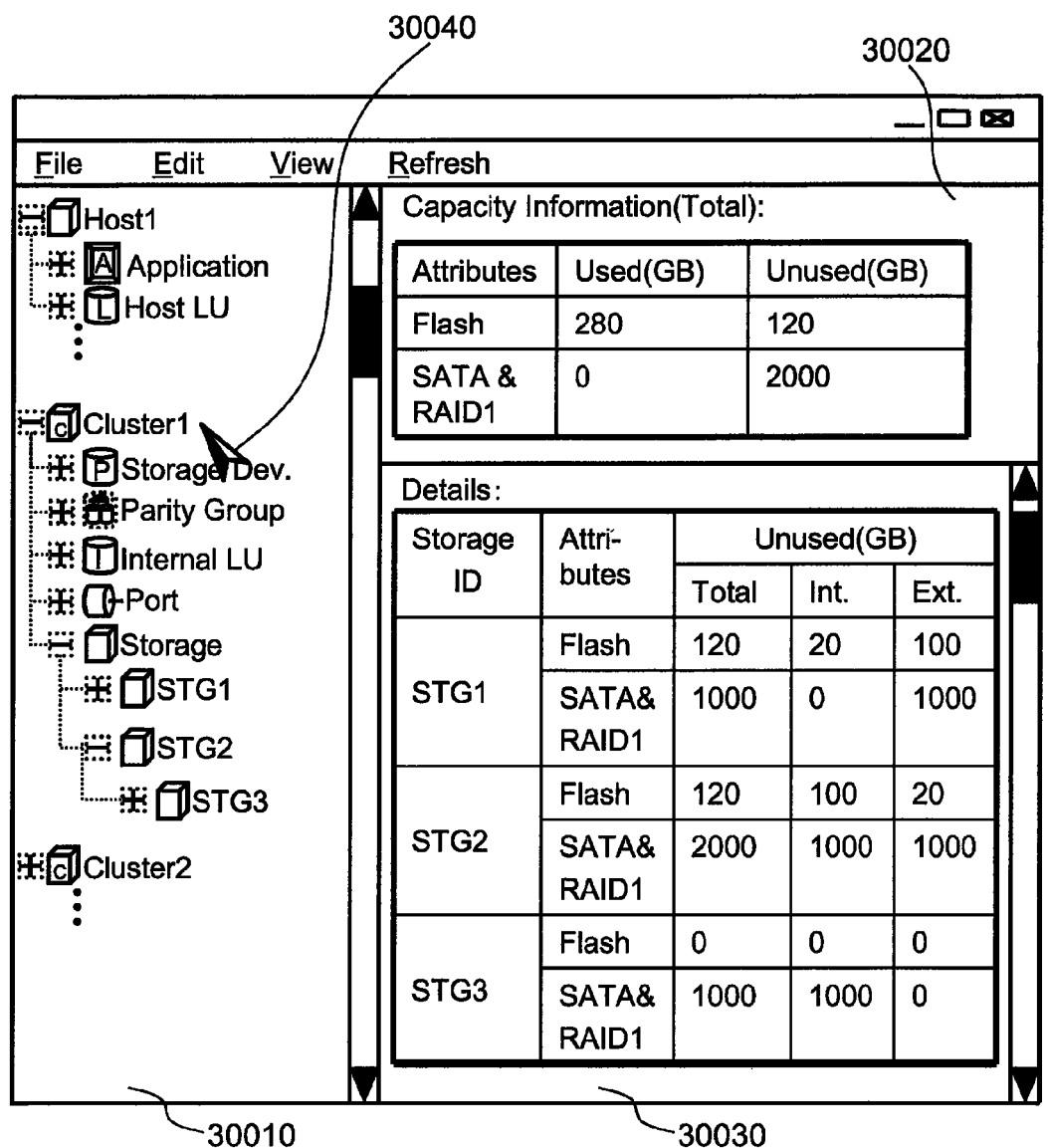
FIG. 53 shows a screen display example for the management system according to the fourth embodiment.

FIG. 53 shows a screen display where the storage apparatus 1000C (STG3) has the above-described configuration. A tree in the first pane 30010 may be used to indicate, by means of a hierarchical structure, that the storage apparatus 1000C (STG3) provides its LUs to only the storage apparatus 1000B (STG2).

The used capacity and the unused capacity of each attribute condition set displayed in the second pane 30020 in FIG. 53 are calculated according to the following standards:

Used Capacity: the used capacity is calculated in the same manner as in the first embodiment. When this calculation is performed, the used capacity is calculated by including the used capacity of the capacity providing storage apparatus (the storage apparatus 1000C (STG3) in FIG. 52).

Unused Capacity: the unused capacity is calculated in the same manner as in the first embodiment. When this calculation is performed, the unused capacity is calculated by including the unused capacity of the capacity providing storage apparatus (the storage apparatus 1000C (STG3) in FIG. 52). Definitions of Used and Unused in this Embodiment are the Same as Those in the First Embodiment.

The capacity information displayed in the third pane 30030 in FIG. 53 is information indicating the details of the unused capacity of each storage apparatus belonging to a storage cluster. The capacity value of each storage apparatus and/or each attribute condition set displayed in the third pane is calculated according to the following standards:

Unused Capacity (total): the unused capacity is calculated as the sum of the unused capacity described below (in a case of using the internal storage devices) and the unused capacity (in a case of using the external storage devices).

Unused Capacity (in the case of using the internal storage devices): this is a column indicated as Int. in this drawing. The unused capacity is calculated in the same manner as in the first embodiment.

Unused Capacity (in the case of using the external storage devices): this is a column indicated as Ext. in this drawing. The unused capacity is calculated in the same manner as in the first embodiment, except for the capacity providing storage apparatus like the storage apparatus 1000C. The unused capacity of the capacity providing storage apparatus is displayed as 0. The Storage Apparatuses Other Than Summary Objects which are required to calculate the capacity are the same as those in the first embodiment; however, this embodiment is characterized in that regarding Patterns 1 and 3, the unused capacity of the storage apparatus 1000C (STG3) is included in the unused capacity of all the storage apparatuses other than the storage apparatus 1000C (STG3) (in the case of using the external storage devices); and regarding Pattern 2, the unused capacity of the storage apparatus 1000C (STG3) is included in only the storage apparatus 1000B (STG2) to which the virtual LUs are directly provided. The display in FIG. 53 is an example where Pattern 2 is adopted.

Furthermore, another example of displaying each capacity in the third pane may be as follows.

Unused Capacity (in the case of using the internal storage devices): a total value obtained by adding the sum of the storage capacities of parity groups defined in a storage apparatus (for example, the storage apparatus 1000C (STG3) in FIG. 52) excluding storage devices, with which the summary object storage apparatuses cannot communicate, from among the capacity providing storage apparatuses, to the storage capacity of parity groups defined in the summary object storage apparatuses described in the first embodiment.

Unused Capacity (in the case of using the external storage devices): a value obtained by subtracting the sum of the storage capacities of parity groups defined in the capacity providing storage apparatuses from the capacity calculated by any of the methods in Pattern 1 to Pattern 3 described in the first embodiment.

As explained above, a computer system includes: a computer sending an access request including an identifier of a storage port and an access number; a first storage apparatus including a first controller including a first storage port and a first storage device; a second storage apparatus including a second controller including a second storage port and a second storage device; a first network coupled to the first storage port and the second storage port to enable communication between the first storage apparatus and the second storage apparatus; and a second network coupled to the first storage port, the second storage port, and the computer to transmit the access request.

The first controller defines first internal LUs, part of which is defined using the first storage device, and another part of which is defined using a part of second internal LUs, wherein the first controller provides LUs by assigning an access number to at least one of the first internal LUs, and wherein the second controller defines the second internal LUs, part of which is defined using the second storage device, and another part of which is defined using a part of the first LUs. The second controller provides LUs by assigning an access number to at least one of the second internal LUs.

Furthermore, the computer system may include a management system including a memory, a processor, and an input/output device, wherein the memory stores management-side storage configuration information about the first storage apparatus and the second storage apparatus. The processor for the management computer may:

(1A) receive an LU creation request designating a storage port(s), which is at least one of the first storage port and the second storage port, via the input/output device;

(1B) identify a storage apparatus including the designated storage port(s) from the first storage apparatus and the second storage apparatus, based on the management-side storage configuration information;

(1C) search an unused area of a storage device in the identified storage apparatus, based on the management-side storage configuration information;

(1D) if an appropriate unused area is found, send a request to the identified storage apparatus to provide a new LU from the designated port(s) based on the appropriate unused area in the identified storage apparatus; and (1E) if an appropriate unused area is not found, send a request to the identified storage apparatus to provide a new LU from the designated port(s) based on an unused area in another storage apparatus.

Furthermore, the memory for the management computer may store network connection information indicating a relationship between a computer port in the computer, the first storage port, and the second storage port. The processor for the management computer may:

(2A) receive an LU creation request designating a computer, via the input/output device;

(2B) identify a storage port(s), which is at least one of the first storage port and the second storage port, based on the network connection information;

(2C) identify a storage apparatus including the designated storage port(s) from the first storage apparatus and the second storage apparatus, based on the management-side storage configuration information;

(2D) search an unused area of a storage device in the identified storage apparatus, based on the management-side storage configuration information;

(2E) if an appropriate unused area is found, send a request to the identified storage apparatus to provide a new LU from the designated port(s) based on the appropriate unused area in the identified storage apparatus; and (2F) if an appropriate unused area is not found, send a request to the identified storage apparatus to provide a new LU from the designated port(s) based on an unused area in another storage apparatus.

Furthermore, the processor for the management computer may manage a storage cluster at least joined by the first storage apparatus and the second storage apparatus. The processor for the management computer may, via the input/output device:

(a) display first storage capacity information, which includes an unused capacity in the first storage apparatus and an unused capacity in another storage apparatus(es) joined to the storage cluster except for the first storage apparatus, based on the management-side storage configuration information; and (b) display second storage capacity information, which includes an unused capacity in the second storage apparatus and an unused capacity in another storage apparatus(es) joined to the storage cluster except for the second storage apparatus, based on the management-side storage configuration information.

Furthermore, the computer system may include a third storage apparatus including a third controller having a third storage port, and a third storage device. The processor for the management computer may: (i) receive a request designating the third storage apparatus, or detect a third storage apparatus; and (ii) join the third storage apparatus to the storage cluster.

Furthermore, the management system may include:

a management computer for managing the first storage apparatus and the second storage apparatus joined to the storage cluster; and a first display computer for displaying management information about the storage cluster.

The computer system may further include a second display computer for displaying management information about the first storage apparatus; and the first controller may store clustered information indicating whether the first storage apparatus is managed by the management system as a part of the storage cluster. The first controller may disable a part or all of storage management operation regarding the first storage apparatus via the second display computer if the first storage apparatus is joined to the storage cluster.

REFERENCE SIGNS LIST

1000 Storage apparatus
1100 Host computer
1200 Management computer
1300 Network

1400 Display computer
1500 Network

The invention claimed is:

1. A computer system comprising:
a first storage apparatus including a first controller including a first storage port and a first storage device;
a second storage apparatus including a second controller including a second storage port and a second storage device;
a first network coupled to the first storage port and the second storage port to enable communication between the first storage apparatus and the second storage apparatus;
a second network coupled to the first storage port and the second storage port and a computer, where the second network transmits an access request including an identifier of a storage port and an access number to the computer system from the computer; and
a management system including a memory, a processor, and an input/output device connected to at least the first network,
wherein the first controller defines a plurality of first internal logical units (LUs), a part of which is defined using the first storage device, and another part of which is defined using a part of a plurality of second internal LUs;
wherein the first controller provides one or more LUs by assigning access numbers to at least one of the first internal LUs;
wherein the second controller defines the second internal LUs, part of which is defined using the second storage device, and another part of which is defined using a part of the first LUs;
wherein the second controller provides one or more LUs by assigning access numbers to at least one of the second internal LUs;
wherein the memory stores management-side storage configuration information about the first storage apparatus and the second storage apparatus, and
wherein the memory further stores instructions which instruct the processor to:
(1A) receive an LU creation request designating a storage port which is at least one of the first storage port and the second storage port, via the input/output device;
(1B) identify a storage apparatus including the designated storage port from the first storage apparatus and the second storage apparatus, based on the management-side storage configuration information;
(1C) search an unused area of a storage device in the identified storage apparatus, based on the management-side storage configuration information;
(1D) if an appropriate unused area is found, send a request to the identified storage apparatus to provide a new LU from the designated port based on the appropriate unused area in the identified storage apparatus; and
(1E) if an appropriate unused area is not found, send a request to the identified storage apparatus to provide a new LU from the designated port based on an unused area in another storage apparatus.

2. The computer system according to claim 1,
wherein the memory stores network connection information indicating a relationship between a computer port in the computer and the first storage port and the second storage port, and
wherein the memory further stores instructions which instruct the processor to:
(2A) receive an LU creation request designating the computer, via the input/output device;
(2B) identify a storage port which is at least one of the first storage port and the second storage port, based on the network connection information;
(2C) identify a storage apparatus including the identified storage port from the first storage apparatus and the second storage apparatus, based on the management-side storage configuration information;
(2D) search an unused area of a storage device in the identified storage apparatus, based on the management-side storage configuration information;
(2E) if an appropriate unused area is found, send a request to the identified storage apparatus to provide a new LU from the identified port based on the appropriate unused area in the identified storage apparatus; and
(2F) if an appropriate unused area is not found, send a request to the identified storage apparatus to provide a new LU from the identified port based on an unused area in another storage apparatus.

3. The computer system according to claim 2,
wherein the processor manages a storage cluster at least joined by the first storage apparatus and the second storage apparatus, and
wherein the memory further stores instructions which instruct the processor, via the input/output device, to:
(a) display first storage capacity information, which includes an unused capacity in the first storage apparatus and an unused capacity in another storage apparatus joined to the storage cluster other than the first storage apparatus, based on the management-side storage configuration information; and
(b) display second storage capacity information, which includes an unused capacity in the second storage apparatus and an unused capacity in another storage apparatus joined to the storage cluster other than the second storage apparatus, based on the management-side storage configuration information.

4. The computer system according to claim 3, further comprising:
a third storage apparatus including a third controller having a third storage port, and a third storage device, and
wherein the memory further stores instructions which instruct the processor to:
(i) receive a request designating the third storage apparatus, or detect a third storage apparatus; and
(ii) join the third storage apparatus to the storage cluster.

5. The computer system according to claim 4, wherein the management system includes:
a management computer for managing the first storage apparatus and the second storage apparatus joined to the storage cluster; and
a first display computer for displaying management information about the storage cluster;
wherein the computer system further comprises a second display computer for displaying management information about the first storage apparatus;
wherein the first controller stores cluster information indicating whether the first storage apparatus is managed by the management system as a part of the storage cluster; and
wherein the first controller disables a part or all of storage management operations regarding the first storage apparatus via the second display computer if the first storage apparatus is joined to the storage cluster.

6. The computer system according to claim 5,
wherein the access number is a logical unit number (LUN), and wherein the first controller receives write data from the computer and sends a write request including an identifier of the second storage port of the second storage apparatus coupled to the first network, and the LUN assigned to a certain one of the second internal LUs.

7. A method of managing a computer system, the computer system including a first storage apparatus with a first controller having a first storage port and a first storage device, a second storage apparatus with a second controller having a second storage port and a second storage device, a first network coupled to the first storage port and the second storage port to enable communication between the first storage apparatus and the second storage apparatus, a second network coupled to the first storage port and the second storage port and a computer, where the second network transmits an access request including an identifier of a storage port and an access number to the computer system from the computer, the method comprising:

defining, by the first controller, a plurality of first internal logical units (LUs), a part of which is defined using the first storage device, and another part of which is defined using a part of a plurality of second internal LUs;

providing, by the first controller, one or more LUs by assigning access numbers to at least one of the first internal LUs;

defining, by the second controller, the second internal LUs, part of which is defined using the second storage device, and another part of which is defined using a part of the first LUs;

providing, by the second controller, one or more LUs by assigning access numbers to at least one of the second internal LUs;

receiving an LU creation request designating a storage port which is at least one of the first storage port and the second storage port, via the input/output device;

identifying a storage apparatus including the designated storage port from the first storage apparatus and the second storage apparatus;

searching an unused area of a storage device in the identified storage apparatus, based on the management-side storage configuration information;

if an appropriate unused area is found, sending a request to the identified storage apparatus to provide a new LU from the designated port based on the appropriate unused area in the identified storage apparatus; and if an appropriate unused area is not found, sending a request to the identified storage apparatus to provide a new LU from the designated port based on an unused area in another storage apparatus.

8. A computer system comprising:

a first storage apparatus including a first controller including a first storage port and a first storage device;

a second storage apparatus including a second controller including a second storage port and a second storage device;

a first network coupled to the first storage port and the second storage port to enable communication between the first storage apparatus and the second storage apparatus;

a computer sending an access request including an identifier of a storage port and an access number to at least one of the first storage apparatus and the second storage apparatus;

a second network coupled to the first storage port and the second storage port and the computer to transmit the access request; and a management system including a memory, a processor, and an input/output device, wherein the first controller defines a plurality of first internal logical units (LUs), part of which is defined using the first storage device, and another part of which is defined using a part of a plurality of second internal LUs;

wherein the first controller provides one or more LUs by assigning an access numbers to at least one of the first internal LUs;

wherein the second controller defines the second internal LUs, part of which is defined using the second storage device, and another part of which is defined using a part of the first LUs;

wherein the second controller provides one or more LUs by assigning access numbers to at least one of the second internal LUs;

a management system including a memory, a processor, and an input/output device, wherein the memory stores management-side storage configuration information about the first storage apparatus and the second storage apparatus, and wherein the memory further stores instructions which instruct the processor to:

(A) receive an LU creation request designating a storage port, which is at least one of the first storage port and the second storage port, via the input/output device;

(B) identify a storage apparatus including the designated storage port from the first storage apparatus and the second storage apparatus, based on the management-side storage configuration information;

(C) search an unused area of a storage device in the identified storage apparatus, based on the management-side storage configuration information;

(D) if an appropriate unused area is found, sends a request to the identified storage apparatus to provide a new LU from the designated port based on the appropriate unused area in the identified storage apparatus; and (E) if an appropriate unused area is not found, sends a request to the identified storage apparatus to provide a new LU from the designated port based on an unused area in another storage apparatus.

9. The computer system according to claim 8, wherein the access number is logical unit number (LUN), and wherein the first controller receives write data from the computer and sends a write request including an identifier of a storage port of the second storage apparatus coupled to the first network, and the LUN assigned to a certain one of the second internal LUs.

10. The computer system according to claim 8, further comprising:

a management system including a memory, a processor, and an input/output device, wherein the memory stores management-side storage configuration information about the first storage apparatus and the second storage apparatus, and network connection information indicating a relationship between a computer port in the computer and the first storage port and the second storage port, and wherein the memory further stores instructions which instruct the processor to:

(A) receive an LU creation request designating a computer, via the input/output device;

(B) identify a storage port, which is at least one of the first storage port and the second storage port, based on the network connection information;

(C) identify a storage apparatus including the identified storage port from the first storage apparatus and the second storage apparatus, based on the management-side storage configuration information;
(D) search an unused area of a storage device in the identified storage apparatus, based on the management-side storage configuration information;
(E) if an appropriate unused area is found, sends a request to the identified storage apparatus to provide a new LU from the identified port based on the appropriate unused area in the identified storage apparatus; and
(F) if an appropriate unused area is not found, sends a request to the identified storage apparatus to provide a new LU from the identified port based on an unused area in another storage apparatus.

11. The computer system according to claim 8, further comprising:
a management system including a memory, a processor, and an input/output device,
wherein the memory stores management-side storage configuration information about the first storage apparatus and the second storage apparatus;
wherein the processor manages a storage cluster at least joined by the first storage apparatus and the second storage apparatus; and
wherein the memory further stores instructions which instruct the processor, via the input/output device, to:
(a) display first storage capacity information, which includes an unused capacity in the first storage apparatus and an unused capacity in another storage apparatus joined to the storage cluster other than the first storage apparatus, based on the management-side storage configuration information; and
(b) display second storage capacity information, which includes an unused capacity in the second storage apparatus and an unused capacity in another storage apparatus joined to the storage cluster other than the second storage apparatus, based on the management-side storage configuration information.

12. The computer system according to claim 11, further comprising:
a third storage apparatus including a third controller having a third storage port, and a third storage device,
wherein the memory further stores instructions which instruct the processor to:
(i) receive a request designating the third storage apparatus or detects a third storage apparatus; and
(ii) join the third storage apparatus to the storage cluster.

13. The computer system according to claim 8, further comprising:
a management computer for managing the first storage apparatus and the second storage apparatus joined to the storage cluster;
a first display computer for displaying management information about the storage cluster; and
a second display computer for displaying management information about the first storage apparatus;
wherein the first controller stores clustered information indicating whether the first storage apparatus is managed by the management system as a part of the storage cluster; and
wherein the first controller disables a part or all of storage management operations regarding the first storage apparatus via the second display computer if the first storage apparatus is joined to the storage cluster.

\* \* \* \* \*